May 12, 1970     A. C. REYNOLDS, JR., ET AL     3,512,139
SYSTEM AND APPARATUS FOR AUTOMATIC DATA COLLECTION
Filed Dec. 31, 1959     18 Sheets—Sheet 1
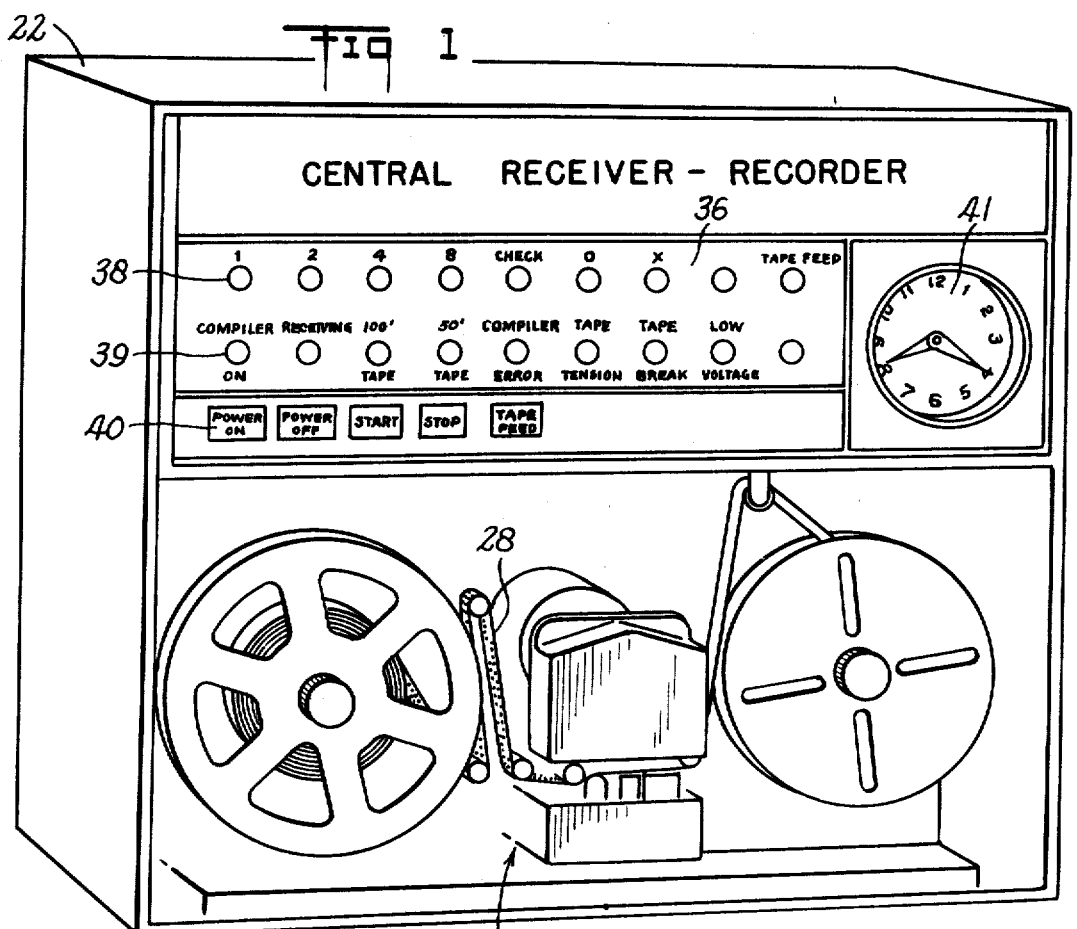
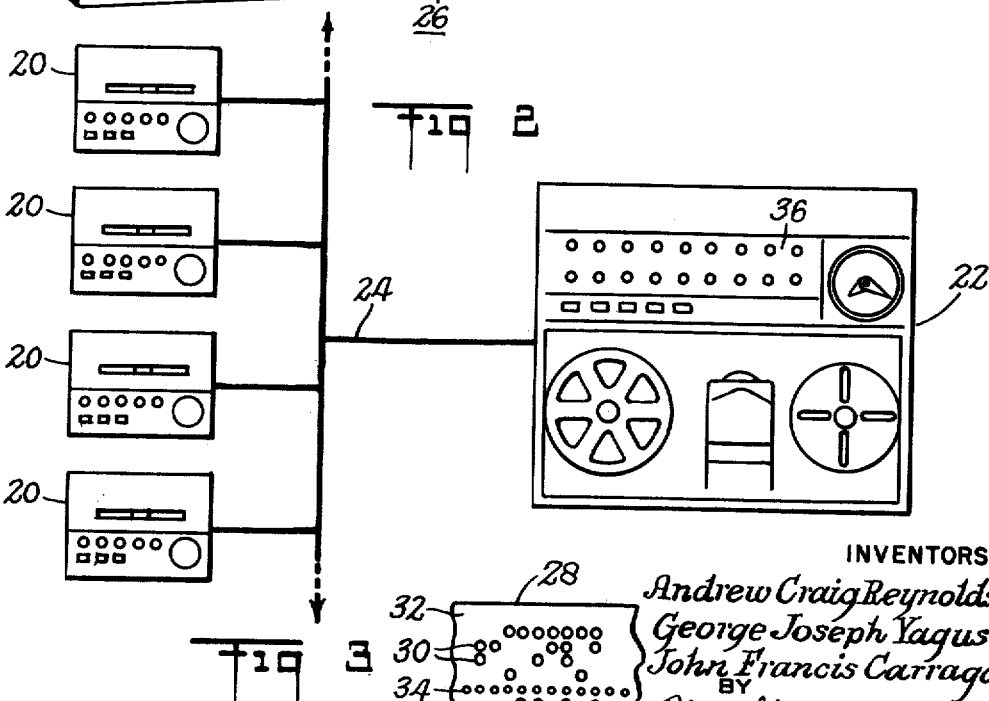
INVENTORS
Andrew Craig Reynolds, Jr.
George Joseph Yagusic
John Francis Carragan
BY
Blair, Spencer + Buckles
ATTORNEYS

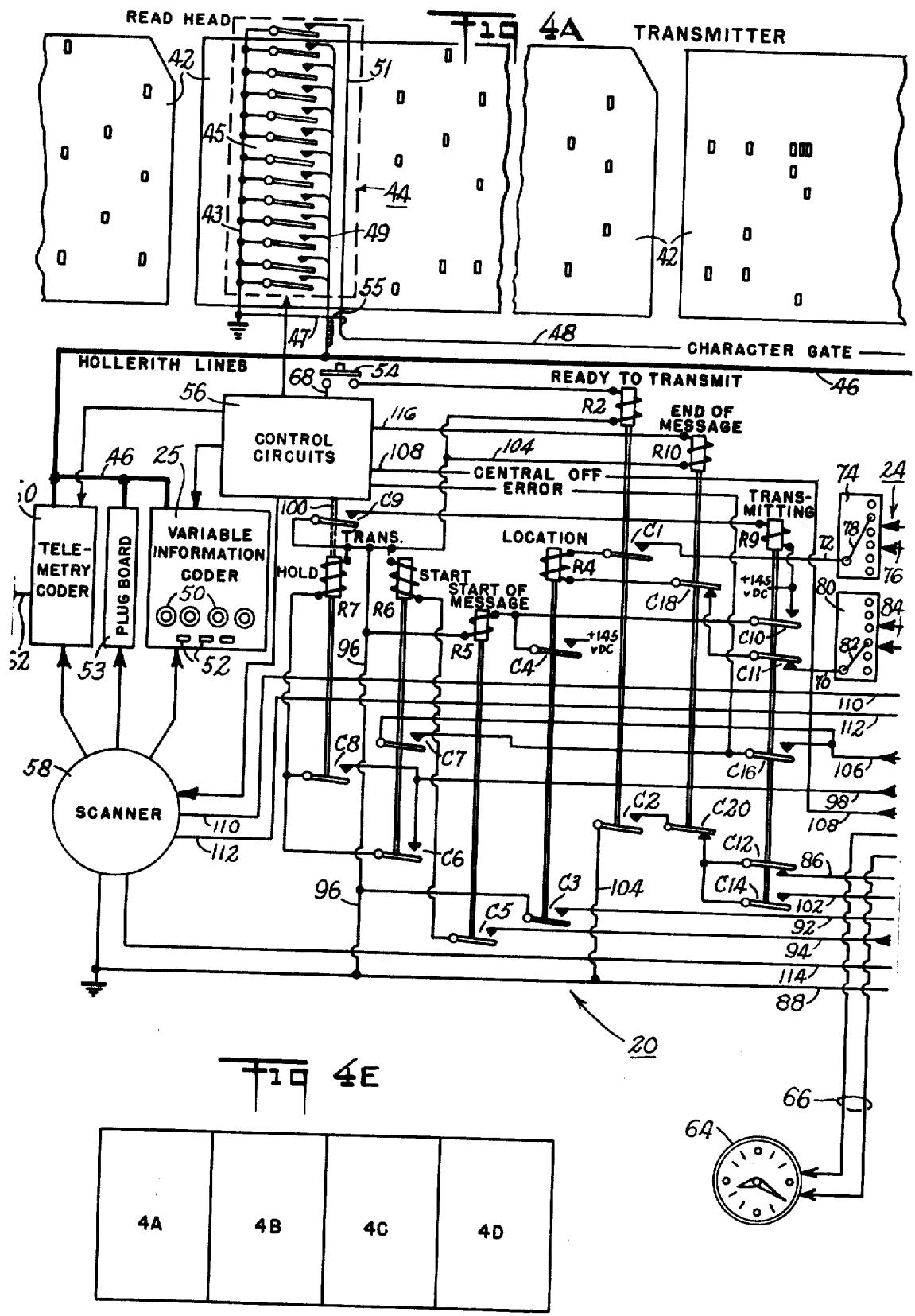

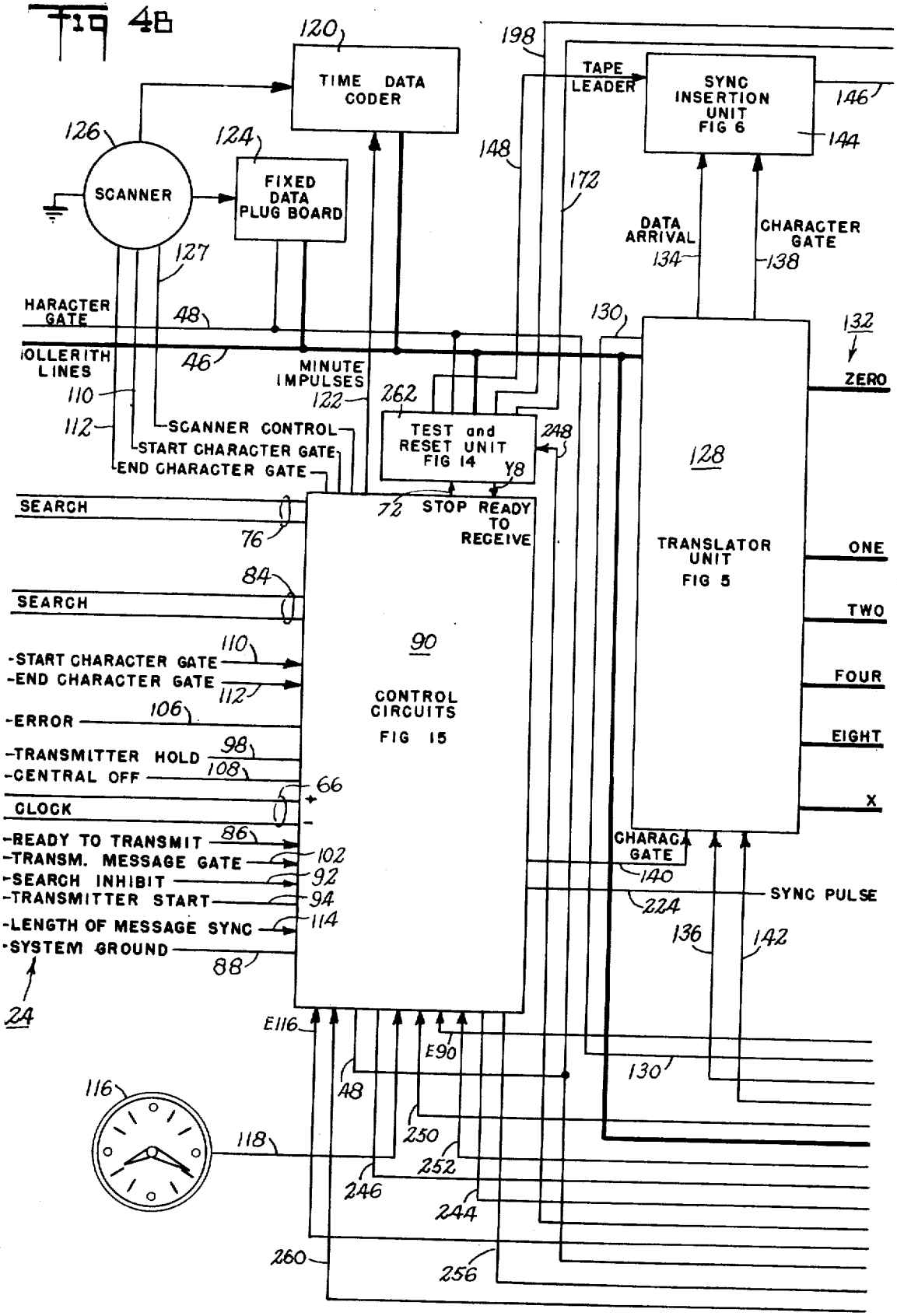

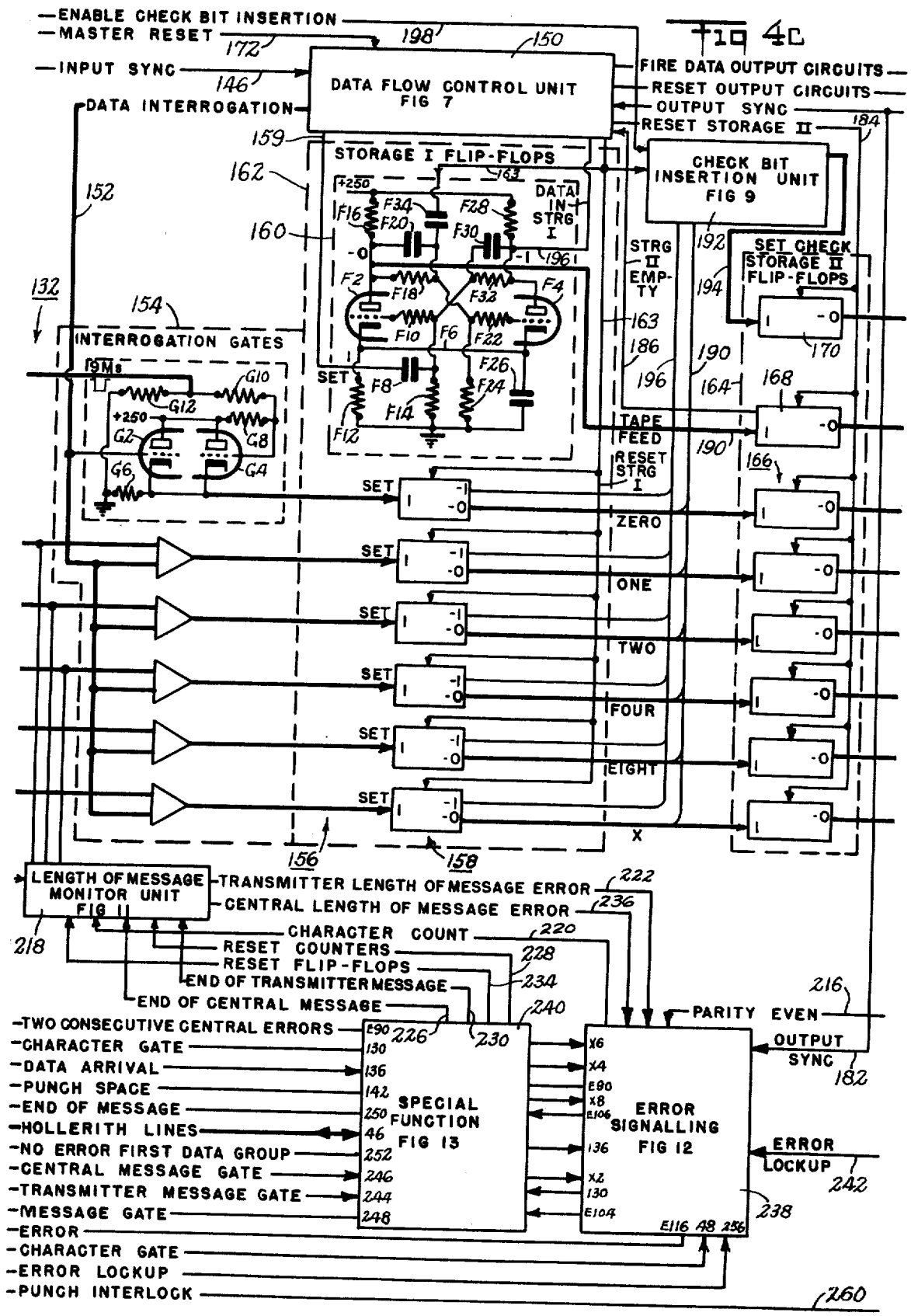

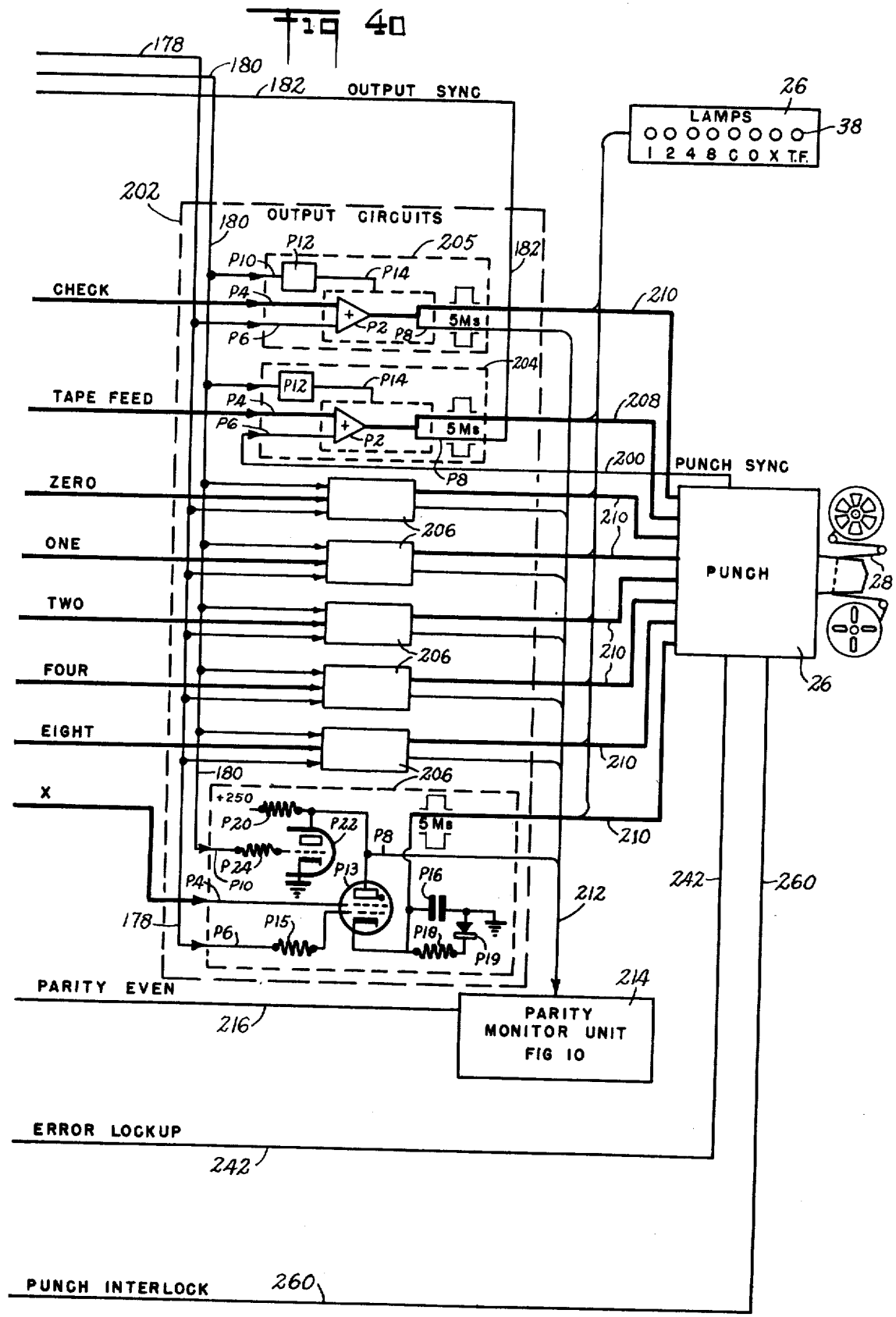

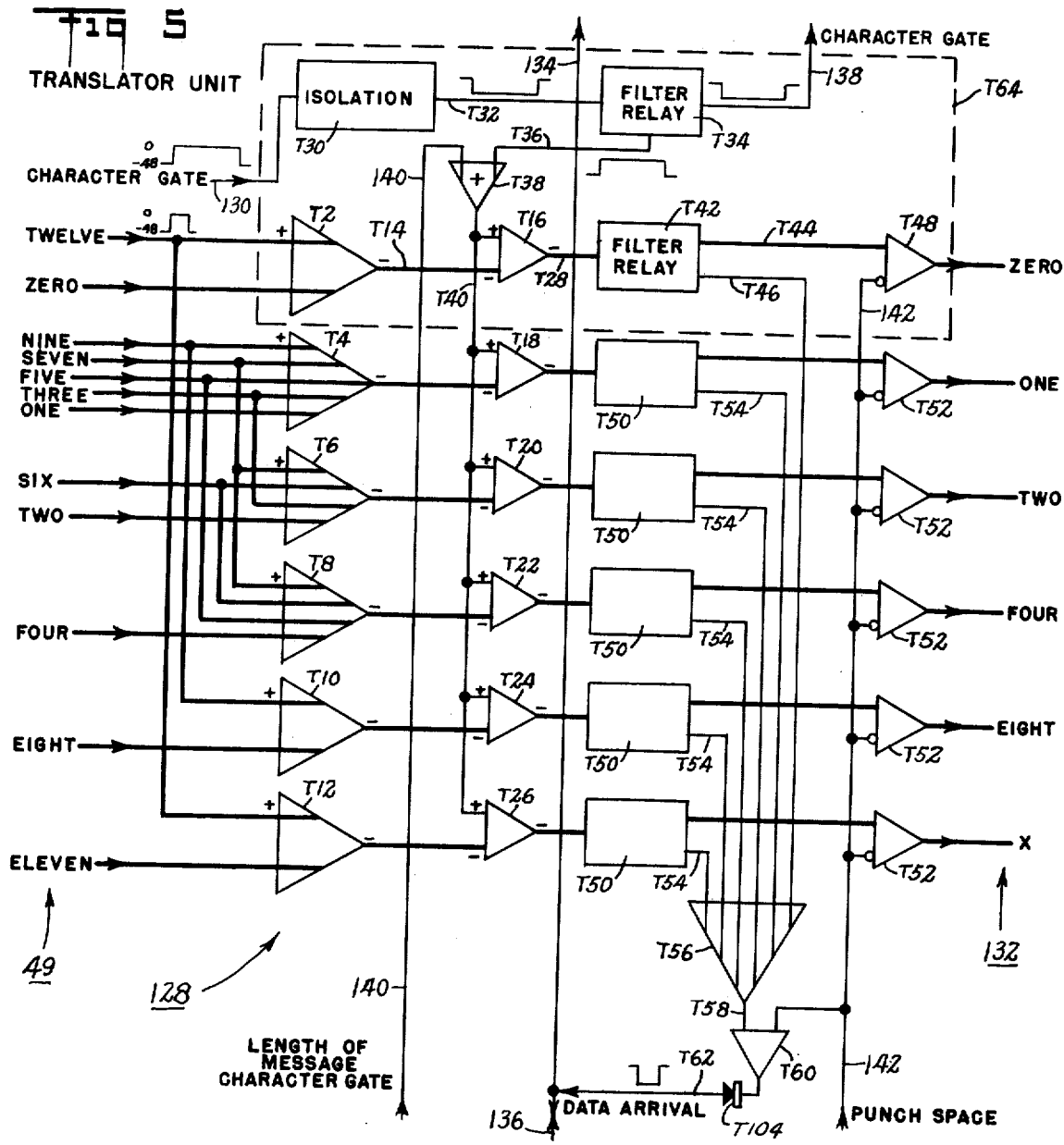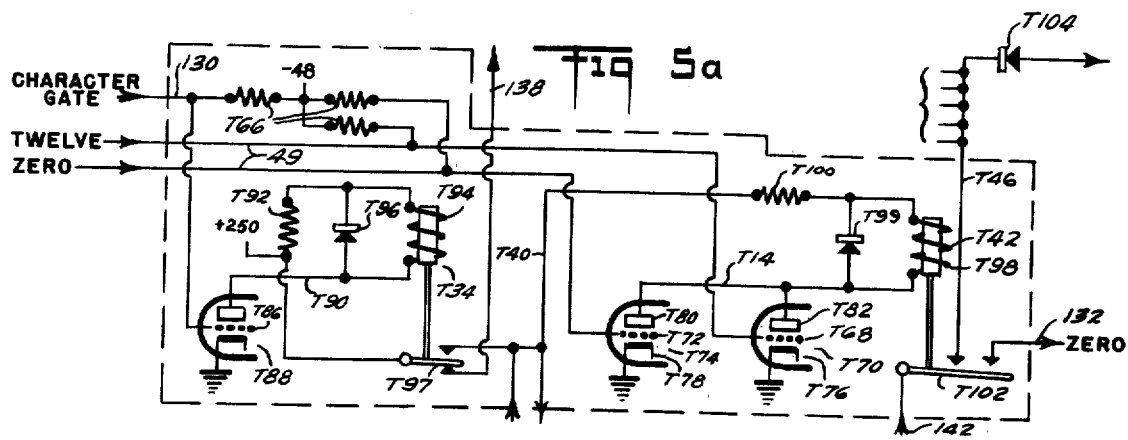

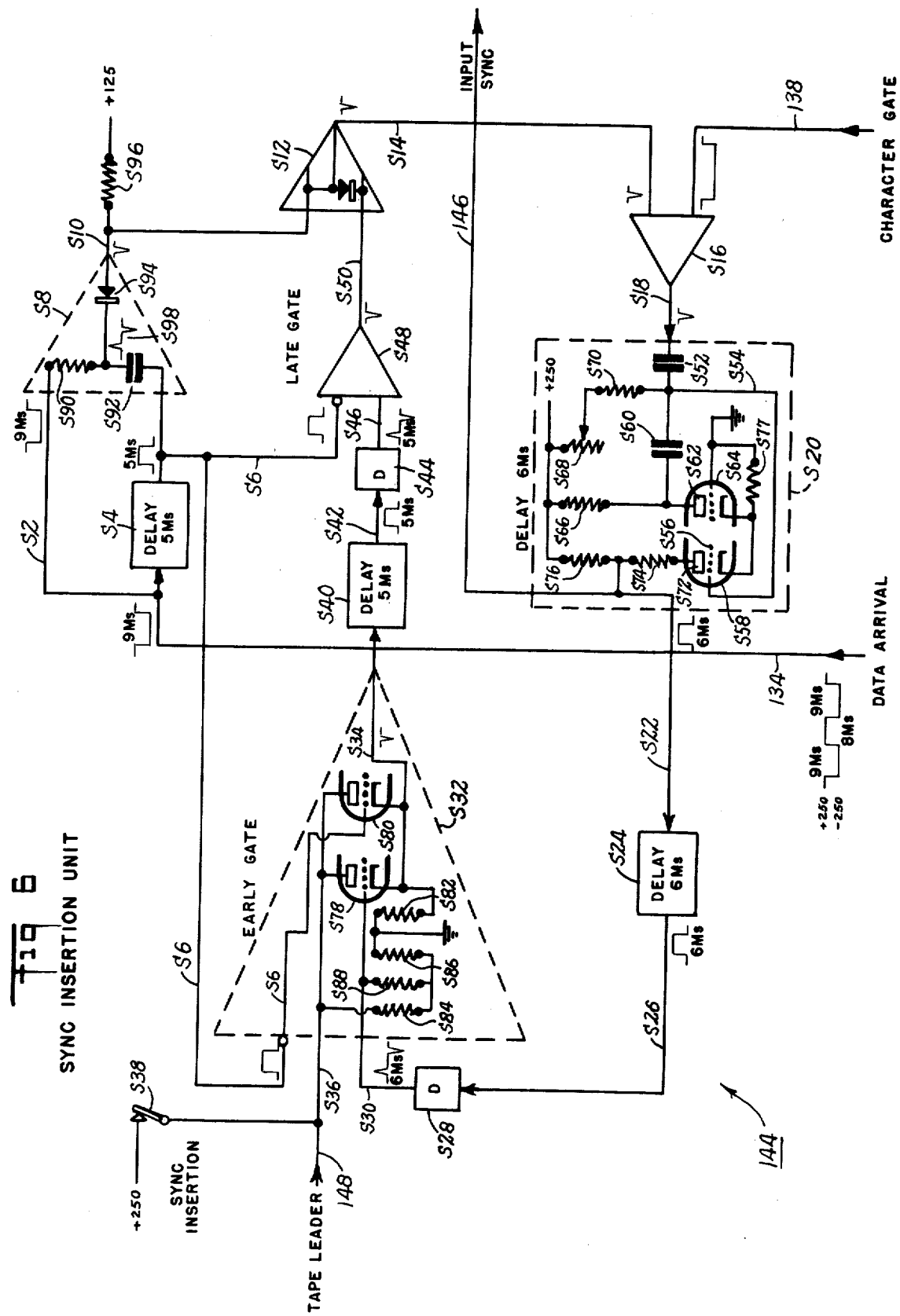

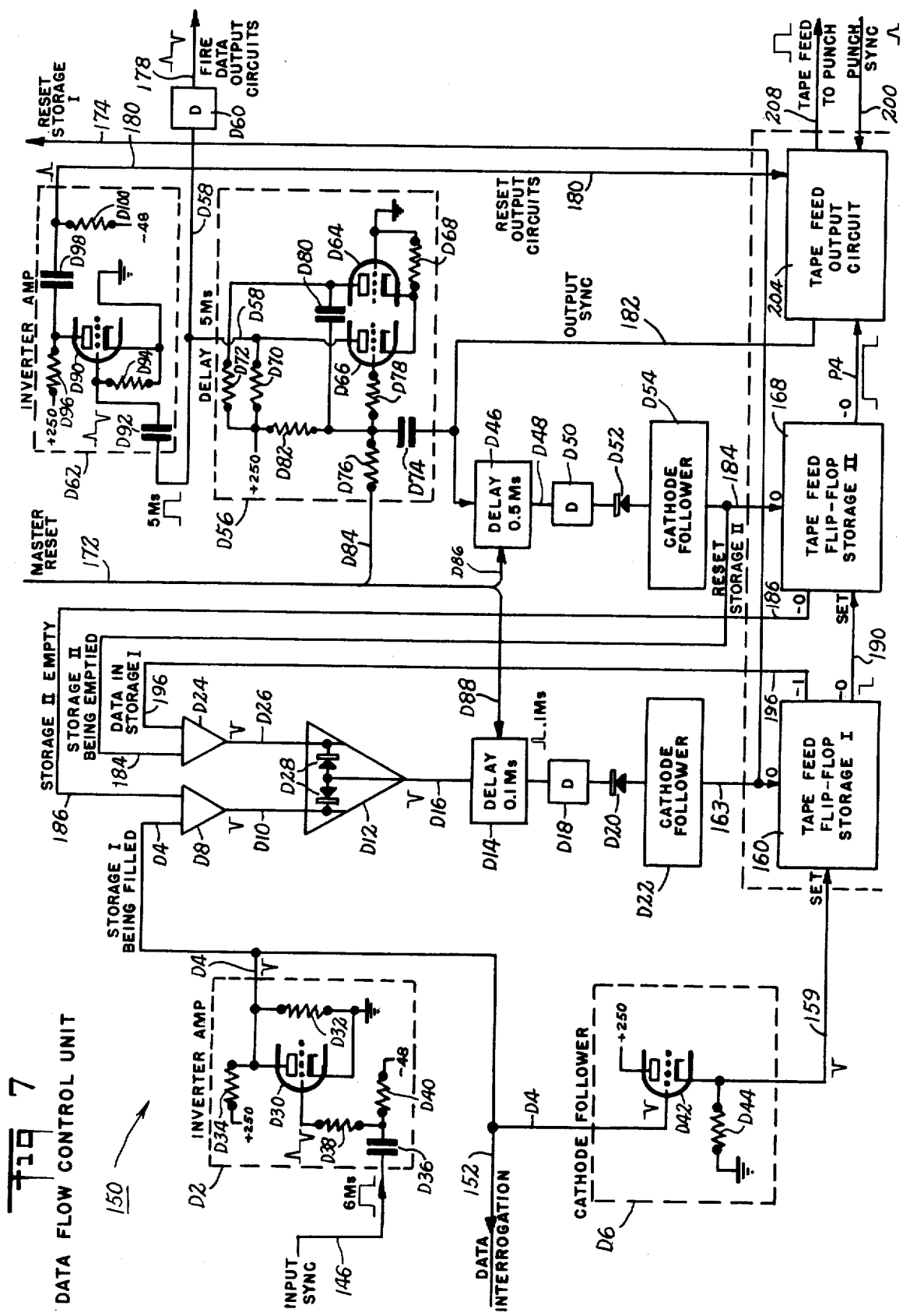

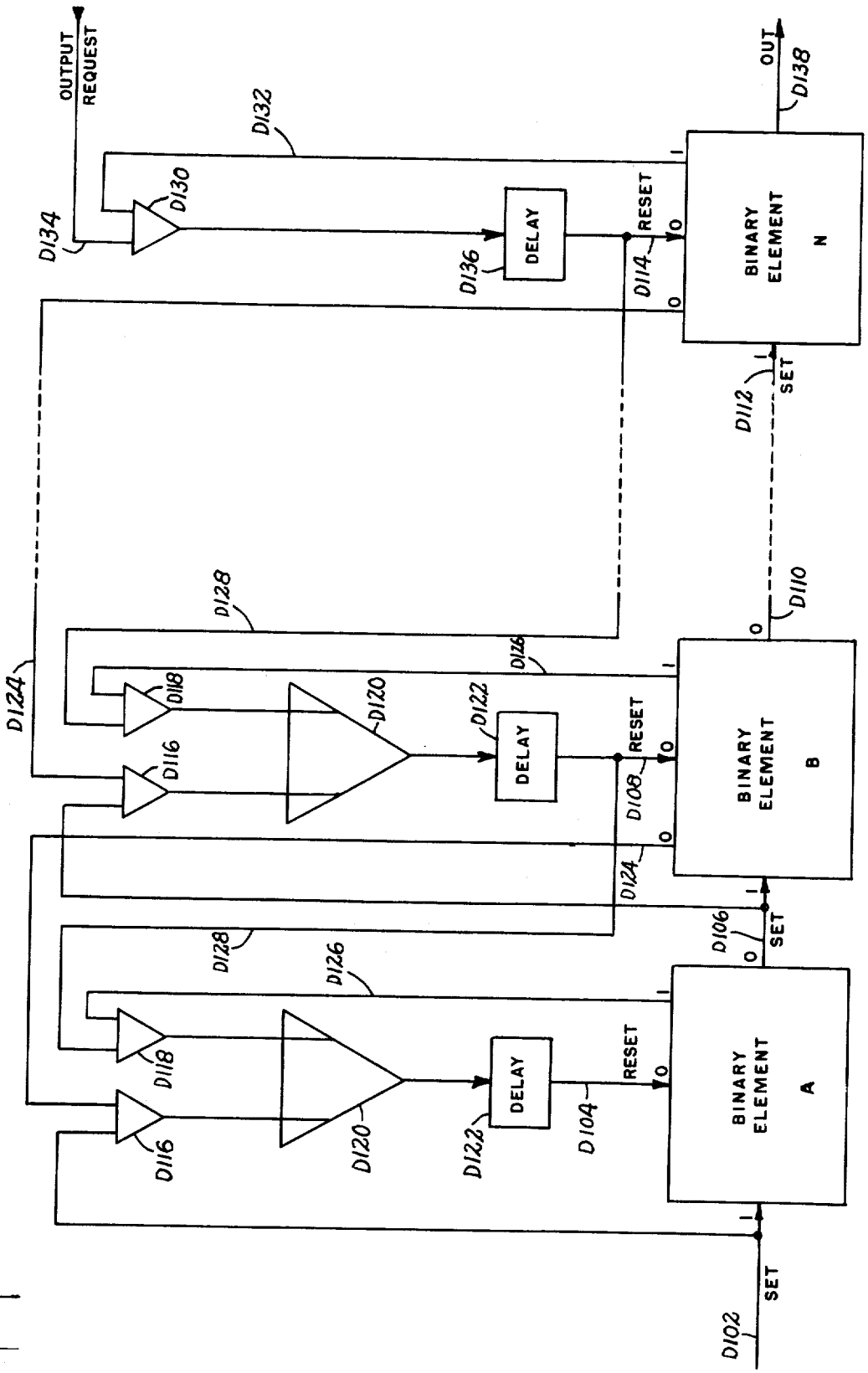

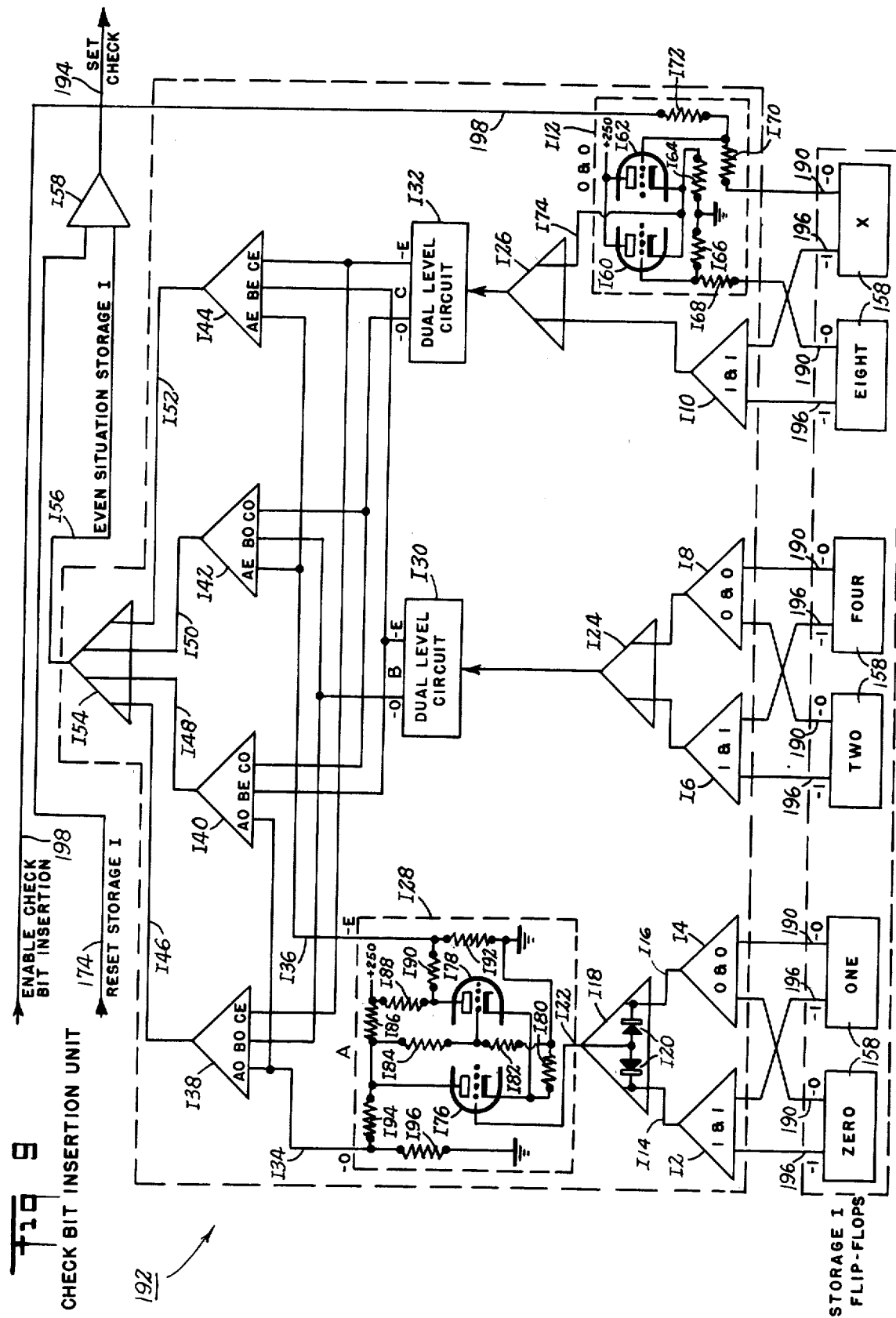

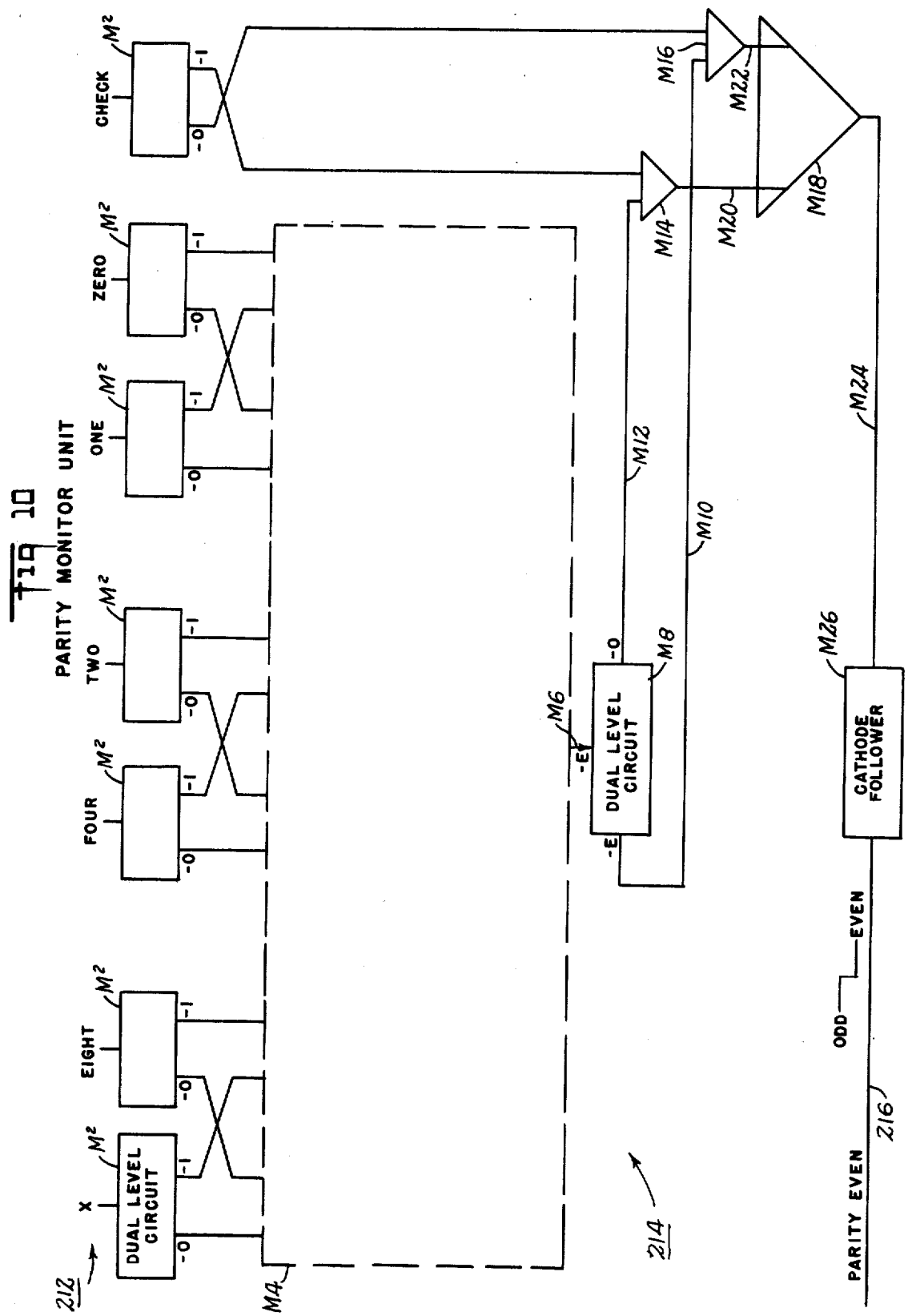

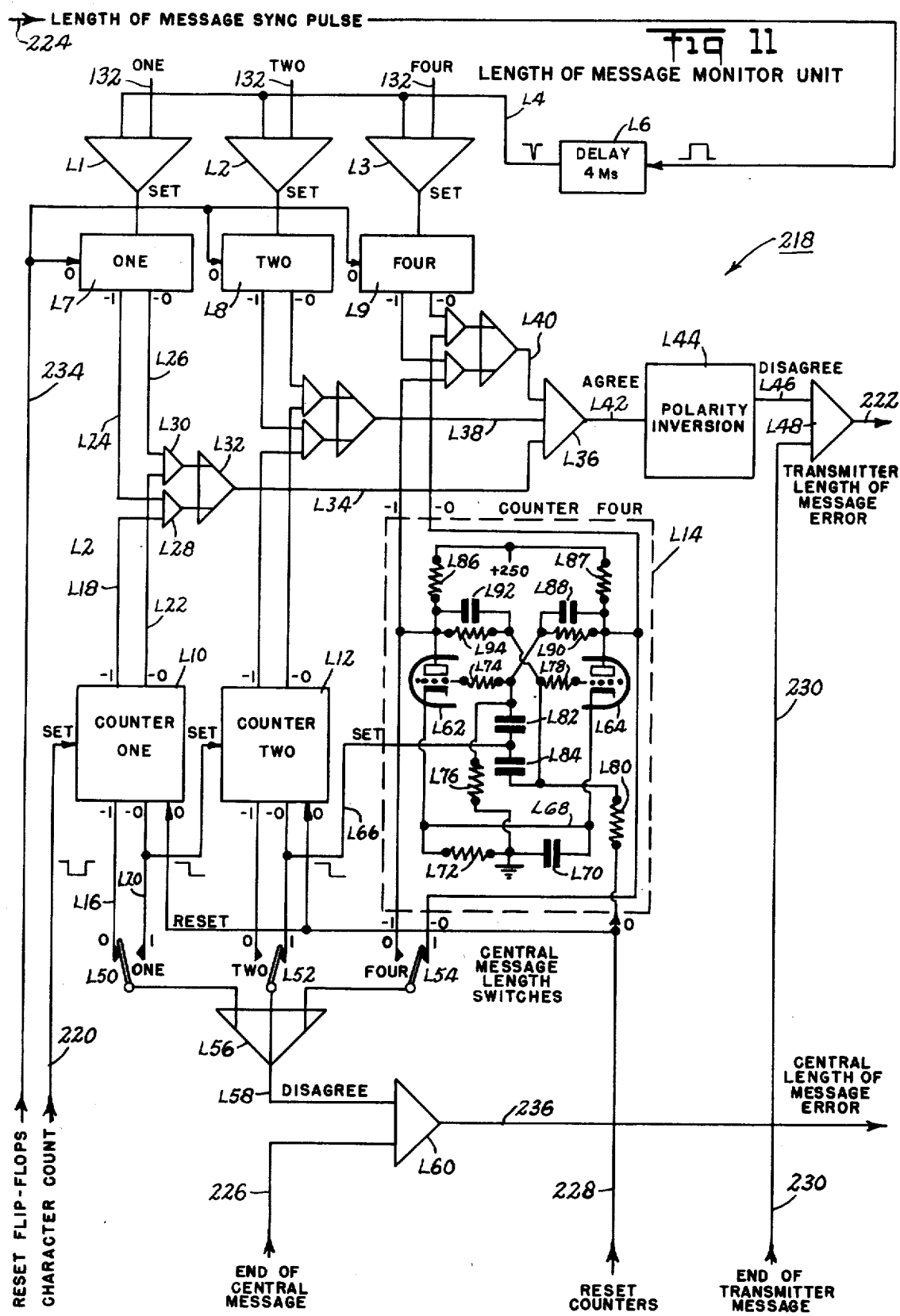

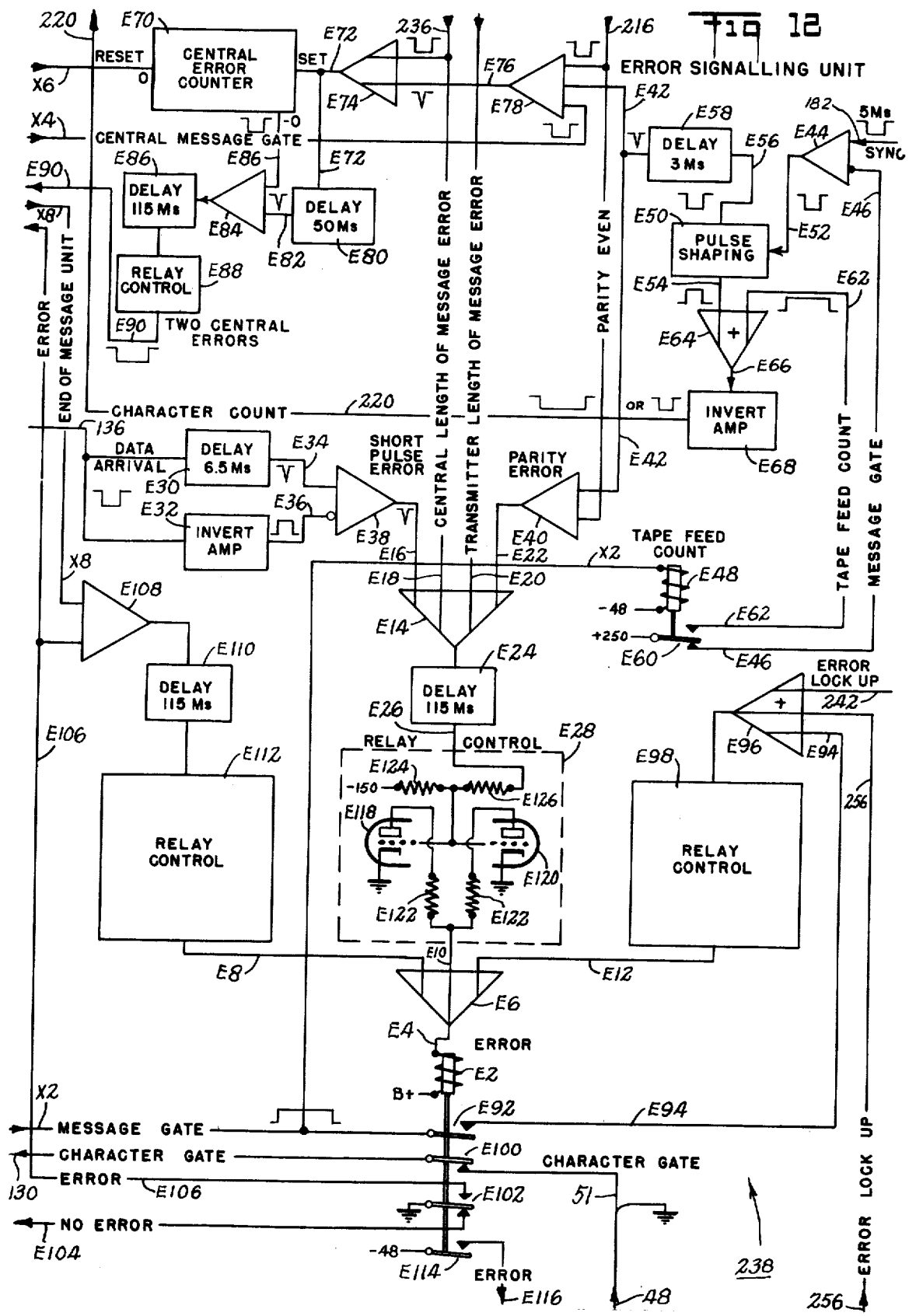

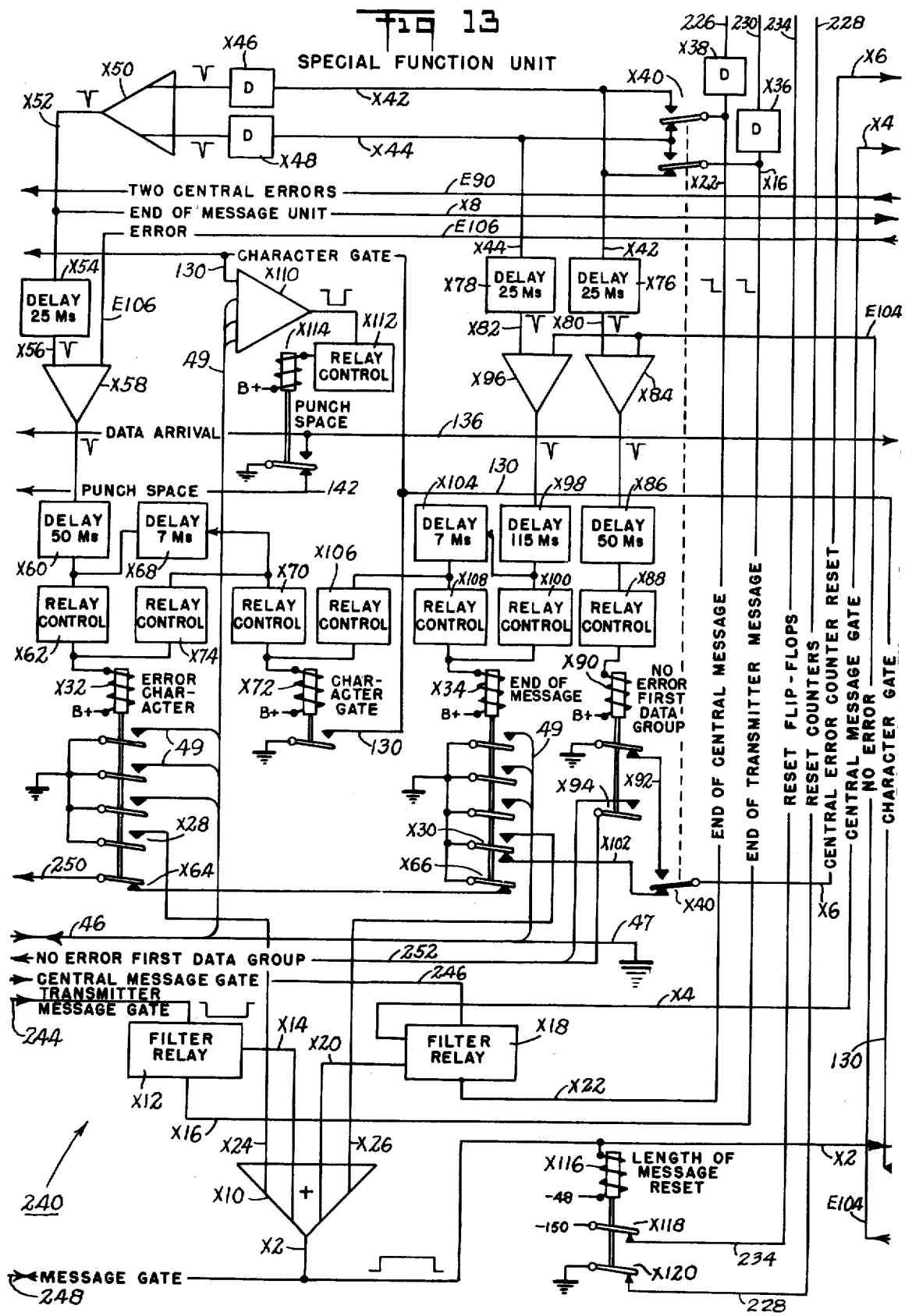

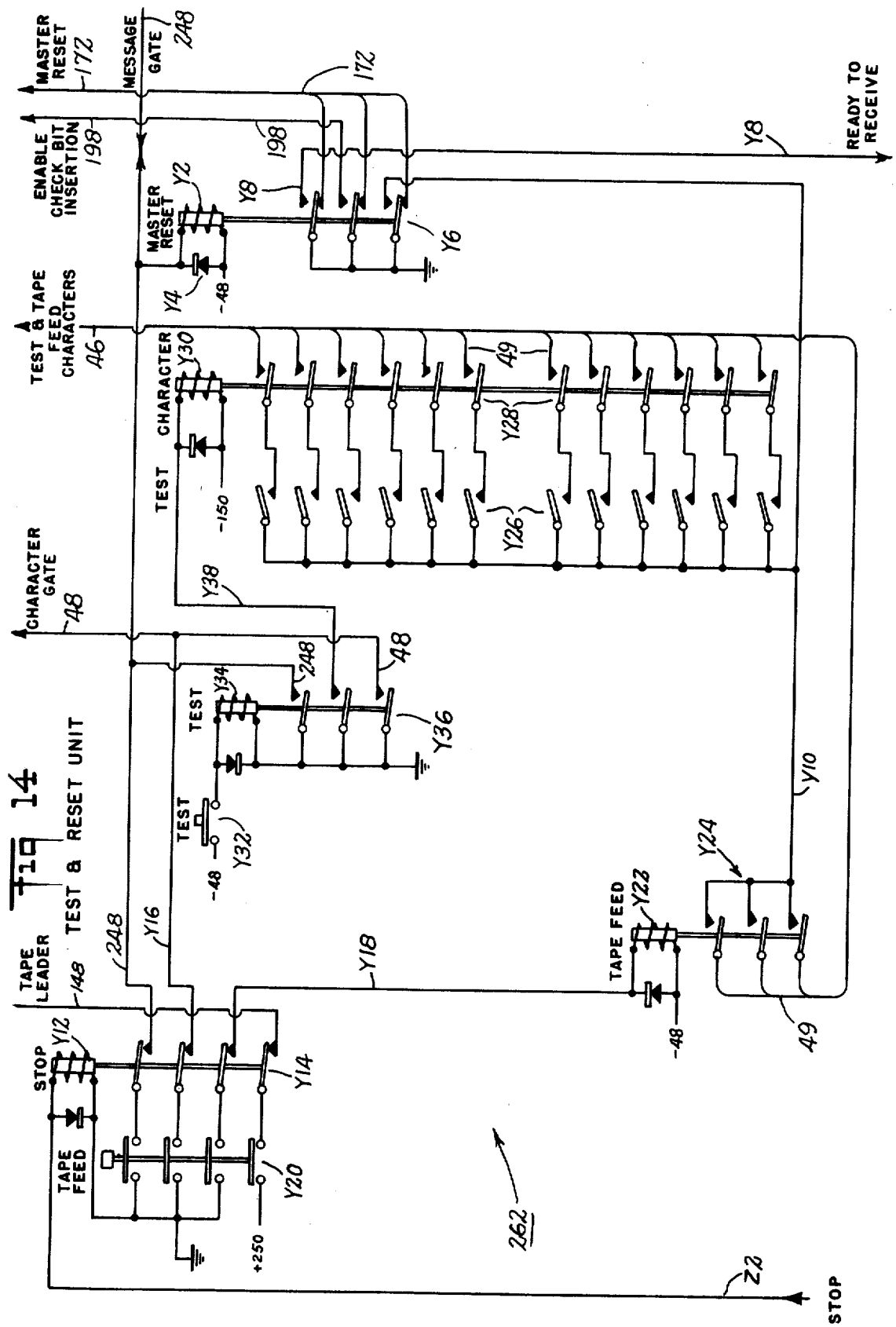

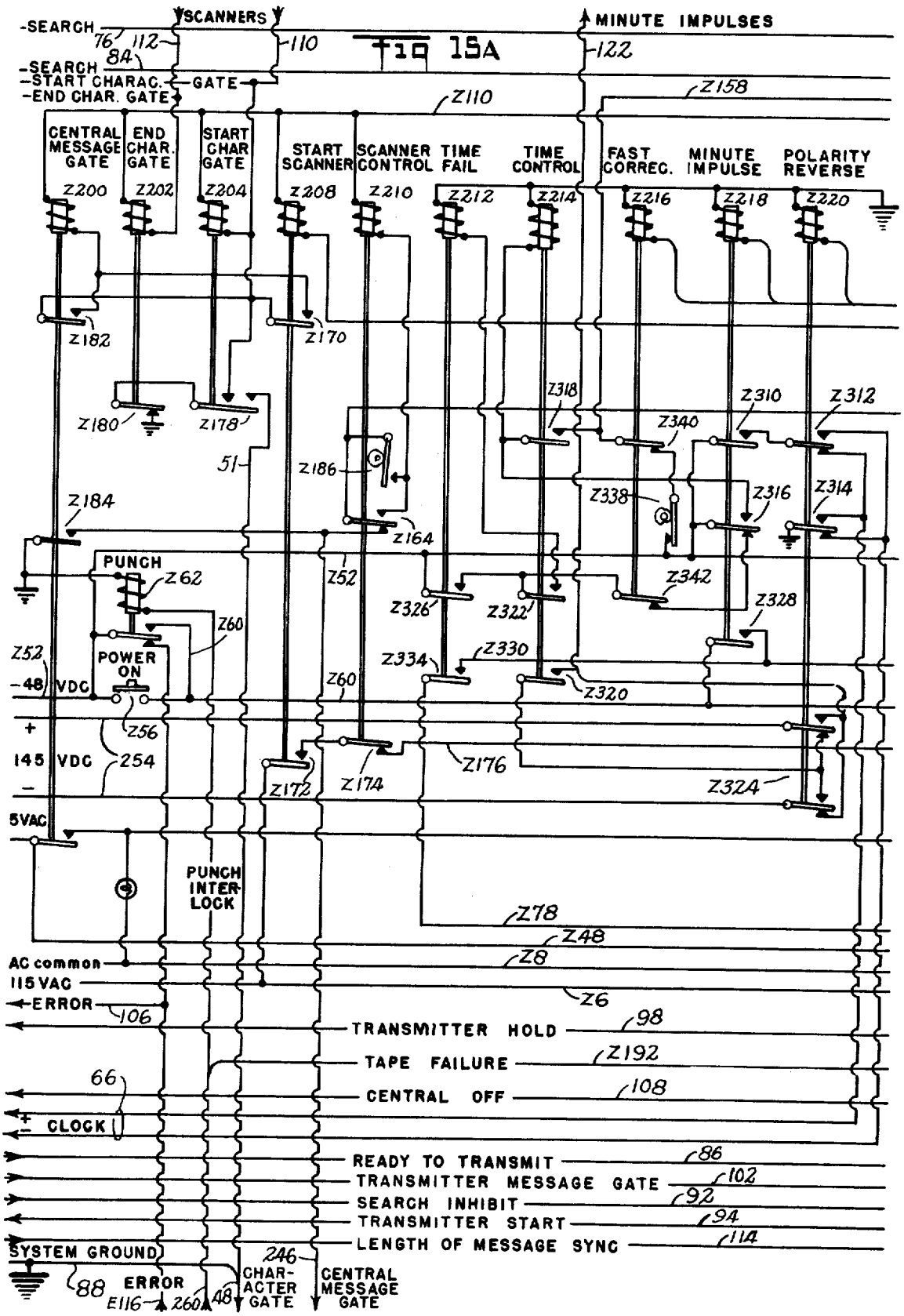

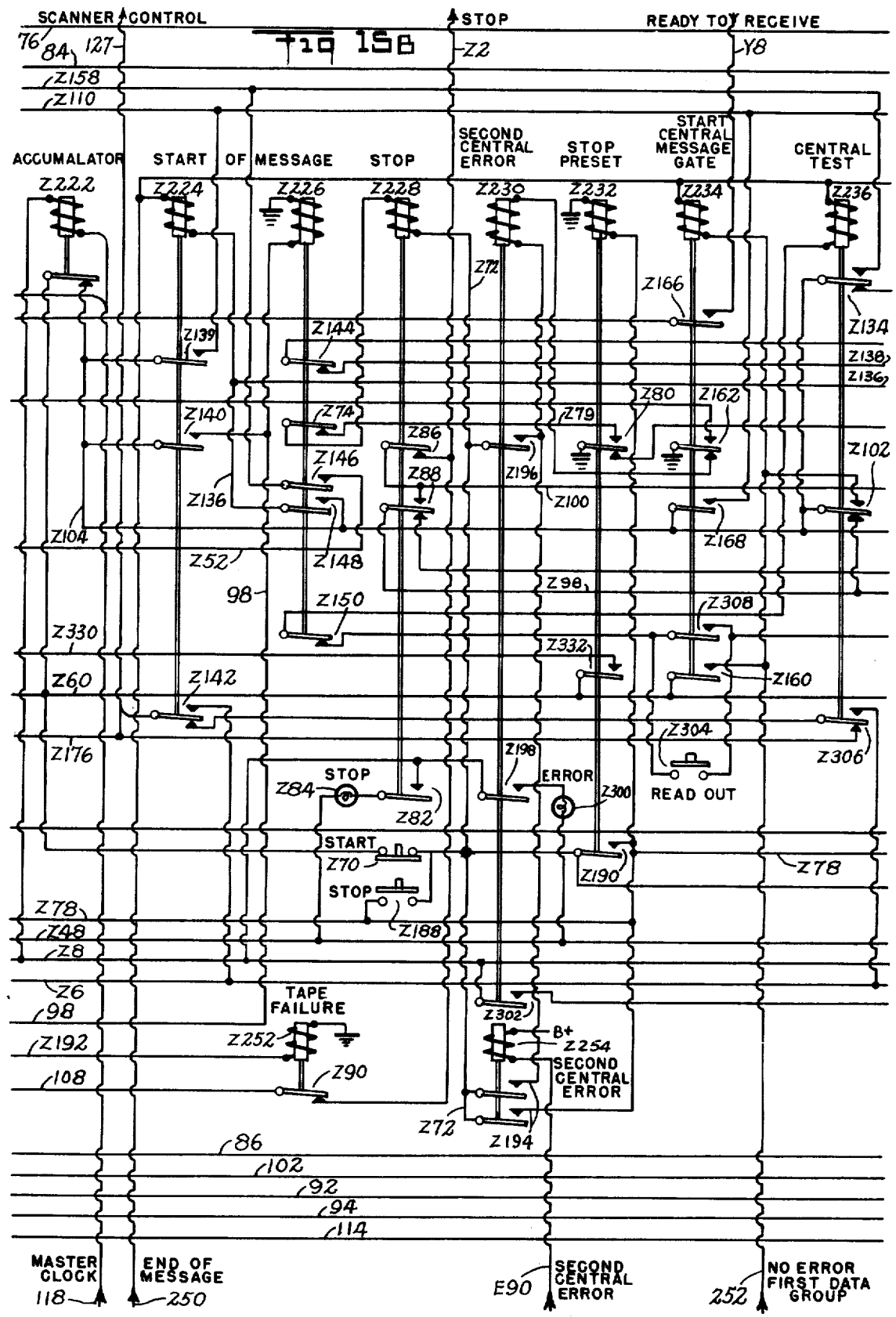

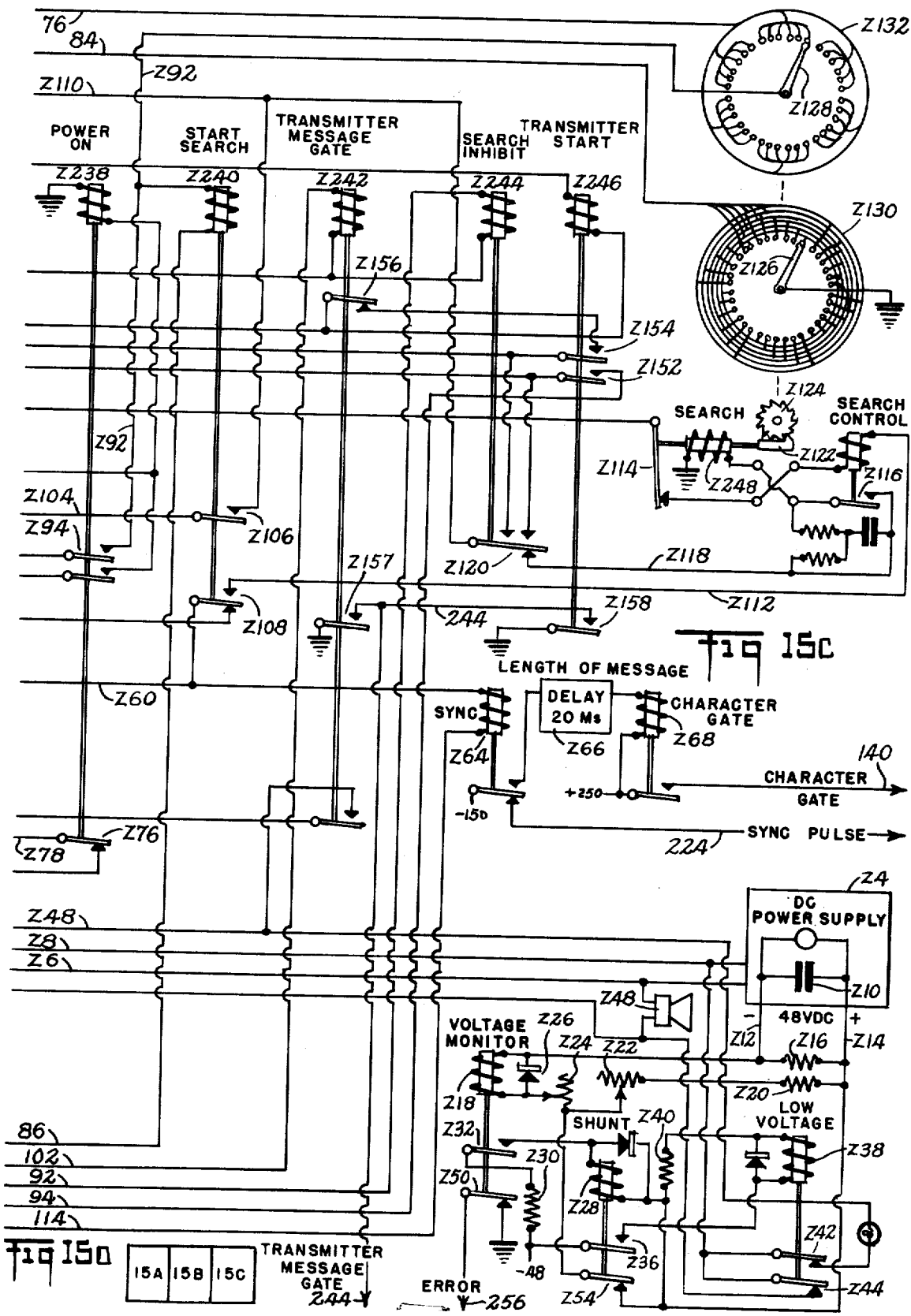

United States Patent Office 3,512,139
Patented May 12, 1970

---

3,512,139
SYSTEM AND APPARATUS FOR AUTOMATIC DATA COLLECTION
Andrew C. Reynolds, Jr., Waterbury, John F. Carragan, Woodbury, and George J. Yagusic, Watertown, Conn., assignors, by mesne assignments, to Control Data Corporation, Minneapolis, Minn., a corporation of Minnesota
Filed Dec. 31, 1959, Ser. No. 863,227
Int. Cl. G11b *13/00;* G06f *1/00, 7/00*
U.S. Cl. 340—172.5
37 Claims This invention relates to a system for automatic data communication and collection, and a central receiver-recorder for such a system. More particularly, the invention relates to an on line, or real time, system for use in collecting, sorting, collating, and transmitting data from a plurality of remote station transmitters to a central office receiver and recorder.

The automatic communication system of the present invention may be used, for example, in factories where a plurality of data transmitters may be installed in different areas, shops, or departments, for transmission of manufacturing data to the central receiver-recorder of the invention which may be located in a central accounting office. Such data may include: numbers of units manufactured on particular machines; designated job orders filled by machine operators; identity and hourly wage rates of the machine operators; total time required for each operation, etc. Alternatively, the apparatus of the invention may be used in warehouses and distribution centers for collection of order receipt and delivery time information for inventory control purposes, or in department stores for automatic collection of point of origin sales data, etc.

In a large factory, for example, there is at present a great deal of paper work required to be done in the various shops and departments, including such handwritten reports as time tickets for payroll entries, production and inventory control records, cost accounting, quality control inspection and scheduling reports, etc. For automatic central office computing, this mass of data now has to be individually punched into cards by manual operations, and the punched cards have to be verified by human operators before they can be fed to tabulating or computer apparatus. Various systems which have heretofore been suggested for expediting the flow of this information into the central office have included the use of closed circuit television, which introduces the added problem of human error in reading the data from the TV screen, and the use of intercommunicating telephone circuits, which frequently results in error and misunderstanding of the verbally-relayed information. In these prior art systems, the multiplicity of personnel involved results in divided responsibility, which is quite undesirable.

The principle of the data transmission and collection system of the present invention is to capture the required information at the point of origin, select, sort, and collate it automatically and substantially instantaneously, and then to transmit infallibly the desired data to a central receiver-recorder where it is permanently punched into tape or recorded on some other common language medium which can be fed directly into an automatic computer without the further intervention of possible human error.

In the copending application of A. C. Reynolds, Jr., et al., Ser. No. 841,926 filed Sept. 21, 1959, and entitled "Data Transmission Apparatus" which is assigned to the same assignee as the present application, there is disclosed the apparatus and circuitry of a data transmitter for the system of the present invention, including data card handling and reading apparatus, apparatus for encoding fixed and variable input information, and scanner and control circuits for such apparatus. The present application discloses some controls of the data transmitter of the present invention not shown in the above-identified application, which controls are used for intercommunication between the central receiver-recorder and the data transmitters in the system of the invention. This application also discloses and claims a preferred embodiment of a central receiver-recorder for the system of the invention.

An important feature of the invention is the transmission of information set into the data transmitters at any time in the form of a plurality of data cards, manually adjustable dials, and automatic telemetry signals over a plurality of data transmission channels equal in number to the number of code channels on the data cards.

Another feature of the invention is the initiation of transmission, selection and operation of a ready transmitter by means of a multiple conductor, coded search line system, using fewer search conductors than there are numbers of transmitters in the system.

A further feature of the invention is provision for the location and selection of another transmitter, which is ready to transmit during the progress of recording a transmission from a previously selected transmitter, thereby eliminating switching delays at the central office.

Another feature is the translation of the data received at the central receiver-recorder into a different code for a continuous recording medium, illustratively record tape, having either a greater or lesser number of channels than the data cards, and including a parity check channel.

Still another feature of the invention is the generation at the central receiver-recorder of space symbols to be recorded on the continuous medium when fields containing no symbols occur in a message.

A further feature is the provision of a synchronous shift register or buffer storage unit which synchronizes the incoming data characters to the recording rate of the continuous medium recorder.

A still further feature of the invention is a novel low voltage monitoring circuit which insures that no data will be lost during periods of fluctuating line voltage.

Still another feature of the invention is the continuous automatic resetting of all bistable elements of the receiver-recorder during periods when no message is being received.

A further feature of the invention is the provision at the central receiver-recorder for recording a central office message including instantaneous time, date, and additional preselected characters which may be recorded on the continuous medium either prior to or subsequently to recording of the received transmitter messages.

A still further important feature of the invention is the automatic transmission from the remote transmitters of a number corresponding to the total number of characters in each message being transmitted, and apparatus at the central receiver-recorder for comparing this number with the number of characters actually received.

Other features of the invention will become apparent from consideration of the following specification.

In the art of machine data handling and data processing, commonly referred to as automatic computing, one of the most serious problems has long been to find rapid and accurate means for feeding input information into the available high speed data processing equipment. While known types of electronic computers are capable of operating upon great quantities of data very rapidly, and can solve complex problems and record accurate answers very quickly, much time and human effort is required to assemble, sort, collate, compile, and insert the input data which is the information that the big computers are adapted to operate upon. The labor of skilled and semi-skilled persons, who may be engaged for many hours or days in preparing the required input data, is not only costly and susceptible of human error but by the time input media is prepared for the computer the usefulness of the data may be lost or greatly impaired.

It is to these problems of facilitating, expediting, and economizing on the input of statistical data into automatic data processing systems, and to assuring greater accuracy of such information, that the present invention is broadly directed.

In the applications of Curtis Hillyer, Ser. No. 556,120 filed Dec. 29, 1955 entitled "Automatic Information Transmission" and Ser. No. 686,070 filed Sept. 25, 1957 entitled "Data Transmission Apparatus," which applications are assigned to the same assignee as the present invention, there is disclosed a system and apparatus for automatic information transmission and collecting comprising a plurality of data transmitters connected to a central receiver-recorder. The system of the present invention is an improvement in the system disclosed in the above-identified Hillyer applications.

In order to manufacture a commercially acceptable automatic data collection system, many problems must be solved. For example, the message recorded at the central receiver-recorder must be extremely accurate and error free since the recording is made on a continuous medium which is adapted to be directly fed into a computer without the intervention of further verification. On the other hand, it is important that the message be transmitted to the central receiver-recorder in a very short period of time so that other transmitters connected to the central receiver-recorder which are ready to transmit their message will not have to wait very long, thus various commonly known forms of redundant transmission of information cannot be used.

The cable that connects the data transmitters to the central receiver-recorder must have a minimum number of conductors to transmit the information and to transmit various control signals, yet reduction of the number of conductors must not unduly increase the complexity of the data transmitters or the central receiver-recorder. In particular, since a plurality of data transmitters will ordinarily be connected to a single central receiver-recorder, in order to insure minimum system cost the data transmitters must be kept as simple as possible.

Since a data transmitter, in a properly designated system, may be much less complex and costly than a central receiver-recorder, it becomes important to maximize the number of transmitters which may be connected to one receiver-recorder. This means that the time required for transmission and the necessary interval between messages must be reduced to a minimum. When this is done additional transmitters may be connected to a single central receiver-recorder without increasing the waiting time for a ready transmitter during peak loading periods. Furthermore, the connection of each transmitter to the cable should be kept as simple as possible. Ideally the system should be completely parallel, and therefore each transmitter should be effectively connected to each conductor of the cable.

The common cable used in the system of the present invention will necessarily be in proximity to electrical noise generators, for example, heavy electrical machinery in factories. The system must, therefore, have a very high degree of discrimination between random interference noise signals and the information signals being transmitted from the data transmitters. As previously stated, since time is of the essence in the system, various forms of redundant transmission in time cannot be used. Other means had to be found which would assure that the central receiver-recorder be free from various transient and noise signals on the data transmission lines.

In order to minimize further the number of conductors required in the common cable, it is desirable that all information transmitted to the central receiver-recorder from the remote data transmitters be transmitted in a common language that is in one particular code. Thus the information from data cards, variable dials, telemetering inputs, special characters, etc., should all arrive at the central receiver-recorder in the same code; yet this form of transmission must not unduly complicate the apparatus at the data transmitters. Any translation from one code to another should therefore take place at the central receiver-recorder.

As discussed in the above identified application of Andrew Craig Reynolds, Jr., et al., the simplest method of achieving this objective is to transmit all the data from each data transmitter in the code of the data cards. Means must then be provided at the central receiver-recorder for translating this code into the common language code adapted for recording on the continuous medium chosen as the output of the central receiver-recorder.

Also, since in the present state of the art it is possible to provide continuous medium recorders having much higher clock rates (at which characters may be recorded) than the rate at which characters may be transmitted from the data transmitters; and since available continuous medium recorders are generally demand devices, that is, they request a character when they are ready to record a character; the incoming characters from the data transmitters of the invention are temporarily stored in a buffer storage and synchronized with the clock rate of the continuous medium recorder prior to their being recorded. A buffer storage unit for this purpose accepts characters as they are received from the data transmitters and supplies characters for recording to the continuous recorder upon request. Furthermore, since the rate at which characters are transmitted from the data transmitters may vary from the normal average rate, due to variations in line voltage at the data transmitters, or differences in hole spacing and hole size on the data cards, the buffer storage unit of the invention must be able to store enough characters prior to recording so that no characters are lost, and yet it is desirable that the storage means be of minimum size in order to minimize cost.

A central receiver-recorder for an automatic data collection system of this nature must, for some users thereof, be able to supply characters for recording on the continuous medium in the absence of received characters from the data transmitters. That is, for example, many of the users of such a data system will not wish to punch a character on their data cards between fields of data characters which they wish to have recorded on the continuous medium with space characters inserted therebetween. In this case, the central receiver-recorder must be adapted to provide the proper number of space characters for the continuous medium recorder between receipt of the data characters as read from the data cards. As the rate of transmission from the data transmitters varies, the central receiver-recorder must be able to recognize the early or late receipt of a data character so that no space character will be improperly recorded by the continuous medium recorder.

Since many computing machines using the continuous medium records produced by central receiver-recorders are provided with a parity monitoring means for detecting errors in the characters recorded, the receiver-recorder of the present invention is provided with parity insertion means for insuring that each character recorded on the continuous medium has a common parity. It is also desirable that this parity insertion take place early in central receiver-recorder data handling, after receipt of the data, so that parity monitoring, either at the central receiver-recorder or at machines using the continuous medium record, will detect errors occurring anywhere in this apparatus of the invention.

As will be discussed in more detail in the following description of the invention, one form of error detection used in the present invention is achieved by transmitting with each message a code number corresponding to the number of characters in that message, and then comparing at the central receiver-recorder the code number received to the number of characters received. Ideally the transmission of this code number should not unduly increase the number of conductors of the main cable, nor should the transmission thereof require any appreciable period of time. Another form of error detection and suppression which is provided in the present system includes provision for monitoring the AC line voltage at the central receiver-recorder and shutting down the system whenever the line voltage drops to such a low value that the number of possible errors increases.

Upon discovery of various errors, including those discussed above, differing forms of action should be taken. For example, if an erroneous character is recorded on the continuous medium an error symbol must be recorded thereon so that the erroneous information will be disregarded by any machines subsequently using the continuous medium record. If an error occurs which cannot be corrected at the central receiver-recorder, the data transmitter transmitting the erroneous message must be notified to retransmit its message so that no information is lost in the system. If the central receiver-recorder is disabled, or producing errors at a rate greater than a predetermined allowable minimum, the central receiver-recorder must be automatically shut down and notification given to the operators, both at the central office and at the remote data transmitters. Also, if the central receiver-recorder is adapted to record a central message, together with each message received from the data transmitters as in the preferred embodiment disclosed, it is desirable to differentiate between central and transmitter errors so that appropriate corrective action may be taken to minimize time delays, such as by repeating the central message only when a central message error occurs rather than repeating both the transmitter and the central message.

The central receiver-recorder must therefore be able to record various characters or symbols on the continuous medium such as space, end of message, and error characters. It is also desirable that together with each recorded transmitted message the central receiver-recorder record the time, the date, the shift and various special characters such as central receiver identification and type of data recorded. Since some users of the apparatus prefer that the central message be recorded on the continuous medium before the transmitted message, and others prefer that it be recorded after the transmitted message, provision must be made in the central receiver-recorder for a convenient and relatively simple change over between these different sequences of recording.

Accordingly, one object of the present invention is to provide a data transmission and collection system of the character above described which, without the use of complex modulating and demodulating equipment, employs a cable having a minimum number of conductors connecting the transmitters and receiver-recorder of the system.

Another object of the invention is to provide a data transmission and collection system of the above character wherein all transmitters of the system are connected to the receiver-recorder via common cable to which additional transmitters may be added at will.

A further object of the invention is to provide a data transmission and collection system of the character above described in which a ready transmitter is located and selected by the receiver-recorder during the time when another transmitter is transmitting a message to the central receiver-recorder, and whereby a selected transmitter is immediately activated upon completion of a prior transmission.

A still further object of the invention is to provide a data transmission and collection system of the above character in which a ready transmitter is located and selected for transmission to the central receiver-recorder by means of a plurality of search lines, the total number of search lines being less than the number of transmitters in the system.

Another object of the invention is to provide a data transmission and collection system of the above character wherein each line of the common cable connecting the central receiver-recorder to each transmitter remains permanently connected to each transmitter.

Still another object of the invention is to provide a central receiver-recorder for use in a system of the above described character.

A further object of the invention is to provide a central receiver-recorder of the above character having simple apparatus for locating and selecting a calling transmitter which is ready to transmit.

Yet a further object of the invention is to provide receiver-recorder apparatus of the above character which is unresponsive to stray electrical disturbances, noise, or false pulse signals induced in the main communication cable.

Another object of the invention is to provide a receiver-recorder of the above character which records time, date and station identifying data, in addition to recording each transmitter message.

Still another object of the invention is to provide a central receiver-recorder of the above description which will generate characters on command for recording in the absence of the receipt of characters from the transmitter, such as the generation of "punch all holes" for tape leader when punched tape is the output medium of the system, and the generation of "space" symbols to be recorded in the absence of characters on the data cards being read.

Still another object of the invention is to provide a shift register or buffer storage system for the central receiver-recorder which synchronizes the incoming characters with the recording speed of the output medium.

Yet still another object of the invention is to provide a buffer storage of the above description consisting of a plurality of single character storage units in which the final stage of storage will supply a stored character upon request of the continuous medium recorder.

A further object of the invention is to provide a buffer storage of the above description in which the characters stored are always and immediately transferred to the last empty storage unit prior to delivery to the continuous medium recorder.

Still another object of the invention is to provide a central receiver-recorder of the above character which generates a parity check at an early stage in the flow of information from the transmitters to the continuous medium recorder.

Yet another object of the invention is to provide a data transmission and collecting system of the above description in which a character is transmitted to the central receiver-recorder from each transmitter indicating the length of the message being transmitted, and in which the actual length of message received by the central receiver-recorder is compared therewith.

Yet still another object of the invention is to provide a data transmission and collection system wherein there is generated at each transmitter, whenever a message is being transmitted, a message gating signal which continues for the duration of such transmission.

A further object of the invention is to provide a data transmission and collection system of the above description in which each transmitter during its transmission generates a character gating function which continues only for those periods during which characters are to be transmitted by the transmitter.

A still further object of the invention is to provide a data transmission and collection system of the above description in which the central receiver-recorder is responsive to a message only during periods when both the message and character gating signals exist.

Another object of the invention is to provide a central receiver-recorder of the above description which generates central message and character gating signals during the recording of the central message.

A yet further object of the invention is to provide a central receiver-recorder of the above character which monitors received signals for length of message, parity, low voltage, and continuous medium recorder malfunctions and errors, and upon error detection provides appropriate correcting signals to itself and to the transmitters connected to it.

Yet still a further object of the invention is to provide a central receiver-recorder of the above character which will send an error signal to a transmitting transmitter whenever the transmitter should retransmit its message, and which will notify all transmitters whenever a central malfunction has occurred that renders the central receiver-recorder incapable of receiving messages.

Another object of the invention is to provide a central receiver-recorder of the above description which generates distinctive characters, such as space, end of message, and error characters, for recording on the continuous medium when required.

Other objects of the invention will in part be obvious and will in part appear hereinafter.

For a fuller understanding of the nature and objects of the invention, reference should be had to the following detailed description taken in connection with the accompanying drawings, in which:

FIG. 1 is a perspective view of the upper portion of a central receiver-recorder unit of the invention, showing the control panel, time indicating clock and punch mechanism thereof;

FIG. 2 is a diagram of the overall data transmission and collection system of the present invention showing the parallel connection of a plurality of transmitters to a central receiver-recorder by means of a common cable;

FIG. 3 shows a portion of a punched paper tape, the output medium of the preferred embodiment of the central receiver-recorder of the invention;

FIG. 4 which comprises FIGS. 4A, 4B, 4C and 4D, a block diagram, partially in schematic form, of a preferred embodiment of the complete system of the present invention;

FIG. 4A is a block diagram, partially in schematic form, of a preferred form of transmitter of the invention;

FIGS. 4B, 4C and 4D comprise a block diagram, partially in schematic form, of a preferred embodiment of the central receiver-recorder of the present invention;

FIG. 4E is a diagram showing how FIGS. 4A, 4B, 4C and 4D may be put together to form FIG. 4;

FIG. 5 is a logic block diagram of the translator of the central receiver-recorder;

FIG. 5a is a schematic wiring diagram of that portion of the translator shown within a dotted box in FIG. 5;

FIG. 6 is a logic block diagram, partially in schematic form, of the sync insertion unit of the central receiver-recorder;

FIG. 7 is a logic block diagram, partially in schematic form, of the data flow control unit of the central receiver-recorder;

FIG. 8 is a logic block diagram of a preferred form of shift register or buffer storage according to the present invention;

FIG. 9 is a logic block diagram, partially in schematic form, of the check bit insertion unit of the central receiver-recorder;

FIG. 10 is a logic block diagram of the parity check unit of the central receiver-recorder;

FIG. 11 is a logic block diagram, partially in schematic form, of the length of message monitor unit of the central receiver-recorder;

FIG. 12 is a logic block diagram, partially in schematic form, of the error signaling unit of the central receiver-recorder;

FIG. 13 is a logic block diagram, partially in schematic form, of the special function unit of the central receiver-recorder;

FIG. 14 is a schematic diagram of the test and reset circuits of the present invention; and FIG. 15 is a schematic circuit diagram of the control circuits of the central receiver-recorder and comprises FIGS. 15A, 15B and 15C;

FIG. 15D is a diagram showing how FIGS. 15A, 15B and 15C may be put together to form FIG. 15.

Similar reference characters refer to similar elements throughout the several views of the drawings.

The invention accordingly comprises the means and features of operation and combinations of functions, and the relation of one or more of such operations and functions with respect to each of the others of the system; and the apparatus embodying features of construction, combinations of elements, and arrangements of parts which are adapted to affect such operations and functions, all as exemplified in the following detailed disclosure, and the scope of the invention will be indicated in the claims.

GENERAL DESCRIPTION

A general understanding of the present invention may be gained by reference to FIGS. 1, 2, 3 and 4. Referring to FIG. 2, a plurality of data transmitters 20 are connected to a receiver-recorder 22 by means of a common main cable 24 over which all transmissions between the data transmitters 20 and the receiver-recorder 22 take place. As shown in FIG. 1, the receiver-recorder has a high speed tape punch 26 which records the messages received from the data transmitters on punched paper tape 28 a portion of which is shown in FIG. 3. As shown in FIG. 3, the punched paper tape 28 comprises seven information channels or rows of holes 30, space for an eighth information channel 32, and a plurality of tape feed sprocket holes 34 which are punched in the tape together with the holes punched in the information channels 30. Each vertical column of holes in the tape comprises a character in the message recorded on the tape. As can be seen in FIG. 3, provision has been made in the code so that each vertical column always contains an odd number of holes in the information channels 30, and therefore all recorded characters are of the same parity. Referring to FIG. 1, there is located on the face of the central receiver-recorder a control panel 36 having two rows of signal lamps 38–39, a row of control push buttons 40, and a time indicating clock 41.

Now referring to FIG. 4 (comprising FIGS. 4A, 4B, 4C, and 4D), there is shown the complete system of the present invention. Referring to FIG. 4A, a data transmitter 20 is shown with a plurality of data cards 42 inserted therein being read by a read-head 44 which reads the characters punched in the data cards 42 character-by-character (column-by-column) and transmits these characters over a plurality of Hollerith lines 46 to the central receiver-recorder 22. The read-head 44 also transmits to the central receiver-recorder 22 a character gating signal over separated character gate lines 48.

The Hollerith lines 46 are also connected to a variable information coder 25 which has a plurality of manually settable dials 50 and push buttons 52; and to a fixed information plug board 53. Transmission of a "ready to transmit" signal from the data transmitter 20 is initiated by the operator pressing the transmit button 54 after insertion of the data cards 42, and setting of the variable dials 50 and push buttons 52. When the central receiver-recorder recognizes the calling transmitter and is ready to receive its message a "transmit" signal is sent from "Central" 'to the "ready" transmitter to initiate transmission. Control circuits 56 at the transmitter control the read-head 44 and a scanner 58 which properly sequences the information to be transmitted over the Hollerith lines 46, as is more fully detailed in the above-identified copending application of A. Craig Reynolds, et al. As will be understood by those skilled in the art, a telemetry coder 60 may be incorporated into the data transmitter 20 to receive data on telemetry data lines 62 and to encode such data for automatic scanning by the scanner 58, in substantially the same manner as the operation of the variable information coder 25. Also shown in FIG. 4A is a slave time indicating clock 64 controlled by the clock lines 66 for the information and convenience of the operator of the data transmitter.

The Hollerith lines 46 comprise twelve pairs of conductors, each pair of which corresponds to one channel or one row of holes recorded on the data cards 42. A signal on any pair of the Hollerith lines indicating a hole on a card is called a bit, thus throughout the system characters are indicated by bits in different combinations of information channels. This is known as parallel binary coding since all information is reduced to the presence or absence of a signal or bit on an information channel. The character gate lines 48 comprise a pair of conductors over which a signal is transmitted from the read-head 44 whenever characters may be read by it. Thus, when the read-head passes between two data cards, no signal is sent over the character gate lines 48 indicating that any spurious signals produced on the Hollerith lines 46 are to be disregarded as is further detailed in the above-identified Reynolds et al. application.

Still referring to FIG. 4A, when the operator at the transmitter 20 presses the transmit button 54, a ready to transmit signal is sent to the receiver-recorder on a ready to transmit conductor 86 of the main cable 24. Control circuits 90 (FIG. 4B) at the central receiver-recorder are responsive to this ready to transmit signal and successively energize pairs of search conductors 76 and 84 of the main cable 24 until a pair is energized which is connected to a location relay R4 at the calling transmitter 20. Energization of the location relay R4 causes a search inhibit signal to be sent to the central receiver-recorder on a search inhibit conductor 92 of the main cable 24. When it is determined at the central receiver-recorder that it is ready to receive the message from the located transmitter, a transmitter start, and a transmitter hold signal are sent over conductors 94 and 98, respectively, of the main cable 24 to the transmitter 20. These signals cause energization of a transmitter hold relay R7 at the located transmitter. Control element 100 of hold relay R7 initiates transmission of the message by operating contacts in the control circuits 56 of the transmitter. At this time the search lines 76 and 84 are disconnected from the location relay R4, the ready to transmit signal on conductor 86 ends, and a signal called the transmitter message gate signal is sent from the transmitter 20 on conductor 102 of the main cable 24 indicating to the control circuits 90 of the central receiver-recorder that a transmitter message is in progress. All information to be transmitted is then transmitted serially, character-by-character, over the twelve pairs of conductors of the Hollerith lines 46. The order of the transmission of the information between the data cards, variable information, fixed information, and telemetry information, is immaterial and may be preprogrammed by the user of the system.

For purposes of illustration a system will be described wherein the cards are read first, followed by the fixed and the variable information, and then by the telemetry data. As the cards are read, a character gate signal is sent to the central receiver-recorder over the character gate lines 48 when characters are to be transmitted from the read-head 44. After reading of the data cards 42, the control circuits 56 cause the scanner 58 to sequentially transmit over the Hollerith lines 46 the information set into fixed information plugboard 53, then the variable information coder 25 followed by the telemetry information as encoded by the telemetry coder 60.

The twelve pairs of the Hollerith lines 46 correspond to the twelve rows of punched holes on the data cards 42 (FIG. 4A). Each pair of lines is used in the preferred embodiment of the invention to transmit one channel of the Hollerith code from the transmitters 20 to the central receiver-recorder 22. The channels are herein called the "zero," "one," "two," "three," "four," "five," "six," "seven," "eight," "nine," "ten," "eleven," and "twelve" channel respectively.

The scanner 58, as it begins transmission of the fixed, variable and telemetry information, sends a start character gate signal to the central receiver-recorder on conductor 110 of the main cable, and at the end of its scan an end character gate signal on conductor 112 of the main cable. Just prior to the transmission of a length of message character, the scanner transmits a length of message synchronization signal on conductor 114 of the main cable.

The main cable 24 also includes "error" and "central off" conductors, 106 and 108 respectively, and a system ground conductor 88, whose functions will be discussed in the specific description to follow.

As will be further detailed below, the above generally described apparatus at the transmitter permits a transmitter which is ready to transmit to send to the central receiver-recorder a ready to transmit or start search signal which causes the central receiver-recorder to select that transmitter for transmission. The transmitter when selected then sends to the central receiver-recorder a search inhibit signal which allows the central receiver-recorder, when it is ready to receive the message from the selected transmitter, to send out a short transmitter start signal simultaneously with a transmitter hold signal which is continuous throughout a message. These signals initiate transmission at the selected transmitter only, and during transmission therefrom the central receiver-recorder remains responsive and ready to transmit signals from other, non-transmitting, transmitters of the system, and will select one of these for successive transmission, immediately after cessation of the transmission currently in progress.

Referring now to FIGS. 4B, 4C and 4D the central receiver-recorder 22 of the present invention includes a master clock 116 which is adapted to provide the control circuits 90 of the central receiver-recorder with an impulse for each minute of elapsed time. These impulses are transmitted to the slave clocks 64 of the transmitters 20 over the clock conductors 66 of the main cable 24. The master clock 116 is of a commonly known type including an accumulator mechanism which stores fast correction when the power is cut off to the clock and generates rapid impulses when the clock is again powered to rapidly correct the secondary clocks of the system. The minute impulses produced by the master clock 116 are fed via the clock control cable 118 to the control circuits 90 where the minute impulses are qualified before being set out over the clock conductors 66 of the main cable 24. The central receiver-recorder includes a time data coder 120, to which the qualified minute impulses are supplied over the minute impulse conductors 122. The time data coder 120 may comprise a plurality of so-called clock drums such as those disclosed in the copending application of Michael Juhas, Ser. No. 658,451 filed May 10, 1957, entitled "Switch Actuating Timers," which application is assigned to the same assignee as the present application. The switch actuating clock drums or program devices are used to close contacts supplying signals on the appropriate Hollerith lines 46 to indicate time, date, work shift, etc. A fixed data plugboard or encoder 124 which is included in the central receiver-recorder and connected to the Hollerith lines 46 supplies preprogrammed invariant characters to the message. A scanner 126, controlled by the control circuits 90, scans the time data of the time coder and the fixed data coder, character-by-character, in the same manner as the scanner 58 (FIG. 4A) of the transmitter 20, and reference may be had to the above-identified Reynolds et al. application for a fuller explanation of the operation of the scanner and the time and fixed data encoders.

The control circuits 90 receive, or generate, signals transmitted between the transmitters 20 and the central receiver-recorder 22, over the various conductors of the main cable 24, except for the character gate and data character signals which are transmitted over lines 48 and 46 respectively to the translator 128. The control circuits 90 are preferably mounted on a removable chassis so that the control circuits may be removed from the central receiver-recorder and easily interchanged with another chassis whereby one chassis will properly control the central receiver-recorder in a manner to record the central receiver message, consisting of the time and fixed data, prior to the transmitter message, while the other chassis will control the central receiver-recorder to record the transmitted message first. In the central receiver-recorder described herein the transmitter message is recorded first. The control circuits 90 also control the power supplied to the system and place the central receiver-recorder in a stop or stand-by condition when various power controlling interlock functions are fulfilled, but reception of messages would not be proper. Such conditions occur for example, at the end of a tape reel, or when the tape is broken, also when the central receiver-recorder is first turned on, or when the line voltage supplied to the central receiver-recorder has dropped below a preset minimum, and when tape is being automatically fed through the punch punching all channels for tape leader, as well as after the central receiver-recorder has made two consecutive errors in recording its message on the tape. The control circuits 90 also indicate various functions on the front panel 36 (FIG. 1) at signal lights 38 and 39. An audible alarm to signal operators of various malfunctions requiring operator attention is controlled by control circuits 90.

All characters to be punched on the tape 28 are sent on the Hollerith lines 46 to a translator unit 128 which, when receiving a character gate signal on character gate line 130, translates the information from the twelve channel Hollerith code to a six channel code for recording on the punched tape 28. The six channels are herein called the "zero," "one," "two," "four," "eight" and "X" channel respectively. The output code appears on translator output lines 132, one of the lines 132 corresponding to each channel of the tape code. The bits of the characters received on the Hollerith lines 46 consist of pulses of approximately nine milliseconds (9 ms.) duration and the characters arrive at an average rate of one character every seventeen milliseconds (17 ms.). The translator unit 128 also generates a data arrival signal which is a combination of all the pulses or bits of each character arriving on the Hollerith lines 46, that is a pulse arriving on any one of the Hollerith lines 46 will produce a data arrival pulse at the translator 128, and if a character includes pulses on several Hollerith lines the data arrival pulse will begin with the arrival of the first pulse and end at the termination of the slowest pulse of the character. The data arrival signals appear as an output of the translator unit 128 on data arrival lines 134 and 136.

A sync insertion unit 144 delays the data arrival signal on line 134 by a fixed increment of time and provides the delayed signal as an input synchronization signal on sync insertion output line 146. The sync insertion unit 144 also input synchonization pulses on line 146 in the absence of data arrival pulses under certain conditions which will be discussed more fully hereinafter; and when supplied with a tape leader signal on tape leader line 148 from the control circuits 90, unit 144 produces continuous input synchronization pulses on output line 146.

A data flow control unit 150 (FIG. 4C) receives the input synchonization pulses on line 146 and produces data interrogation pulses, on data interrogation line 152, corresponding to the synchronization insertion pulses. A data interrogation pulse interrogates a plurality of AND gates 154 and if a signal (bit) is present on any of the tape code lines 132 the AND gate connected thereto will provide a set signal on its respective set line 146, to set a respective data storage flip-flop 158, whereby the bit is stored. A pulse on tape feed set line 159 occurring simultaneously with the data interrogration pulse sets a tape feed flip-flop 160, which together with the data flip-flops 158 comprises a storage unit 162 (Storage I) of the system wherein each character is received as it arrives and stored temporarily.

In the preferred embodiment of the invention tape punch 26 (FIG. 4D) is capable of recording a character on tape 28 every sixteen milliseconds (16 ms.). Thus it would appear that only one stage of storage should be needed to synchronize the incoming characters (one each 17 ms.) to the punch rate. However, due to unavoidable variations in the transmission rate at the transmitters, some characters may arrive soon and others late. This is due to AC line voltage variations which affect the readhead's speed in traversing the data cards, and the scanner's angular velocity, and also to variations in hole size and spacing on the data cards.

Therefore, in the preferred embodiment of the invention, another storage unit 164 (Storage II) is provided which includes data storage flip-flops 166, corresponding to the data storage flip-flops 158 of Storage I, tape feed flip-flop 168, corresponding to tape feed flip-flop 160 of Storage I, and a check bit flip-flop 170 which, as will be explained hereinafter, is set whenever the data in Storage I is transferred to Storage II and an even number of data flip-flops 158 contain bits. As will appear from the description of the data flow control unit 150 to follow, the number of Storage units required is dependent on the maximum variation in the character arrival rate which may be tolerated in the system. The data flow control unit 150, upon receipt of a master reset signal on line 172, continuously provides repetitive reset signals on lines 163 and 184 (see FIG. 7), which repeatedly reset the flip-flops of Storage I and Storage II respectively.

Whenever a character is set into Storage I the data flow control unit 150 will, if Storage II is not then storing a character, immediately reset Storage I. Upon being reset, Storage I transfers the character contained therein to Storage II by means of the connecting conductors 190. At the same time a check bit insertion unit 192, connected to the reset Storage I line 174 (see FIG. 9), provides a signal on a set check line 194 which stores a check bit in the check bit flip-flop 170 of Storage II, provided that the check bit insertion unit 192 has determined from its monitoring of lines 190 and 196 that an even number of data flip-flops 158 were set when the character was in Storage I. This results in punching a hole in a seventh channel of tape 28 herein called the "check" channel.

Tape punch unit 26 (FIG. 4D) is a demand device which requests input of a character when it is ready to operate. This request for data is in the form of a signal on punch synchronization line 200. This punch sync signal occurs in the preferred embodiment of the invention every 16 milliseconds. The central receiver-recorder contains output circuits 202 which comprise a tape feed thyratron circuit 204 and data thyratron circuits 206 (including the six translated information channels and the additional check channel set by the check bit insertion unit 192). When a character is stored in Storage II, receipt of the punch synchronization signal on line 200, at the tape feed thyratron output circuit 204, causes its associated thyratron to fire, thereby energizing tape feed output line 208 which energizes the tape feed magnet at the tape punch 26. An output synchronization signal is also produced on line 182 for the data flow control unit 150, which then produces a fire data output circuits signal on line 178, causing the data thyratron output circuits 206 to energize data output lines 210 if their respective Storage II flip-flop 166 contains a bit, thus energizing the respective punch magnets which punch holes in the proper channels on tape 28. Energization of output lines 208 and 210 also lights neon signal lamps 38 on the upper portion of the central receiver-recorder control panel 36. Firing of the output data circuits 206 also energize parity check monitoring lines 212, providing inputs to a parity check unit 214. The parity check unit 214 produces a signal on line 216 whenever the parity of the energized parity check monitoring lines 212 is even.

Referring now to FIG. 4A, after the scanner 58 at the transmitter 20 has completed its scan of the variable and telemetry information it provides a length of message character on the Hollerith lines 46, immediately preceded by a length of message synchronization pulse on conductor 114 of the main cable 24. The length of message character consists of a signal on the one, two, three, four, five, six, seven or eight channel of the Hollerith lines 46. The control circuits 90, in response to the length of message synchronization pulse, produce a character gate signal on line 140 as an input for the translator 128 which then translates the length of message character into its simplest binary representation; that is energization of a combination of the zero, one, two or four translator output lines 132. The one, two and four translator output lines are monitored at a length of message monitor unit 218, which counts the number of characters actually punched on the tape by means of a three stage binary counter, and compares the number stored in this counter to the number received on the translator output lines 132 at the end of the transmitter message. Monitor unit 218 provides a transmitter length of message error signal on line 222 when these two numbers disagree.

An error signaling unit 238 is provided at the central receiver-recorder to monitor for length of message and parity errors and to initiate appropriate action through intercommunication with the control circuits 90 and a special function unit 240. The error signaling unit 238, upon receipt of a parity even signal on line 216 and an output sync signal on line 182 produces a parity error signal. The error signaling unit 238 is also responsive to error lock up signals on conductors 242 and 256 from the punch 26 and control circuits 90 respectively, as well as transmitter length of message and central length of mesage error signals on lines 222 and 236 respectively, from the length of message monitor unit 218. The unit 238 also monitors the length of the pulse signals received on the Hollerith lines 46 and produces a short pulse error signal if a pulse is shorter in duration than a predetermined minimum length. Any one of these error signals will cause the special function unit 240 to energize certain of the Hollerith lines 46, so that an error character will be the next character punched on the tape 28. Upon the occurrence of any of the above errors, the error signaling unit will also inhibit the supply of a character gate signal on character gate line 130 for the translator unit 128, so that no data characters will be punched on the tape, and this condition will continue until the control circuits 90 have signaled the transmitter that an error has occurred in its transmission, and that it should retransmit its message.

The error signaling unit 238 also monitors for two consecutive errors in central messages. That is, if a central length of message error and a central parity error, or if two central parity errors are detected in succession, the error signaling unit will signal the control circuits 90 to go into the stop condition, so that no further messages will be transmitted to the central receiver-recorder until appropriate action has been taken by the operator to rectify the fault.

The special function unit 240 generates various special characters on the Hollerith lines 46, and these characters proceed through the translator in the same manner as the other characters of a message. These special characters include an error character or end of message character, and a character gating signal supplied to a character gate line 130 which enables the translator to translate these particular characters. The unit 240 also monitors the Hollerith lines 46 and is responsive to a customer selected space character thereon, and upon receipt thereof will produce a punch space signal on line 142 to prevent the translator 128 from translating the special code. Unit 240 also generates a data arrival signal on conductor 136 upon receipt of the selected space character. This eventually sets a bit into the tape feed flip-flop 160 of Storage I, and results in the punching of a check symbol on the tape to indicate a space. The special function unit 240 also monitors the transmitter and the central message gate signals, on lines 244 and 246 respectively, and produces a message gate signal which is supplied to a test and reset unit 262 (FIG. 4B) on line 248. This message gate signal is also provided when the special function unit 240 is producing the end of message and error characters. Unit 240 produces "end of transmitter message gate," and "end of central message gate" signals on lines 230 and 226, which are used in the length of message monitor unit 218. Unit 240 also produces a reset signal for the counters and storage flip-flops of the length of message unit 218 when no message gate signal is present, and at the end of a message containing no errors, the unit produces a reset signal for the two consecutive central error counters of the error signaling unit 238.

The tape punch 26 produces punch interlock signals on punch interlock lines 260 connected to the control circuit unit 90. When there is one hundred feet of tape left a visual indication is produced on the control panel 36; when there is fifty feet of tape left, an audible and a visual indication is produced. When tape tension is improper, or the tape breaks, audible and visual indications are produced, and the control circuit unit 90 is set into the above described stop condition. An error lockup signal is produced on line 242 for the error signaling unit 238 when there is improper tape tension, or the tape breaks or runs out.

The test and reset unit 262 (FIG. 4B) has twelve manually settable switches which may be set up as any character in the Hollerith code, and a test push button which when pressed, if no message is being recorded on the tape, will produce a test character on the Hollerith lines, and also the appropriate gating signals, so that the test character will be punched on the tape. The test and reset unit 262 produces tape leader by energizing tape leader line 148 and the appropriate Hollerith lines 46, which causes all channels on the tape to be punched. The test and reset unit 262 produces master reset signal on line 172 for the data flow control unit 150, which causes all binary devices in the data flow control unit, in Storage I and Storage II, and in the output circuits 202, to be constantly reset when no message gate signal is present at the central receiver-recorder. Unit 262 also produces an enable check bit insertion signal on line 198, for the check bit insertion unit 192, when a message gate signal is received from the error signaling unit 238.

THE TRANSMITTER

Referring to FIG. 4A, when the transmit button 544 is depressed of the transmitter 20 and control circuits 56 have energized conductor 68, a ready to transmit relay $R_2$ is energized and, through its contacts $C_1$, it connects a location relay $R_4$ to conductors 70 and 72. As illustratively shown in FIG. 4A, six search conductors 76 are connected between the data transmitters 20 and the central receiver-recorder 22, and at the transmitters connected to a plug board 74 where a jumper 78 is provided for connecting the conductor 72 to one of the search lines 76. In the same manner a plug board 80 having a jumper 82 is connected to the search conductors 84 so that one of them may be connected to the conductor 70. At the same time the location relay $R_4$ is enabled, contacts $C_2$ of relay $R_2$ close and effectively ground a ready to transmit conductor 86 which is connected to the central receiver-recorder 22; the ground being supplied by conductor 104 connected to a common system ground 88 which is connected to the central receiver. As will be further detailed below in the description of the control circuits 90 of the central receiver, upon receipt of a ready to transmit signal on conductor 86, the control circuits sequentially energize the various combinations of the search conductors 76 and 84 until a circuit is completed through the location relay $R_4$. Upon energization of $R_4$, its contacts $C_3$ effectively ground a search inhibit conductor 92 which is connected to the central receiver-recorder at the control circuits 90. This ground signal inhibits the search means at the control circuits 90 so that the location relay $R_4$ continues to be energized.

Energization of the location relay $R_4$ closes contacts $C_4$ thereon, supplying 145 volts DC to a start of message relay $R_5$ whose energization circuit is completed through conductor 96 which is connected to the system ground 88. Energization of relay $R_5$ closes contacts $C_5$ thereof connecting a transmitter start relay $R_6$ to a transmitter start conductor 94 of the main cable 24. The energization circuit of the start relay $R_6$ is completed through conductor 96 which is also connected to the system ground 88. When the central receiver-recorder is ready to receive a transmission from the transmitter 20, whose location relay $R_4$ is energized, the start conductor 94 of the common cable 24 is energized at the central receiver-recorder to energize the start relay $R_6$. Upon energization of relay $R_6$, contacts $C_6$ close connecting one side of a transmitter hold relay $R_7$ to a transmitter hold conductor 98 of the main cable. The energization circuit of relay $R_7$ is also completed through conductor 96. The central receiver-recorder, while still energizing the transmitter start conductor 94, also energizes a transmitter hold conductor 98 which energizes the transmitter hold relay $R_7$. Contacts $C_8$ of relay $R_7$ then close, shunting the contacts $C_6$ of the transmitter start relay, so that even though a transmitter start signal is no longer present on conductor 94, the transmitter hold relay $R_7$ remains energized so long as a transmitter hold signal is received on transmitter hold conductor 98.

Upon energization of the transmitter hold relay $R_7$ contacts $C_9$ thereof close, connecting one side of the coil of a transmitting relay $R_9$ to the ground conductor 96, energizing relay $R_9$, since the other side of its coil is supplied with 145 volts DC. Contacts $C_{10}$ on relay $R_9$ then close, supplying the start of message relay $R_5$ with energization independently of the contacts $C_4$ on location relay $R_4$. Other contacts (not shown) on transmitter hold relay $R_7$ are utilized in the control circuits 56 of the transmitter 20, as is indicated by the control arm 100 extending into the control circuits 56. These other contacts initiate operation of the control circuits 56 to cause the read-head 44 to read the data cards 42, and the scanner 58 to scan the fixed plugboard 53, variable information coder 25, and the telemetry information coder 60, to transmit the message characters thereof serially on the Hollerith lines 46, as may be more fully understood by reference to the above-identified application of A. Craig Reynolds et al.

Upon energization of the transmitting relay $R_9$, contacts $C_{11}$ and $C_{12}$ thereof open, terminating the ready to transmit signal on conductor 86 and disconnecting the location relay $R_4$ from the search conductors 76 and 84. Location relay $R_4$ then is de-energized, thus ending the search inhibit signal on conductor 92. The control circuits 90 of the central receiver-recorder are then responsive to another ready to transmit signal on the conductor 86, from a different transmitter, to select it in the same manner as transmitter 20 was selected by means of location relay $R_4$ and the search conductors 76 and 84.

Energization of the transmitting relay $R_9$ also closes contacts $C_{14}$ and $C_{16}$ thereof; upon contacts $C_{14}$ being closed and contacts $C_2$ on relay $R_2$ being closed, as previously described, a ground is supplied to a transmitter gate conductor 102 of the main cable 24, since one side of the contacts $C_2$ are connected through conductor 104 to the system ground 88. The closing of contacts $C_{16}$ on relay $R_9$ connects an error conductor 106 of the main cable to the control circuits 56 of the transmitter 20, which are then responsive to an error signal from the central receiver-recorder. Prior to this time, the control circuit 56 had been connected to the error conductor 106 through the contacts $C_7$ on transmitter start relay $R_6$.

A "central off" conductor, 108 of the main cable 24, is always connected to the control circuits 56, and conductor 108 is always energized when the central receiver-recorder is on. When the central receiver-recorder is off or in a "stop" condition to be described hereinafter conductor 108 is not energized the control circuit 56 light a signal lamp on the front panel of the transmitter indicating this condition.

The scanner 58 of the transmitter 20, at the beginning of its scan, first sends a "start character gate" signal to the control circuits 90 of the central receiver-recorder on conductor 110, and at the end of its scan sends an "end character gate" signal on conductor 112. As will be explained in the detailed description of the control circuits 90 to follow, these signals are used in the control circuits 90 to generate a simulated character gate signal for use at the translator 128 (FIG. 4B). The scanner 58 also produces a message length synchronizing signal just prior to the transmission of the message length character on the Hollerith lines 46. The message length synchronization signal is transmitted to the central receiver on conductor 114 of the main cable.

It will be understood by reference to the previously identified Reynolds et al. application that all the characters transmitted from the transmitters 20 are transmitted on the Hollerith lines 46, which comprise 12 pairs of conductors, one for each channel or row of possible holes on the data cards 42, and that another pair of conductors 48 is used as a character gating pair to supply signals to the central receiver-recorder when characters may appear on the data cards 42. As shown in FIG. 4A of the present application, the read-head 44 has a common ground conductor 43 which is connected to a plurality of switches 45. Twelve of the switches 45 are each connected to one of the conductors 49 of the Hollerith lines 46, and the closing of each switch 45 grounds its respective Hollerith conductor to indicate the presence of a hole in the data card. Each such closure constitutes an information "bit" in the channel corresponding to the switch closed. As is also shown in FIG. 4A, each conductor of the Hollerith lines 46 is formed into a twisted pair of conductors with ground conductors 47. The uppermost switch 45 is the character gate switch and is closed when the character gate signal is to be sent to the receiver-recorder, and, as further explained in the above-identified Reynolds et al. application, this switch 45 may be operated by camming surfaces adjacent the data cards 42. The conductor 51 of the character gate lines 48 which is connected to the uppermost switch 45, is formed into a twisted pair with a ground conductor 55. Thus transmission of data from the read-head 44, is accomplished by grounding single conductors of twisted pairs of conductors, corresponding to the proper channels of the character being transmitted, together with grounding of conductor 51 which with ground conductor 55 forms a twisted pair of character gate conductors 48. Transmission of the fixed data, variable information and telemetry information by the scanner 58 is accomplished by grounding proper combinations of the Hollerith pairs 46 as is also explained in detail in the previously identified copending Reynolds et al. application.

Upon completion of transmission of all characters of the message, the control circuits 56 energize conductor 116 which is connected to one side of the coil of an end of message relay $R_{10}$, the other side of the coil thereof being connected by ground conductor 96 to the system ground 88. Thus relay $R_{10}$ is energized, and contacts $C_{18}$ and $C_{20}$ thereof open, disconnecting location relay $R_4$ from conductor 70, and disconnecting ground conductor 96 from conductors 86 and 102 of the cable 24. If the transmitting relay $R_9$ is still energized, this will terminate the transmitter message gate signal on conductor 102, and if relay $R_9$ is de-energized, this will present a ready to transmit signal on conductor 86. Location relay $R_4$ is disconnected from conductor 70 at this time, since if no other transmitter has sent a ready to transmit signal to the central receiver-recorder, location relay $R_4$ would again be energized from the search conductors 76 and 84 when transmitting relay $R_9$ is de-energized.

It will thus be seen from the description above that the central receiver-recorder is able to select a particular calling transmitter for transmission by first energizing its location relay $R_4$ over the search conductors 76 and 84, and this is acknowledged by the selected transmitter transmitting to the central receiver-recorder a search inhibit signal over conductor 92 when the location relay $R_4$ is energized, and thereafter, so long as no other transmitter is providing a transmitter gate signal on conductor 102, only the selected transmitter with its location relay so energized will be responsive to the simultaneous receipt of a transmitter "start signal" on conductor 94 and a transmitter "hold signal" on conductor 98, to initiate automatic transmission from the selected station.

THE TRANSLATOR UNIT

The connections and operation of the translator circuit will now be described with reference to FIG. 5 and FIG. 5a, wherein all elements of the translator are identified by reference numerals preceded by the letter T. Referring now to FIG. 5, the translator unit 128 comprises six "OR gates," T2, T4, T6, T8, T10 and T12, to which various combinations of conductors 49 of the Hollerith lines 46 are connected as inputs. The term "OR gate," as used herein, refers to devices which produce an output signal when a signal is present at any input thereof. Such devices are sometimes called "buffers," as their function is to operate as though their inputs and outputs were all connected together for signaling, yet all disconnected for isolation. OR gates are depicted herein by a triangle to which conductors entering a base of the triangle and terminating at the opposite sides or the apex of the triangle are inputs, and the conductor leaving the apex is an output. The small "+" at the base of OR gates T2, T4, T6, T8, T9, T10 and T12 indicates that the gates are responsive to positive input signals. The small "−" at the apex of the gates indicates that they produce negative output signals. Thus, referring to OR gate T2, whenever a positive signal is present on the twelve or zero conductors 49, OR gate T2 will produce a negative signal on output conductor T14.

Each of the output conductors of the OR gates T2 through T12 are connected to respective "AND gates," T16, T18, T20, T22, T24 and T26. The term "AND gate," as used herein, refers to devices to which signals must be presented at all inputs thereof in order to produce an output signal. AND gates are depicted herein by triangles, shown as follows: Conductors terminating at the base thereof are inputs, and the conductor beginning at the opposite apex is the output of the AND gate. Another convention as to gates which is followed throughout this specification is that gates depicted as triangles which have no plus signs (+) contained therein are responsive to negative signals and produce a negative signal as an output. Gates responsive to positive input siganls to produce a positive output signal are indicated with a plus sign (+) within the triangle, as shown by gate T38 in FIG. 5. The small "+" at the termination of input conductors T40, and the small "−" at the termination of input conductor T14 at AND gate T16, indicate that a positive signal on conductor T40, together with a negative signal on conductor T14, enable negative AND gate T16 to operate. The small "−" at the apex of AND gate T16 indicates that this gate produces a negative signal on output conductor T28. Thus, when a negative signal is supplied to AND gate T16 on conductor T14, and a positive signal on conductor T40, a negative signal will be produced on output conductor T28.

Character gate conductor 130 from the transmitters 20 (FIG. 4A), which is connected to character gate conductor 51, of character gate pair 48 in the error signaling unit 238, terminates at an isolaton device T30 which, when character gate conductor 51 is grounded, produces a negative signal on the output T32 thereof. A filter relay T34 is connected to the output conductor T32 of the isolation device T30 and is energized when the character gate signal is present on conductor 130. Energization of relay T34 produces a negative character gate signal on character gate conductor 138 for use at the sync insertion unit 144 (FIG. 4B), and a positive signal on conductor T36 which supplies one input to a positive OR gate T38. The other input of OR gate T38 is connected to the length of message character gate conductor 140 from control circuits 90 (FIG. 4B). Output conductor T40 of OR gate T38 will thus be positive whenever OR gate T38 is supplied with a positive signal, i.e., the usual character gate on conductor T36 or the length of message character gate on conductor 140.

If a character gate signal exists, i.e., conductor 130 is grounded, and the twelve or zero conductor of the Hollerith conductors 49 are grounded, the AND gate T16 will be supplied with a negative signal on input conductor T14 and a positive signal conductor T40, and therefore will produce a negative signal on output conductor T28. Filter relay T42, to which conductor T28 is the input, will then supply negative signals on output conductors T44 and T46. The signal on conductor T44, if a signal exists on "punch space" conductor 142 will cause an AND gate T48 to produce an output signal on the zero conductor of the translator output conductors 132. The same being the case for the other filter relays T50 and AND gates T52 associated with the one, two, four, eight and X conductors of the output conductors 132.

Output conductor T46 of filter relay T42, together with similar output conductors T54 of the other data filter relays T50, are all connected to an OR gate T56 which produces a signal on output line T58 thereof upon operation of any of the filter relays T42–T50. If a signal exists on punch space line 142, together with a signal on conductor T58, AND gate T60 will produce as an output thereof a data arrival signal on conductor T62. This data arrival signal is sent to the special function unit 240 on conductor 136 and to the sync insertion unit 144 on conductor 134 (FIGS. 4B and 4C). In this way the characters which arrive at the central receiver-recorder in a twelve channel Hollerith code on the Hollerith conductors 49, are translated into the six channel tape code and then exist as an output of the translator unit 128 on conductors 132. This translation will only take place if a character gate signal is supplied to the translator on conductor 130 and a signal exists on conductor 142 indicating that it is not desired to punch a space symbol on the tape.

Now referring to FIG. 5a wherein the actual circuitry for that portion of the translator indicated in the dotted box T64 is shown in detail, character gate line 130 and each data line 49 is connected to a power supply (not shown) suplying minus 48 volts DC through biasing resistors T66. The "twelve" Hollerith conductor is connected to a grid T68 of triode T70, and the "zero" Hollerith conductor is connected to the grid T72 of triode T74. Both cathodes T76 and T78 of these triodes are grounded and their plates T80 and T82 are connected together to conductor T14. In the preferred embodiment of the invention resistors T66 are 2,700 ohm 2-watt resistors, and triodes T70 and T74 are each one-half of double triodes type 5687. Thus when the grids T68 or T72 are not grounded by the Hollerith lines 49, the grids T68 and T72 are biased at —48 volts and the tubes are cut off. Plate conductor T14, therefore, is at a high positive potential, or in other words because triodes T70 and T74 cannot conduct, conductor T14 is not connected to ground and the energization circuit of relay T42 is not completed. When either the "twelve" or the "zero" Hollerith conductor is grounded, its tube conducts and conductor T14 is effectively grounded, thereby conditioning relay T42 for energization from conductor T40. This action of the two triodes T70 and T74 is indicated on FIG. 5 as OR gate T2. The other OR gates of the translator unit T4 through T12 operate in the same manner; each Hollerith conductor 49 terminating at the grid of a triode which, when conducting, grounds one side of its respective relay T50.

In the same manner, character gate conductor 130 terminates at a grid T86 of triode T88 (also one-half of a 5687 in the preferred embodiment of the invention) and plate conductor T90 thereof is effectively connected to ground whenever a ground is supplied to grid T86 on character gate conductor 130.

A positive 250 volts DC potential is supplied to plate conductor T90 through a 7500 ohm, 5-watt plate resistor T92 connected in series with the solenoid T94 of filter relay T34. A diode T96 is connected in parallel with relay coil T94 for noise suppression purposes. Swinger T97 of filter relay T34, whenever relay coil T94 is de-energized (i.e., when a character gate signal is not being received on conductor 130), supplies 250 volts DC to character gate conductor 138. When the character gate signal (i.e., a ground) is present on conductor 130, tube T88 conducts, filter relay coil T94 energizes and swinger T97 therefor supplies 250 volts DC to conductor T40. This 250 volts on conductor T40 supplies one input to the various AND gates T16 through T26 (FIG. 5), and in particular, as shown in FIG. 5a, is connected to the coil T98 of filter relay T42 through a 7500 ohm, 5-watt resistor T100. A diode T99 is connected across the coil T98 for noise suppression. Then, whenever the twelve or zero Hollerith conductor is grounded its respective tube T70 or T74 will conduct and relay coil T98 will energize; swinger T102 then will connect conductor T46 and the zero conductor 132 to the "punch space" conductor 142. The other filter relays T50 (FIG. 5) operate in exactly the same manner producing an output on their respective output conductors when one of the data lines connected to their respective OR gates T4 through T12 and conductor T40 are supplied with signals. Thus AND gates T16 through T26 (FIG. 5) are in reality the two terminals of the coils of the "twelve-zero" filter relay T42 and the other filter relays T50; while AND gate T48, connected to the "zero" output conductor, and the other AND gates T52 connected to the other output conductors 132 (FIG. 5) are the swingers of the filter relays.

Whenever it is desired not to punch a space the conductor 142 will be grounded and a ground therefore will be supplied to conductors T46 and 132. OR gate T56 consists of the connection of conductors T46 and T54 to a common conductor T58. Conductor T58 is connected to the cathode of diode T104 and the anode thereof is connected to data arrival conductor T62. Filter relays T42 and T50 are thusly isolated from the data arrival signals originating at the special function unit 240 on conductor 136 (FIGS. 4B and 4C).

It will thus be apparent from the preceding description that characters exist at an output of the translator unit 128 as a ground supplied to relay contacts connected to the tape code conductors 132. It will also be apparent that since the triodes of the isolation device T30 and the OR gates T2 through T12 are biased at minus 48 volts DC, spurious voltage signals on the character gate line 130 and the data lines 49 of less than approximately 45 volts will not allow the triodes of device T30 and OR gates T2 through T12 to conduct. Thus the respectve filter relays will not operate on such spurious signals. Filter relays T34, T42 and T50 are also chosen to have a specific common energization time, and therefore they will not produce data signals on tape data conductors 132 unless the translator receives character signals on the Hollerith lines 49 of time duration greater than the energization time of the relays. In the preferred embodiment of the invention, this energization time is 3 milliseconds. Thus a translator is provided which is unresponsive to noise signals of less than a predetermined voltage and time duration and in which the input lines 49 and 130 therto may extend a relatively great distance. As is also apparent from the preceding description, the translator 128 is completely disabled when no character gate signal is supplied thereto, thus affording further protection against receipt of false character signals.

THE SYNC INSERTION UNIT

The synchronization pulse insertion portion of the apparatus, which is hereinafter referred to as the "sync insertion unit," will now be described with particular reference to FIG. 6 wherein the various elements are identified by reference numerals preceded by the letter S.

Referring to FIG. 6, the sync insertion unit, indicated generally at 144, receives as inputs thereto data arrival signals on conductor 134 and character gate signals on conductor 138. Both the data arrival and character gate signals ordinarily originate at the translator unit 128 (FIG. 4B). However, as was explained in the description of the translator unit (FIG. 5), in certain situations a data arrival signal may be generated at the special function unit 240 (FIG. 4C), and this signal is supplied to the data arrival conductor 134 in the translator by means of the data arrival conductor 136 connected to the special function unit 240. Tape leader signal conductor 148 also supplies an input to the sync insertion unit 144, originating at the test and reset unit 262 (FIG. 4B).

Data arrival signals on conductor 134 pass through a voltage divider network (not shown) and are converted, from the presence or absence of ground at a contact of one of the translator relay contacts, to a potential varying between plus 250 and plus 125 volts DC on conductor S2. In the preferred embodiment of the invention the data arrival pulses are approximately 9 ms. in duration and occur each 17 ms. when characters are being transmited over the Hollerith lines 46. These times are the result of the velocity of the read-head 44 in reading the data cards 42, and hole spacing and size. Scanner 58 could transmit characters faster but for reasons that will become apparent in the following description of the sync insertion unit 144, a standard data arrival rate is desirable.

Conductor S2 supplies the input to a first delay multivibrator S4 which is responsive to the initial portion of the data arrival signal (i.e., the drop from plus 250 to plus 125 volts), and produces on output conductor S6 a pulse of exactly 5 milliseconds duration from the beginning of the data arrival signal. Output conductor S6 is connected to and forms an input to AND gate S8, the other input thereof being supplied by conductor S2. AND gate S8 produces an output on output conductor S10 thereof only if the delay pulse on conductor S6 terminates while a data arrival signal is present on conductor S2. Thus, ordinarily an output signal will appear on conductor S10 exactly 5 milliseconds after the beginning of the data arrival signal on conductor 134.

This delayed output signal on conductor S10 takes the form of a very short negative pulse, as shown in the drawing of FIG. 6, and is supplied to an OR gate S12 where it produces an identical short negative pulse on output conductor S14. Conductor S14 supplies one input to AND gate S16. The other input to AND gate S16 is the character gate conductor 138 from the translator unit 128 (FIG. 4B). Thus, 5 milliseconds after the beginning of the data arrival signal on conductor 134, if the data arrival signal still exists then as indicated by the negative pulse on conductor S14 and if a character gate signal is being supplied on conductor 138, AND gate S16 will produce an output signal on conductor S18. This output is a short negative pulse signal, as indicated below conductor S18 in FIG. 6, and is supplied to a second delay, or "one shot," multivibrator S20. Delay circuit S20 produces on output conductor S22, thereof, a pulse of 6 milliseconds duration from the receipt of the short negative pulse on S18, i.e., from 5 milliseconds after the beginning of the data arrival signal on conductor 134. The output conductor 146 of the sync insertion unit 144 is connected to conductor S22. This 6 millisecond pulse is supplied to the data flow control unit 150 (FIG. 4C) and is called the "input sync signal."

Thus, the circuitry explained thus far of the sync insertion unit 144 monitors for a data arrival pulse on conductor 134, and produces a pulse of 6 milliseconds duration beginning 5 milliseconds after the beginning of the data arrival pulse, provided the data arrival pulse exists for at least 5 milliseconds (a duration selected by delay S4). This circuitry prevents (by not providing an input sync signal on conductor 146) the processing of data in the central receiver-recorder based upon characters arriving on the Hollerith lines 46 (FIG. 4B) of less than 5 milliseconds duration. Delay S4 is adjustable and may be adjusted between 3 and 7 milliseconds. However, the optimum range for short pulse detection has been found to be between 4 and 6 milliseconds, and thus delay S4 will ordinarily be adjusted between these two extremes. For illustration, delay S4 will be assumed to be 5 milliseconds, as indicated in FIG. 6 of the drawings.

A third delay device S24, has conductor S22 connected thereto as an input. Delay S24, being the same type of delay device as second delay S20 and first delay S4, is triggered by the terminating negatively changing portion of the 6 millisecond pulse on conductor S22, and produces a pulse on its output conductor S26. This output pulse is also 6 milliseconds in duration, as measured from the termination of the pulse supplied on conductor S22.

The 6 millisecond delay pulse on conductor S26 is supplied as an input to a differentiation network S28 where it produces on the output conductor S30 thereof short positive and negative pulses spaced 6 milliseconds apart, which are supplied as one input to AND gate S32. AND gate S32 is also supplied with the 5 millisecond delayed pulses on conductor S6, from the output of the first delay S4. The circle at the termination of S6 at AND gate S32 indicates that when the 5 millisecond pulse is present on conductor S6, the AND gate S32 is inhibited and no signal will appear on the output conductor thereof, S34. A third input conductor to AND gate S32, S36, is supplied either by a signal on the tape leader conductor 148, which is connected thereto, or by closing of the sync insertion switch S38, which supplies 250 volts thereto. Thus, if either the sync insertion switch S38 is closed or the tape leader conductor 148, from the test and reset unit 262 (FIG. 4B), is energized, AND gate S32 will produce an output signal on conductor S34 upon being supplied with the terminating negative pulse on conductor S30, provided the 5 millisecond duration pulse is not present on conductor S6.

AND gate S32 therefore comprises what is known as the "early gate" of the sync insertion unit 144, inasmuch as AND gate S32 produces an output precisely 17 milliseconds after the beginning of the last data arrival signal (that is the summation of the delay S4, S20 and S24), provided that another data arrival signal has not occurred within 5 milliseconds prior thereto, as determined by the output conductor S6 of delay S4 being an inhibit input to AND gate S32.

The output of the early gate S32 on conductor S34 is a short negative pulse, as indicated in FIG. 6, corresponding to the short negative input pulse on conductor S30. Conductor S34 is an input to a fourth monostable delay device S40, which has the same circuit as the other delay devices of the sync insertion unit 144. Delay S40 is adjusted to produce, upon being supplied with a negative signal on conductor S34, a pulse of 5 milliseconds duration on output conductor S42. The 5 millisecond pulse on conductor S42 is differentiated by differentiating network S44 and appears as a positive pulse followed by a negative short pulse, the two pulses being separated by 5 milliseconds. Both pulses appear on input conductor S46, which is an input to a "late gate," S48. Late gate S48 is another AND gate similar to early gate S32 and has, as the other input thereto, conductor S6 from the first delay S4. Late gate S48 operates in the same manner as the early gate S32, that is, it produces a negative output pulse on output conductor S50 thereof, when supplied with the short negative pulse on conductor S46, provided a 5 millisecond duration pulse supplied by delay S4 does not exist on conductor S6.

Conductor S50 is connected as an input to the OR gate S12 and, if the pulse is supplied thereto, it will result in the generation of the input sync 6 millisecond pulse on conductor 146, in the same way as input sync is generated by a pulse supplied on conductor S10 from AND gate S8.

The overall operation of the sync insertion unit 144 can therefore be considered as follows: If data arrival signals of greater length than 5 milliseconds arrive on conductor 134 from the translator 128 (FIG. 4B), they will produce (by means of delay S4, AND gate S8, OR gate S12, AND gate S16, and delay S20) input sync signals every 17 milliseconds on conductor 146, such sync signals being delayed exactly 5 milliseconds from the data arrival signals on conductor 134. If, however, data arrival signals are not present on conductor 134 (indicating spaces on the data cards 42, FIG. 4A), 12 milliseconds after the beginning of the last input sync signal on conductor 146, a short pulse will occur on conductor S30 as an input to the early gate S32, and this time, because of the initial delay caused by delay S4, will be exactly 17 milliseconds after the last data arrival signal. This locally generated signal will be compared with the signal on conductor S6, and if no data arrival signal has occurred on conductor S134 within 5 milliseconds prior to this time (i.e., 17 milliseconds after the last data arrival signal) then early gate S32 will allow the pulse on conductor S30 through, and it will now appear on conductor S34. Delay S40 will then delay this pulse 5 milliseconds. After passing through differentiation network S44, it will now appear as a negative pulse on conductor S46 and be compared at late gate S48 with the signal on S6, the output of the initial delay S4. At late gate S48, this short negative pulse on S46 will occur exactly 17 milliseconds after the last input sync signal on conductor S146, and exactly 22 milliseconds after the beginning of the last data arrival signal on conductor 134. If a data arrival signal has arrived on time, that is 17 milliseconds from the last data arrival signal, or within 5 milliseconds thereafter, a positive signal will be present on conductor S6. Late gate S48 will, therefore, not allow the short pulse on conductor S46 through, to appear as an output on conductor S50. However, if no data arrival signal ccurred on conductor 134 within 5 milliseconds after its expected arrival, conductor S6 will be negative and late gate S48 will produce a pulse on conductor S50. This pulse will pass through OR gate S12 and generate input sync on conductor 146 for the data flow control unit 150 (FIG. 4C). This all occurs, of course, only if sync insertion is desired, that is switch S38 has been closed enabling early gate S32.

For tape leader, that is punching all holes on the output tape 28 of the central receiver-recorder, a signal will be supplied on conductor 148 from the test and reset circuits 262 (FIG. 4B), enabling early gate S32; and, as will be explained below when considering the test and reset circuits 262 in detail, a single data arrival signal will be generated on conductor 134. Therefore, that single data arrival signal will produce an initial input sync signal on conductor 146, as previously described, and this signal through the regenerative local pulse producing network comprised of second delay S20, third delay S24, early gate S32, delay S40, late gate S48, and OR gate S12, will operate 17 milliseconds thereafter (the sums of delays S20, S24 and S40), to again produce an input sync signal. Repetitive operation accordingly will continue so long as the tape leader conductor 148 supplies a signal to input S36 of early gate S32. As will also be explained below all the output conductors 132 of the translator unit 128 will be grounded for tape leader. This and the series of input syn signals on conductor 146 will repeatedly punch all holes on the tape.

It will be seen therefore that the first delay S4 and the fourth delay S40 are adjusted to provide the same delay in order to produce the late gate action of AND gate S48; and that the second delay S20 and the third delay S24 are adjusted to provide a delay whose duration added to delay S4 is 17 milliseconds (the expected time between data arrival pulses on conductor 134), to produce the early gate action of AND gate S32.

All four delays of the sync insertion unit (S4, S40, S20 and S24) use the same circuit which is shown in detail as delay S20. In delay S20, input conductor S18 is connected through a .001 microfarad capacitor S52, by means of a conductor S54, to the grid S56 of triode S58, which is preferably one half of a double triode, type 5963. Conductor S54 is also connected to one side of a capacitor S60, the other side of which is connected to the plate S62 of a second triode S64, which may be the other half of a double triode type 5963. The plate of triode S64 is connected to a source of 250 volts positive DC potential through a plate resistor S66. Capacitor S60 has a capacitance of .01 microfarad, and resistor S66 has a resistance of 150,000 ohms rated at ½ watt. A variable resistor S68 in series with fixed resistor S70 is connected to the positive 250-volt side of resistor S66, and between the two capacitors S60 and S52, and thus through the conductor S54 to the grid S56 of triode S58. The plate S72 of the triode S58 is connected through a pair of plate resistors S74 and S76 to the positive 250-volt side of resistor S66. Output conductor S22 is connected to the midpoint between the resistors S74 and S76. Resistors S74 and S76 are both one-watt resistors, S74 being 6,800 ohms and S76 being 18,000 ohms. Resistor S70 and variable resistor S68 are both ½ watt resistors, S70 having a value of 200,000 ohms and S68 having a maximum value of 2.5 megaohms. The cathodes of triodes S58 and S64 are connected together and through a 4,700 ohms, ½ watt resistor S77 to ground.

It will be apparent to those skilled in the art that delay S20 is commonly known as a cathode coupled delay flop, one shot multivibrator, or monostable multivibrator. Prior to receiving an input signal on conductor S18, triode S58 will be conducting due to the positive bias applied to its grid S56. Triode S64 will normally be cut off due to the positive bias applied to its cathode when triode S58 conducts. Then, when a negative signal is supplied on input conductor S18, grid S56 of triode S58 will go negative, cutting off triode S58, and producing a positive output signal on conductor S22. Triode S64 will at this time begin to conduct due to the temporary reduction in positive back bias on its cathode. When triode S64 conducts a large negative potential will be supplied to grid S56 through capacitor S60 and triode S58 will continue to be cut off. Triode S58 will be cut off until the charging of capacitor S60 through fixed resistor S70 and variable resistor S68 produces a large enough positive signal on grid S56. When triode S58 is again conducting, the positive signal on conductor S22 will terminate. Thus the duration of the positive pulse on conductor S22 is determined by resistors S68 and S70, with capacitor S60.

The reason that two delay multivibrators S20 and S24 are utilized for the required 12 millisecond delay is that any multivibrator of this type requires a certain amount of recovery time after producing a pulse before it is able to produce another pulse. This recovery time is approximately 10 percent of the duration of the delay pulse produced by the device. Therefore, if a single 12 millisecond delay multivibrator were substituted for delays S24 and S20 there would be an approximately 1.2 millisecond interval during which a negative pulse on conductor S18 would not produce the required output on conductor S26. Thus a data arrival signal on conductor 134 occurring from 4 to 5 milliseconds early, that is between 12 and 13 milliseconds after the last data arrival pulse, would produce on conductor S18 an impulse within the 1.2 millisecond interval during which a single delay multivibrator would be inoperative. However, in using two multivibrators, S20 and S24 the first multivibrator S20 will have recovered certainly within 7 milliseconds after having been fired by a negative impulse on S18, and therefore will be able to handle a data arrival signal arriving during the tenth millisecond after the last data arrival signal.

Since it was necessary to have a positive signal generated for the input sync, it was found convenient to take the input sync output for conductor 146 from the output conductor S22 of the first delay S20, as delay S20 produces an inverting action. The power of the resultant signal on input sync conductor 146 is then much greater than if it were taken directly from conductor S18.

AND gate S32 is of a type commonly used throughout the present system and will be described in detail. It comprises two triodes S78 and S80, each being one half of a double triode type 5963. The plates of the two triodes S78 and S80 are connected together to input conductor S36 which must be supplied with a positive potential of approximately 250 volts DC, in order for the AND gate to operate. The cathodes of the triodes S78 and S80 are connected together and grounded through cathode resistor S82, a 22,000 ohm, 2-watt resistor. A pair of resistors, S84 and S86, each of 15,000 ohms rated at 2 watts, are connected between ground and input conductor S36. A third resistor S88, a 330,000 ohm, ½ watt resistor, is connected between the midpoints of resistors S84 and S86 and the grid of triode S78. Input conductor S30 is also connected to the grid of triode S78. Input conductor S6 is connected to the grid of triode S80. The two cathodes of the triodes S78 and S80 are connected to conductor S34, the output conductor of AND gate S32. This circuit provides a commonly known form of cathode follower AND gate which is responsive to negative signals at the two input conductors S6 and S30, connected to each of the grids of the triodes S80 and S78, respectively. When plate potential, that is positive 250 volts DC, is supplied on conductor S36, both triodes S78 and S80 conduct, and conductor S34 will ride at plus 125 volts. Positive signals applied to the grids of the two triodes S78 and S80 will not provide the required signal on conductor S34 since they will merely allow already conducting triodes to conduct even more, and delay S40 is unresponsive to positive signals. A negative pulse on conductor S30, connected to the grid of triode S78, will merely cut that triode off, not affecting the continued conduction of triode S80, and the potential on conductor S34 will not vary. The same is true if a negative signal is supplied to the grid of triode S80 only. However, when negative signals are supplied to the grids of both tubes S78 and S80, on conductors S30 and S6 respectively, both tubes act as a single cathode follower circuit and the potential on conductor S34 will drop sharply. This is the output of AND gate S32. Thus both input conductors S6 and S30 must be negative to produce a negative output pulse on conductor S34. The output signal on S34 will have the form of the negative signal of shortest duration, that is the negative signal on conductor S30.

AND gates S48 and S16 include substantially the same circuits as S32 and operate in the same manner, that is two negative signals must be received at their inputs to produce a negative output signal.

S8 is a novel form of AND gate which was discovered in the conception of the sync insertion unit 144 of the present invention. It comprises a resistor S90 and a capacitor S92 connected in series across the two input conductors S2 and S6 of the AND gate S8. A diode or rectifier S94 is connected at the cathode thereof to the midpoint between resistor S90 and capacitor S92, and at the anode thereof to output conductor S10. A resistor S96 is connected in series between the anode of rectifier S94 and a source of +125 volts DC. Resistors S90 and S96 are both 330,000 ohm, ½-watt resistors; capacitor S92 has a capacitance of 500 micromicrofarads; and diode S94 is type 1N67A or the like.

The circuit of AND gate S8 operates in the following manner: The capacitor S92 and resistor S90 will always differentiate the 5 millisecond positive pulse on conductor S6 as is indicated by wave form S98. However, if no data arrival signal is present on conductor S2, diode S94 will have a back bias applied to it of +125 volts, i.e., the +250 volts on conductor S2 minus the +125 volts applied to resistor S96. The negative portion of the differentiated pulse on conductor S6, appearing at the cathode of diode S94, will at maximum be a drop of only about 90 volts, and this will not be great enough to overcome the back bias of 125 volts across diode S94. Therefore, no output will be produced on S10. However, if the data arrival signal exists on conductor S2, i.e., it is at +125 volts, no back bias will be applied to diode S94 and the negative portion of the differentiated pulse on conductor S6 will drop to a low enough voltage to cause diode S94 to conduct. A negative pulse then will be seen on conductor S10, as indicated in the drawing of FIG. 6. It will also be appreciated by those skilled in the art that diode S94 of AND gate S8 performs a dual function in that it acts as an isolation device for the signal on conductor S10, and thereby eliminates the need for another isolation device in OR gate S12.

THE INTERROGATION GATES

Referring now to FIG. 4C, each of the interrogation gates 154 comprise two triodes, G2 and G4, each being one half of a double triode type 5963, as is shown in detail by the enlarged "zero" channel interrogation gate. The cathodes of the two triodes G2 and G4 are connected together to ground through cathode resistor G6. The plates of the two triodes G2 and G4 are connected together and to a supply of positive 250 volts DC (not shown). The grid of triode G4 is also connected to a supply of +250 volts DC through grid resistor G8. The grid of G4 is connected through divider resistor G10 to conductor 132, an input to the AND gate 154. Another divider resistor, G12, is connected between conductor 132 and ground. AND gate 154 operates in much the same way as AND gate S32, shown in detail in FIG. 6, and the circuit of AND gate 154 is substantially the same as that of AND gate S16 of the sync insertion unit 144 (FIG. 6).

The two triodes G2 and G4 together form a cathode follower negative AND gate, that is only when both grids of the two triodes G2 and G4 are supplied with negative signals from the input conductors 132 and 152 will both tubes be cut off, and only then will output conductor 156 connected to the cathode thereof go negative. If only one negative signal is applied to either of the two inputs 132 or 152, one of the tubes G2 or G4 will still conduct, and the cathode thereof being at a positive level will produce a positive output on conductor 156.

Thus when a data interrogation pulse is produced on conductor 152, in the data flow control unit 150, and ground potential exists on conductor 132 due to the closure of its respective relay in the translator unit 128 (FIG. 4B), the respective interrogation gate 154 will produce a negative signal on its output conductor 156. This will supply the respective flip-flops, 158 of Storage I, with negative pulses which will set the flip-flops of Storage I, receiving the pulses, to the "1" state. Thus the character represented by relay closure in the translator unit will be stored in the flip-flops 158 of Storage I even after the respective relays of the translator unit 128 have been de-energized.

The preferred values of the resistors of the AND gates 154 are as follows: G6—22,000 ohms, 2 watts; G8—120,000 ohms, ½ watt; G10—47,000 ohms; ½ watt; G12—200,000 ohms; ½ watt.

THE STANDARD FLIP-FLOP STORAGE UNIT

Referring further to FIG. 4C, there is shown in detail the circuit of the tape feed flip-flop 160, of Storage I. The circuit of flip-flop 160 comprises a standard storage unit circuit which is used for all storage flip-flop units of the system including: the data storage flip-flops 158 of Storage I; the data storage flip-flops 166, tape feed flip-flop 168 and check bit flip-flop 170 of Storage II; and other storage units tob e later described in the length of message monitor unit 218.

Tape feed flip-flop 160 comprises two halves, F2 and F4, of a double triode type 5963 whose cathodes are coupled together by conductor F6. The input, or "set" conductor, 159 is connected through capacitor F8, in series with grid resistor F10, to the grid of triode F2. The cathode of triode F2 is connected to ground through a resistor F12, and the mid terminal between capacitor F8 and resistor F10 is connected to ground through resistor F14. The plate of triode F2 is supplied from a source of 250 volts DC (not shown) through plate resistor F16. Parallel connected resistor F18 and capacitor F20 are connected between the plate of triode F2 to a grid resistor, F22, which is connected, at its other terminal, to the grid of triode F4. A resistor F24 is connected between ground and the terminal of resistor F22 connected to resistor F18. The cathode of triode F4 is connected through a cathode capacitor F26 to ground. The plate circuit of triode F4 is connected in the same manner as the plate circuit of triode F2, that is the plate is connected through a plate resistor F28 to the 250 volt DC supply; and the parallel connected capacitor F30 and resistor F32 are connected between the plate of triode F4 and the grid resistor F10 of triode F2.

The values of the various components are chosen such that, due to the feedback of each of the triodes F2 and F4 from their plates to the opposite grid, either one or the other of the triodes will conduct. Thus, if triode F2 is conducting, output conductor 190 connected to the plate thereof will be negative, and this is arbitrarily considered to be the "zero" state of the flip-flop 160, hence conductor 190 is labeled "—0". If flip-flop 160 is in the zero state, that is triode F2 is conducting, a negative grid bias will be supplied through resistors F18 and F22 to the grid of triode F4 which will thereby be cut off. Thus, output conductor 196, connected to the plate of F4, will be at a positive potential. On the other hand, if triode F4 is conducting, conductor 196 will be at a negative potential, and flip-flop 160 will be considered to be in the "one" state, hence the "—1" label for conductor 196 as shown in FIG. 4C. When triode F4 is conducting a negative grid bias will be supplied to the grid of triode F2, through the resistors F32 and F10, and triode F2 will then be cut off.

Flip-flop 160 may be set to the one state by applying a negative signal on set conductor 159 which, in driving the grid of triode F2 negative, will cut that tube off if it is conducting. This will end the negative bias on the grid of triode F4 and it will then conduct, producing a negative signal on conductor 196. On the other hand, the flip-flop 160 may be set to the zero state (i.e., reset) by applying a negative signal to conductor 163 which, passing through isolation capacitor F34, will drive the grid of triode F4 negative, thereby cutting triode F4 off. The grid of triode F2 will then be positive and it will conduct and produce a negative signal signifying the zero state on conductor 190. The circuit is known in the art as a Eccles-Jordon circuit, or bistable multivibrator, as well as a flip-flop.

The following preferred values of rthe elements of flip-flop 160 have been chosen: Resistors F14 and F24, 330,000 ohms, ½ watt; resistors F10 and F22, 10,000 ohms, ½ watt; resistors F18 and F32, 470,000 ohms, ½ watt; resistors F16 and F28, 33,000 ohms, ½ watt; and resistor F12, 22,000 ohms, 1 watt. Capacitors F20 and F30 are 33 micromicrofarads, capacitors F8 and F34 are 20 mciromicrofarads and capacitor F26 is .005 microfarad.

THE OUTPUT CIRCUITS

An understanding of the output circuit portion of the central receiver-recorder of the present invention, designated generally at 202, may be gained by reference to FIG. 4D, wherein elements of the output circuits are identified by reference numerals preceded by the letter P, and the logic of the tape feed and check output circuits, 204 and 205 respectively, is shown in detail. The data output circuits 206, that is the check, zero, one, two, four, eight and X output circuits, as well as the tape feed output circuit 204, are all identical. The common circuit is shown schematically in FIG. 4D for the X output circuit 206, and the logic diagrams of the tape feed and check output circuits illustrate the operation of this circuit.

Referring now to the check output circuit 205, it comprises a positive AND gate P2, having a first input conductor P4 which is connected to the negative zero conductor of the Storage II check flip-flop 170. Thus, when the check flip-flop 170 contains a check bit its negative zero conductor will supply a positive signal to the input conductor P4 of positive AND gate P2. The AND gate P2 also has a second input conductor P6, connected to the fire data output circuit conductor 178, originating at the data flow control unit 150 (FIG. 4C). When check flip-flop 170 contains a bit, conductor P4 will be positive, and then when a positive signal occurs on the fire data output circuit conductor 178, conductor P6 connected thereto supplies the second positive input to AND gate P2. With both inputs positive, AND gate P2 produces an output on output conductors, 210 and P8. Due to the nature of the AND gate P2, which is a double grid thyraton, a positive signal will be supplied on conductor 210, and a negative signal on conductor P8. Corresponding output conductors P8 from each of the other output circuits are cabled together into multiconductor cable 212, and connected to monitoring circuits of the receiver-recorder. That is, the zero, one, two, four, eight, check and X output conductor P8 are collected into cable 212, and connected to the parity monitor unit 214 (FIG. 4C).

As will be understood by those skilled in the art, a thyratron once fired will continue to conduct, even though the input grids thereof are no longer supplied with positive signals, provided positive potential remains applied to the anode. Thus, AND gate P2 still produces output signals even after the input conductors P4 and P6 are no longer positive. Consequently, AND gate P2 is reset, as shown in check output circuit 205, by a reset signal originating at the data flow control unit 150, on reset output circuit conductor 180. The reset signal on conductor 180 is fed via input conductor P10, (connected to conductor 180), to a control circuit P12. Upon receiving a reset signal on conductor P10, control circuit P12 produces a reset signal for AND gate P2 on output conductor P14. The manner in which this resets AND gate P2 will be explained in detail below.

The reset signal on reset conductor 180, and thus on conductor P14, occurs approximately 5 milliseconds after the initial firing of AND gate P2, by operation of the fire data output circuits signal on conductor 178. In this way 5 millisecond power pulses are supplied on conductors 210 to the respective magnets of the tape punch 26, and holes are punched on tape 28 in the respective channels.

The tape feed output circuit 204 is fired in a slightly different manner, although the circuit is the same as the circuit of check output circuit 205. That is, AND gate P2 of output circuit 204 is fired by the application of a positive signal on its input conductor P4 together with a positive signal on its input conductor P6, but the positive signal on conductor P6 of circuit 204 originates at the tape punch 26 rather than at the data flow control unit 150 (FIG. 4C). This signal, called "punch sync," occurs each 16 ms. on conductor 200 when the punch 26 is ready to punch a character. Thus the tape feed thyratron is fired by a synchronization signal from the tape punch, which indicates that the tape punch is ready to receive data. Upon firing, the negative signal on conductor P8, of the tape feed output circuit 204, is sent to the data flow control unit 150, on conductor 182, as an "output sync" signal which, as will be understood by reference to the following description of the data flow control unit 150, immediately thereafter produces the fire data circuit signal on conductor 178. A positive pulse is sent to punch 26 on conductor 208 when the tape feed thyratron fires. This energizes the punch magnet which causes a sprocket or tape feed hole to be punched on tape 28. The thyratron of the output circuit 204 is reset by an amplifier P12, in the same manner as the AND gate P2 of output circuit 205.

Now referring to the schematic diagram of the various output circuits shown in detail as the X output circuit 206 in FIG. 4D, a thyratron P13 has one grid thereof connected by conductor P4 to the negative zero output of the Storage II X flip-flop, and the other grid thereof connected through resistor P15 and conductor P6 to the fire data output conductor 178. The cathode of thyratron P13 is connected through capacitor P16 to ground. Series connected resistor P18 and diode P19 are also connected between the cathode and ground. Conductor 210 is also connected to the cathode. Conductor 210 supplies the punch signal to the X magnet of the tape punch 26. The plate of the thyratron P13 is connected to a conductor P8, which is part of the cable 212 connected to the parity monitor unit 214 (FIG. 4C). The plate of P13 is also connected through a resistor P20 to a source of positive 250 volts DC.

It will thus be seen that when the X storage flip-flop 116 does not contain a bit, its negative zero conductor P4 will provide a negative signal to one grid of thyratron P13 and the thyratron will not be able to fire even upon receipt of a positive signal on its grid conductor P6. On the other hand, even if grid conductor P4 is positive, that is the flip-flop 166 is in the one state or contains a bit, thyratron P13 will not fire until conductor P6 supplies a positive signal. Therefore, upon being supplied with a positive signal on P4 and a positive fire data output circuit signal on conductor 178, thyratron P13 will fire. The cathode of thyratron P13 will then go positive, producing a positive pulse on conductor 210. The plate of thyratron P13 will go negative, producing a negative pulse on conductor P8, as shown in FIG. 4D of the drawings.

The thyratron control circuit P12 comprises a triode, P22, whose plate is connected to the plate of thyratron P13, and whose cathode is grounded. The grid of triode P22 is connected through a grid resistor P24 to reset conductor P10, which is connected to the reset output circuits conductor 180, from the data flow control unit 150 (FIG. 4C). Thus, upon receipt of a positive pulse on conductor P10, control triode P22 will conduct, reducing the positive potential on the plate of thyratron P13, and P13 will be cut off, thereby ending the signals on conductors P8 and 210.

The values of the various elements of the output circuits 202 are as follows: resistor P18 is a 1,000 ohm, ½-watt resistor; diode P19 is a Sarkes Tarzian type No. 10; capacitor P16 has a capacitance of .25 microfarad; resistor P15 has a resistance of 4.7 megohms at ½-watt. It will be understood that the negative zero output signal from the X flip-flop 166 of Storage II passes through referencing resistors in order to provide the proper negative bias to the grid of thyratron P13. Triode P22 is one half of double triode type 5687; resistor P20 connected thereto is a 7,500 ohm, 5-watt resistor and grid resistor P24 is a 100,000 ohm, ½-watt resistor. It also should be noted that the punch sync signal originating at tape punch 26, on conductor 200, is coupled through a coupling (not shown) before being applied to the thyratron of the tape feed output circuit 204, and that a grid resistor of 1 megohm resistance, rated at ½ watt, is then utilized in that circuit in place of grid resistor P15 shown in the X output circuit.

THE DATA FLOW CONTROL UNIT

Referring now to FIG. 7, the data flow control unit 150 is shown in detail. Elements of this portion of the apparatus of the invention are identified by reference numerals preceded by the letter D. The six millisecond positive pulse on input sync conductor 146 (from the sync insertion unit, 144 of FIG. 4B) is supplied to an inverter amplifier D2 where it is first differentiated and then inverted. This produces a negative pulse on output conductor D4 of amplifier D2, substantially simultaneously with the beginning of the input sync signal on conductor 146. Output conductor D4 of the inverter amplifier D2 is connected to the data interrogation conductor 152, which interrogates the previously described interrogation gates 154 shown in FIG. 4C. This sets the character, existing as negative levels on the output conductors 132 of the translator, into the data flip-flops 158 of Storage I. Output conductor D4 from inverter amplifier D2 is also connected to the input of a cathode follower D6. Cathode follower D6 supplies as the output thereof an amplified negative pulse on conductor 159, which is connected to the set input of the tape feed flip-flop 160 in Storage I. Thus the input sync signal on conductor 146 results in a data interrogation pulse on conductor 152 which occurs precisely 5 milliseconds after the beginning of the receipt of a data arrival signal at the sync insertion unit 144 (FIG. 4B). This data interrogation signal on conductor 152 results in the setting of the proper data flip-flops, 158 in Storage I (FIG. 4C). Simultaneously, the tape feed flip-flop 160 of Storage I is set.

Therefore, when the tape feed flip-flop 160 of Storage I contains a bit (i.e., when it is in the "1" state), it is an indication that there is a character stored in the data flip-flops 158 of Storage I. As will be explained below in detail, when the character stored in Storage I is shifted to Storage II, the tape feed flip flop 168 of Storage II will be set, indicating that there is a character in Storage II, and this is indicated to the data flow control circuits by the "—0" plate of the tape feed flip-flop 168 being connected to Storage II empty conductor 186.

The shift of a character from Storage I to Storage II is accomplished in the following manner: When Storage I is being filled, i.e., a data interrogation pulse is present on conductor 152, one input of a first two input terminal AND gate D8 will be supplied with the negative signal on conductor D4. If, at this time, Storage II is empty, the tape feed flip-flop 168 in Storage II will supply a negative signal on conductor 186, which is connected to the other input of AND gate D8. Therefore, a pulse corresponding to the pulse on conductor D4 will be produced on output conductor D10 of AND gate D8. The negative pulse produced on conductor D10 will pass through negative OR gate D12 and be supplied as an input to a delay device D14, via conductor D16. Delay device D14 will immediately produce a 0.1 millisecond duration pulse which will be differentiated by differentiating network D18. The negative portion of this pulse will pass through diode D20 and be supplied to a cathode follower D22. Cathode follower D22 will amplify the pulse supplied from diode D20, and this amplified pulse will be supplied to the reset Storage I conductor 163.

All the flip-flops 158–160 of Storage I will then be reset and, upon being reset, their "—0" conductors 190 will go negative, thereby producing a set signal for the corresponding flip-flops of Storage II. In this manner, the character stored in Storage I, along with the tape feed bit, will be transferred to Storage II.

If, however, Storage II is not empty when Storage I is being filled by the data interrogation pulse on conductor 152, AND gate D8 will not be supplied with a negative signal on conductor 186, which is connected to the negative zero plate of tape feed flip-flop 168 of Storage II. Thus, a reset signal will not be supplied to Storage I on conductor 163, and the character will remain in Storage I.

The fact that the character is being stored in Storage I is indicated on the "—1" plate of tape feed flip-flop 160 of Storage I. Conductor 196 connected thereto supplies this signal to a second AND gate D24. When Storage II is being emptied, in a manner to be described below, a reset Storage II signal occurs on conductor 184. This is supplied to the other input of AND gate D24. Thus, if the reset negative pulse on conductor 184 occurs when Storage I contains a character, it will pass through AND gate D24 and appear on output conductor D26. The negative pulse on conductor D26 will pass through OR gate D12, and immediately will produce a 0.1 millisecond duration positive pulse as the output of delay D14. This pulse will be differentiated and the negative portion of the differentiated signal will pass through diode D20, be amplified by cathode follower D22, and result in a negative reset Storage I signal on conductor 163. The character stored in Storage I will then be transferred to Storage II.

In this manner, any character stored in Storage I will be transferred to Storage II, upon Storage II being emptied, and if Storage II is empty when a character is set into Storage I, it will be transferred promptly to Storage II. Thus, if a character is in storage, it will substantially immediately be available to the output circuits 202, and through them upon request to the tape punch 26 (FIG. 4D).

AND gates D8 and D24 are cathode follower AND gates of the type previously described, such as is shown in schematic detail within the X interrogation gate 154 (FIG. 4C). OR gate D12 comprises two diodes D28—D28 as shown. Delay device D14 is a delay flop, such as described above with reference to the sync insertion unit 144 (FIG. 6), and is substantially the same as delay device D30 to be described below. It will be apparent to those skilled in the art that the 0.1 millisecond delay afforded by delay device D14, prior to resetting Storage I by the reset signal on conductor 163, is necessary in order to assure the accurate flow of the character through Storage I to Storage II, since the flip-flops of Storage I must settle down after being set and before being reset. The 0.1 millisecond delay period of delay flop D14 supplies this required delay time and allows for the necessary "set time" of the Storage I flip-flops. It will also be evident to those skilled in the art that this delay time covers the reset time of the flip-flops of Storage II, since the flip-flops of Storage II are being reset when AND gate D24 receives the Storage II emptied signal (i.e., the reset Storage II signal) on conductor 184, and the Storage II flip-flops must be allowed to settle down before set signals are applied thereto by the resetting of the flip-flops of Storage I.

Inverter amplifier D2 comprises a triode D30, one half of a double triode type 5963 whose cathode is connected directly to ground. The plate of triode D30 is connected through a 247,000 ohm, ½-watt resistor, D32, to ground, aind through a 120,000 ohm resistor, D34, to a source of plus 250 volts (not shown). Input sync conductor 146 is connected to one side of a .001 microfarad capacitor D36. The other side of capacitor D36 is connected through resistor D38, a 1,000 ohm, ½-watt resistor, to the grid of triode D30. A grid biasing resistor, D40, is connected between a source of minus 48 volts DC (not shown) and the mid terminal between capacitor D36 and resistor D38. Resistor D40 has a resistance of 100,000 ohms and a ½ watt power rating.

It will be seen that the input sync signal on conductor 146 is first differentiated by capacitor D36 and resistor D40 and the positive portion of the signal resultant of the differentiation is applied through resistor D38 to the grid of triode D30. This signal causes triode D30 to conduct, producing a negative signal on conductor D4 which is connected to the plate thereof.

Cathode followers D6 and D22 are exactly the same circuit and comprise, as shown within D6 in FIG. 7, a triode D42, which is one half of a double triode type 5963. The plate of triode D42 is connected directly to a source of plus 250 volts DC (not shown), and the cathode thereof is connected through a 22,000 ohm, 2-watt cathode resistor D44 to ground. Output conductor 159 is connected directly to the cathode of triode D42, and input conductor D4 is connected directly to the grid thereof. Thus, a negative signal on conductor D4 cuts off cathode follower D42, thereby providing a negative signal at the cathode for conductor 159 which is connected thereto.

Still referring to FIG. 7, the transfer of data from the Storage II flip-flops to the output circuits 202 (FIG. 4D) of the central receiver-recorder is controlled in the following manner. Upon receipt of a punch sync signal on conductor 200 from the tape punch 26 (FIG. 4D), the tape feed output circuit 204 fires as previously explained. This provides a positive signal on tape fed conductor 208 for the tape feed magnet of the punch 26, and a negative signal on output sync conductor 182 for the data flow control circuits. The negative pulse on conductor 182 is supplied to a delay device D46. Delay device D46 produces a positive pulse on output conductor D48 of 0.5 millisecond duration, from the beginning of the negative pulse on conductor 182. The positive pulse on conductor D48 is differentiated by the differentiating network D50. The negative portion of the differentiated signal is passed through diode rectifier D52 to cathode follower D54, where it is amplified and supplied as an output on conductor 184. This output is the reset Storage II signal. Thereby, 0.5 millisecond after the firing of the tape feed output circuit 204, all of the flip-flops of Storage II are reset.

Therefore, during this 0.5 millisecond period the data output circuits must be fired. This is accomplished by supplying the output sync signal on conductor 182 to a 5 millisecond delay D56, which produces a 5 millisecond positive pulse on output conductor D58 thereof. The positive pulse on conductor D58 is supplied as an input to differentiating network D60, and the differentiated output signal of differentiator D60 is supplied to conductor 178, the fire data output circuits conductor. The positive portion of this signal, which as will be understood occurs substantially simultaneously with the beigining negative portion of the output sync signal on conductor 182, fires the data output circuits 206. The 5 millisecond duration pulse on conductor D58 is also supplied as the input to an inverter amplifier D62. Upon termination of the 5 millisecond duration pulse on conductor D58, amplifier D62 produces a positive pulse on output conductor 180 thereof, which is the reset output circuit conductor. Thus, 5 milliseconds after the firing of all data thyratrons 206 and the tape feed thyratron 204, the reset output circuit signal on conductor 180 is suplied to all the output circuits 202, and all thyratrons are extinguished. In this manner the punch magnets of the tape punch 26 (FIG. 4D) are supplied with substantially simultaneous 5 millisecond energizations, which results in punching the character that was stored in Storage II immediately prior to energization of the punch magnets.

If a punch sync signal is received on punch sync conductor 200, and no data is in storage in Storage II at that time, a positive signal will not be supplied by the "—0" conductor of tape feed flip-flop 168 of Storage II to conductor P4 of the tape feed output circuit 204, and the tape feed circuit will not fire (FIGS. 4G–4D). Thus, no tape fed signal will be sent to the punch on conductor 208, and no output sync signal will be generated on conductor 182.

It will be understood by those skilled in the art that the 0.5 millisecond delay of D46 is necessary in order that all of the output circuits be allowed to fire before the resetting of Storage II, that is the erasing of the character in storage. Delay device D46 utilizes the same circuit as delay device D14, except that the controlling resistors therein have different values to provide the different delays.

The three delay devices D14, D46 and D56 all have the same basic circuit as is shown in detail for delay device D56. Delay device D56 comprises two triodes, D64 and D66, each being one half of a double triode type 5963. As in the delay devices previously described, which are in the sync insertion unit 144 (FIG. 6), the two cathodes of the two triodes D66 and D64 are connected through a cathode resistor D68 to ground, and the grid of triode D64 is grounded. The plate of triode D66 is connected through a resistor D70 to asource of plus 250 volts DC (not shown), as is the plate of D64 through the plate resistor D72. The output sync conductor 182 (the input to delay D56) is connected through capacitor D74 to the midpoint between two series connected resistors D76 and D78. Resistor D78 is connected to the other terminal thereof to the grid of triode D66. The plate of triode D64 is also connected through a coupling capacitor D80 to the mid point betwen the series connected resistors D76 and D78, and a resistor D82 is connected between the source of plus 250 volts DC and the midpoint between the series connected resistors D76 and D78.

When characters are being received, no signal is supplied to resistor D76 from conductor D84, which is one conductor of the master reset cable 172 from the test and reset unit 262 (FIG. 4B). Delay device D56, upon receipt of the negative output sync signal on conductor 182 through coupling capacitor D74 and grid resistor D78, then produces a 5 millisecond delay as timed by resistor D82 and capacitor D80, in the same manner as the other delay flops which have been previously described. However, if conductor D84 is grounded at the test and reset circuits 262, delay device D56 will be converted from a monostable multivibrator to an astable, or free-running, multivibrator (sometimes called a relaxation oscillator). Delay device D56 will then produce a continuous rapid series of pulses on conductor D58, which will result in continuous "fire data" output circuit impulses on conductor 178, and continuous "reset" output circuit impulses on conductor 180. However, the fire data output circuit pulses on conductor 178 will have no effect, since all the flip-flops of Storage II will be in the zero state when no data is received, and the two conditions required for firing the output circuits will not be fulfilled. On the other hand, the reset output circuit pulses on conductor 180 will continuously reset the output circuits, so that at the end of master reset they will be ready to receive data. In the same manner, delay device D46 is supplied with a ground on conductor D86, and delay device D14 is supplied a ground on conductor D88 of the master reset cable 172, thereby both of these delay devices are converted into free-running multivibrators during the period of master reset. This produces continuous reset Storage I signals on conductor 163, and continuous reset Storage II signals on conductor 184, whereby the flip-flops of Storage I and Storage II are continuously reset to zero during master reset time. Thus, at the end of master reset time, both storage units are ready to receive data and will not contain erroneous bits introduced through pickup or noise, etc.

The values of the components used in delay device D56 are as follows: resistor D76 has a resistance of 100,000 ohms; resistors D78, 10,000 ohms; resistor D68, 4700 ohms; resistor D72, 150,000 ohms; resistor D82, 1.8 megohms. Resistors D76, D78, D68, D72 and D82 are all ½-watt resistors. Resistor D70 is a 27,000 ohm, 2-watt resistor. Capacitor D80 has a capacitance of .01 microfarad and capacitor D74 has a capacitance of 20 micromicrofarads. In the circuit of delay D14, capacitor D80 has a capacitance of 150 micromicrofarads and resistor D82 has a resistance of 2.2 megohms. Also in that circuit, capacitor D74 has a capacitance of 50 micromicrofarads. In delay D46 resistor D82 has a resistance of 2.2 megohms and capacitor D80 is a 1,000 micromicrofarad capacitor; capacitor D74 being 20 micromicrofarads.

Inverter amplifier D62 comprises a triode D90, which is one half of a double triode type 5963. The positive 5 millisecond duration pulse on conductor D58 is differentiated by the capacitor D92 and resistor D94, both of which are connected in series between conductor D58 and ground. The midpoint between the series connected capacitor D92 and resistor D94 is connected to the grid of triode D90, and thus the positive pulses followed by the negative pulses shown thereat are supplied to the grid of triode D90. The plate of triode D90 is connected through a plate resistor D96 to a source of plus 250 volts (not shown), and through a capacitor D98 to conductor 180. Conductor 180 is also connected through resistor D100 to a source of minus 48 volts DC (not shown). Thus, upon being supplied with the negative signal resultant of the differentiation of the 5 millisecond pulse on conductor D58, triode D90 will be cut off, producing at the plate thereof a positive signal which will be seen by conductor 180. In this manner, inverter-amplifier D62 produces a positive pulse to reset the output circuits on conductor 180 approximately 5 milliseconds after the output sync signal is applied to delay device D56 on conductor 182.

In the circuit of the inverter-amplifier D62, capacitor D92 has a capacitance of 1,000 micromicrofarads. Resistors D94, D96 and D100 all have a resistance of 100,000 ohms, and a power rating of ½ watt, and capacitor D98 has a capacitance of .03 microfarad.

It will be apparent to those skilled in the art that there has been disclosed a novel form of buffer storage, or shift register, wherein data is received into the first element of the shift register upon request, and data is transmitted from the last stage of the shift register, also upon request, and in which characters in the shift register are continuously being shifted through the series connected stops thereof to the last empty storage stage nearest to the output storage stage.

A generalization of this novel shift register is shown in FIG. 8 wherein any number of binary elements A, B, . . . , N are connected into a series. Each binary element is associated with one stage of storage of the shift register and is set when a character is stored in its respective stage. Thus upon receipt of set signal on conductor D102, binary element A is set to "1" as indicated. This means that a character is stored in the first stage of storage of the shift register. Upon being reset by a signal applied to reset conductor D104, binary element A is reset to "0," as indicated, and a set signal is sent via conductor D106 to binary element B, which is set to "1," as indicated. Upon being reset to "0," as indicated by a signal on conductor D108, binary element B sends, via output conductor D110 thereof, a set signal to the next stage of storage. Binary element N is set to its "1" state upon receipt of a signal on conductor D112, this being a signal which originates upon resetting of the prior binary element in the series. The dotted lines indicate that any number of binary elements may be inserted in series between binary element B and binary element N. Binary element N is reset to "0" upon receipt of a signal on reset conductor D114.

Each stage of the shift register has associated with it two AND gates, D116 and D118, an OR gate, D120, and a delay device, D122, connected in exactly the same manner as AND gates D8 and D24, OR gate D12, and delay device D14 associated with the tape feed flip-flop of Storage I (FIG. 7).

Thus AND gate D116 is responsive to simultaneous signals on the set conductor D102 of its negative binary element, and conductor D124 connected to the next binary element of the series, which is supplied with a signal when the next binary element is in the "0" state, as indicated. Upon receipt of these two signals, AND gate D116 produces a signal which passes through OR gate D120, is delayed by delay device D122, and results in a reset signal, being to its respective storage stage. AND gate D118 is connected to a conductor D126, which in turn is connected to its respective stage of storage and energized when its respective storage contains a character, i.e., when its binary element is in the "1" stage. AND gate D118 is also connected to conductor D128, which is connected to the reset conductor of the next respective binary element: Upon receipt of signals on conductors D128 and D126 simultaneously, AND gate D118 produces a signal which passes through OR gate 120, is delayed by delay D122, and produces a reset signal for its respective binary element.

Thus AND gates D116 shift characters as they are received to the next respective stage of storage if the next stage is empty, and AND gates D118 shift characters stored in their respective stages to the next respective stage when the next respective stage becomes empty.

The last binary element of the shift register binary element N has associated with it an AND gate D130, which is supplied with one input from a conductor D132, which in turn is energized when binary element N is in the "1" state. AND gate D130 is also connected to conductor D134, which is energized by an output request signal. Thus, when binary element N is in the "1" state, and an output request signal is received on conductor D134, AND gate D130 produces a signal which is delayed by delay device D136, producing a reset signal on reset conductor D114. The output conductor D138 originating at binary element N is connected so as to produce a signal when binary element N is set, or reset, as desired. Thus, in the above manner, characters stored in binary element N may be supplied on output conductor D138 upon an output request signal being supplied on conductor D134.

The shift register above described, shown in FIG. 8, is useful primarily in systems such as the central receiver-recorder of the present invention, wherein an output device is supplied by characters upon demand, at a given rate, and characters are supplied to the shift register prior to being supplied to the output device at a slower rate than being requested by the output device. If the output request rate and the input rate are invariant, few stages of storage will be necessary. However, more stages of storage will be required as the average deviation from the normal rates increases. Thus, the shift register shown in FIG. 8 may be used in any systems, so long as the average rate at which characters are being received is less than the average rate at which they are being requested for output. The number of storage stages required will be proportional to the deviation of the input and output rates from their averages.

THE PARITY BIT INSERTION UNIT

In FIG. 9 of the drawings, elements of the parity check bit insertion portion of the invention are designated by reference numerals preceded by the letter I. Referring now to FIG. 9, the check bit insertion unit of the present invention, indicated generally at 192, comprises a plurality of AND gates, designated I2, I4, I6, I8, I10 and I12, which are connected via conductors 196 and 190 to the data storage flip-flops, 158, of Storage I. These AND gates are paired off together with the storage flip-flops to which they are connected; thus AND gates I2 and I4 are connected to the zero and one flip-flops; AND gates I6 and I8 are connected to the two and four flip-flops, while AND gates I10 and I12 are connected to the eight and X flip-flops. The AND gate I2 is connected to the "—1" conductors, 196, of the zero and one flip-flops, while AND gate I4 is connected to the "—0" conductors, 190, of the zero and one flip-flops. Output conductor I14 of AND gate I2 will be negative when supplied with negative signals on conductors 196, i.e., when both the zero and the one flip-flops are in the "one" state. Hence, the label "1 & 1" for gate I2, as shown in the drawing of FIG. 9. In the same manner, AND gate I4 will produce a negative signal on output I16 when both the zero and the one flip-flops are in their "zero" state, hence the label "0 & 0" in the drawing of gate I4.

The outputs I14 and I16, of the two AND gates I2 and I4, are fed to OR gate I18 which comprises two diodes, I20, providing isolation between the two signals on conductors I14 and I16. Thus a negative output signal will exist on output conductor I22 of OR gate I18 whenever I14 or I16 is negative (i.e., whenever the zero and one flip-flops, 158, are both in the "one" state and contain a bit; or when both flip-flops are in the "zero" state and do not contain bits). In the same way, OR gates I24 and I26 produce negative signals on the outputs thereof whenever the two and the four flip-flop are in the same state in the case of OR gate I24, and the eight and X flip-flop are in the same state in the case of OR gate I26.

The outputs from the OR gates I18, I24 and I26 are fed to three dual level circuits I28, I30 and I32. When a negative signal is supplied to the input of these circuits, I22 of circuit I28 for example, they produce at one output thereof, e.g., 136 of circuit I28, a negative signal. When a negative signal is not supplied to circuit I28 on conductor I22, circuit I28 produces a negative signal on its other output conductor, I34.

It is apparent, therefore, that a negative signal on conductor I22 indicates that both of the respective flip-flops 158 connected thereto (that is the zero and the one flip-flop) are in the same state; either both contain a bit, or both do not contain a bit. Thus, a signal on I22 indicates an even parity in respect to the zero and one flip-flop. The same is true for the outputs of the other two OR gates, I24 and I26, as to the parity of their respective flip-flops 158. A negative output on conductor I36 from dual level circuit I28 indicates even parity at the zero and one flip-flops 158 hence the "-E" label in the drawing; and similarly, a negative output on conductor I34 indicates odd parity, hence the "-O" label in FIG. 9 of the drawing.

As also can be seen in FIG. 9, four negative AND gates, I38, I40, I42 and I44, are connected to the three dual level circuits I28, I30 and I32. The reason for having four AND gates, I38 through I44, is that each of these AND gates is to monitor the dual level circuits I28, I30, and I32 for one of the four possible even situations that may occur among the three dual level circuits. Thus AND gate I38 is connected to the odd, "-O", output conductor I34 of I28, the odd, "-O", output conductor of dual level circuit I30, and the even "-E" output conductor of dual level circuit I32. AND gate I38 produces a negative output when I28 and I30 indicate odd situations among zero and one, and the two and four flip-flops 158, and dual level circuit I32 indicates even situations among the eight and X flip-flops 158; which will be understood to be an even situation among the six flip-flops 158. That is, either the one or zero flip-flops will contain a bit; the two or four flip-flops will contain a bit; and the eight and X flip-flops will either both contain bits or will both not contain bits. Thus there will be an even number of bits stored in Storage I flip-flops 158 (one in flip-flops zero or one; and one in flip-flops two or four; and one each or none in flip-flops eight and X), hence an even situation. AND gate I38 will then produce a negative output on its output conductor I46.

For convenience in describing the check bit insertion unit, dual level circuit I28 has been labeled A; dual level circuit I30, B; and dual level circuit I32, C, in FIG. 9 of the drawings. Thus, in respect to AND gate I40, the labels at the inputs thereof, AO, BE, CO, indicate that AND gate I40 monitors for simultaneously odd situations at dual level circuit A, even situations at dual level circuit B, and odd situations at dual level circuit C. When this situation exists among the three dual level circuits, AND gate I40 will produce a negative output on its output conductor I48. The same labeling system applies to the AND gate I42 and the AND gate I44.

The four output conductors I46, I48, I50 and I52 of the four AND gates I38 through I44 are all connected as inputs to an OR gate I54. Each, if negatively energized, will produce a negative output on output conductor I56. Thus, a negative output on conductor I56 will indicate one of the four possible even situations in the Storage I flip-flops 158. Conductor I56 is also connected as an input to AND gate I58, the other input thereof being connected to the reset Storage I conductor 174, from the data flow control unit 150 (FIG. 4C). The output of AND gate I58 is connected to the set check conductor 194, which, as also can be seen in FIG. 4C, is connected to the check bit flip-flop 170 in Storage II.

Therefore as a final output of the check bit insertion unit, if there is an even situation among the six storage flip-flops, 158 of Storage I, the reset signal applied to the flip-flops of Storage I will also produce a set check signal on set check conductor 194, which will set a check bit into the check bit flip-flop 170 of Storage II. In this manner, an odd number of bits always will be stored in the data flip-flops 166, taken with the check flip-flop 170, of Storage II (FIG. 4C).

Now again referring to FIG. 9, one of the AND gates connected to the data flip-flops 158 of Storage I, AND gate I12, is shown in detail. This AND gate comprises two triodes, I60 and I62, each being one half of a double triode type 5963. The cathodes of the two triodes I60 and I62 are connected together, and to ground, through a 22,000 ohm, 2-watt cathode resistor I64, forming the familiar cathode follower negative AND gate. The grid of triode I60 is connected to ground through grid resistor 166, a 1 megohm ½-watt resistor. The grids of triodes I60 and I62 are each connected through input resistors 168 and 170 (both 1.5 megohms at ½-watt), to the negative zero output conductors 190 of the respective eight, and X, flip-flops 158, of Storage I. The plates of the triodes I60 and I62 are connected together to a source of +250 volts DC (not shown). The grid of triode I62 is connected through a 1 megohm ½-watt resistor, 172, to the "enable check bit insertion" conductor 198, from the test and reset circuits 262 (FIG. 4B).

The enable check bit insertion signal on conductor 198 is a ground; when grounded, conductor 198 completes the circuit for the negative AND gate I12. Then, if negative signals are supplied on the zero output conductors 190, from the eight, and X, flip-flops 158, both triodes I60 and I62 will be cut off. A negative output signal will then exist on output conductor 174 of AND gate I12, since it is connected to the cathodes of the triodes I60 and I62. If only one of either the eight or the X flip-flops is in the "zero" state, the negative signal applied to only one grid of the two triodes I60 and I62 will cut off that tube only, and the potential on output conductor 174 will be governed by the conducting tube, thus remaining positive. No signal will then be presented to OR gate 126. It will be seen, therefore, that AND gate 112 operates in much the same manner as the previously described cathode follower AND gates of the other units of the central receiver-recorder.

Now during master reset periods, as previously described in the discussion of the data flow control unit 150 (FIG. 4C), Storage I and Storage II are continuously being reset. That is, when no message gate is either being received from a transmitter, 20, or generated in the central receiver-recorder 22, the storage flip-flop circuits are being constantly reset. Since the flip-flops 158 in Storage I are constantly being reset to zero, this means that there will constantly be an instantaneous condition which would appear to the check bit insertion unit 192 as an even situation in Storage I. Each of the OR gates, 118, 124, and 126 would produce a negative output since all flip-flops 158 will be in the zero state. Therefore, the dual level circuits 128, 130 and 132 would each produce a negative "even" output signal, which would result in a negative output signal on the output conductor 152 of AND gate 144. Conductor 156 would then have a negative signal thereon, indicating the even situation in Storage I. When Storage I is constantly being reset, the reset Storage I signal will be repeatedly presented on conductor 174 to AND gate 158, and a set check signal would therefore be repeatedly sent via conductor 194 to the check bit flip-flop 170 of Storage II. Check bit flip-flop 170 would therefore constantly be set by the check bit insertion unit 192, and constantly reset by the reset signal on conductor 184 generated in the data flow control unit 150.

Then, at the end of master reset, the status of the check bit flip-flop 170 in Storage II would not be uniquely determined. It could either be set, or it might not be set. If it were set, then on the next occurrence of punch sync on punch sync conductor 200, a hole would be punched in the check channel of the tape 28. To overcome this difficulty, during master reset, the ground signal on conductor 198 is removed. Under these conditions, the grid of triode 162 will remain positive and triode 162 will conduct, thus conductor 174, governed by the most positive cathode of the two triodes, 160 and 162, will remain positive. Since the eight and the X flip-flops 158 are constantly being reset to zero, no signal will be presented to OR gate 126 from either AND gate 110 (because the eight and X flip-flop 158 are both in the zero state) or from AND gate 112, since the removal of the ground on conductor 198 has made it appear to AND gate 112 that the X flip-flop 158 is in the "one" state. Therefore, the dual level circuit 132 will provide a signal on its "—0" conductor and none of the AND gates, 138, 140, 142 or 144, will provide a signal for OR gate 154, and no signal will be presented to AND gate 158 on conductor 156. Thus the reset Storage I signals on conductor 174 will not pass through AND gate 158, and no set check signals will occur on conductor 194.

Dual level circuit 128, as shown in detail in FIG. 9, comprises two triodes, 178 and 176, each being one half of a double triode type 5963. Both triodes are connected in much the same manner as the flip-flops 158 of Storage I, except that no feedback is provided from the plate of triode 178 to the grid of triode 176. On the contrary, the grid of triode 176 is connected directly to the output conductor 122 from OR gate 118. The two cathodes of triodes 176 and 178 are connected through cathode resistor 180 to ground. Resistor 180 is a one-watt 22,000 ohm resistor. The grid of triode 178 is connected to ground through a grid resistor 182 (330,000 ohms, ½-watt). The grid of triode 178 is also connected to the plate of triode 176 through coupling resistor 184 (470,000 ohms ½-watt). The plates of the two triodes 176 and 178 are connected to a source of +250 volts DC, through plate resistors 186 and 188 respectively (each a 33,000 ohm, 1-watt resistor). The plate of triode 178 is also connected through two series connected plate resistors, 190 and 192, to ground; as is the plate of triode 176 through series resistors 194 and 196. Resistors 190 and 194 are both 470,000 ohm, ½-watt resistors, and resistors 196 and 192 are both 1-megohm, ½-watt resistors.

The "—E" output conductor 136 is connected to the mid point between resistors 190 and 192, and thus is supplied with a negative signal when triode 178 conducts; and the "—0" output conductor 134 is connected between resistors 194 and 196, and thus is supplied with a negative signal when triode 176 conducts. It therefore can be seen that when a positive signal is supplied to the grid of triode 176 on input conductor 122, triode 176 will conduct, thus producing a negative signal on the "—0" output conductor 134. A negative signal will then be supplied through resistor 184 to the grid of triode 178, which will be cut off. When a negative signal is supplied to the grid of triode 176 on conductor 122, triode 176 will be cut off, and through the feedback provided by resistor 184 the grid of triode 178 will go positive, allowing triode 178 to conduct. This will produce a negative signal on output conductor 136, indicating an even situation in the zero and one flip-flops 158 of Storage I.

Dual level circuits 130 and °32 operate in exactly the same manner as dual level circuit 128. AND gates 12, 14, 16, 18, 110, 138, 140, 142, 144 and 158 use the same cathode follower AND gate circuit as shown in FIG. 9 for AND gate 112, except that three cathode followers are coupled together to provide three input terminal AND gates in the case of 138, 140, 142 and 144. Also, each of the grids of the other AND gates are properly grounded through a grid resistor, such as 166 or 172 of AND gate 112. OR gate 154 can be a simple buffer using four diodes in the manner of the two diodes 120 of the two input OR gate 118. OR gates 124 and 126 are, in the preferred embodiment of the invention, exactly like OR gate 118.

It will be obvious to those skilled in the art that various equivalent circuits may be substituted for portions of the circuit shown in FIG. 9. For example, two OR gates and AND gate may be substituted for the two AND gates 12-14, and OR gate 118, to produce an output signal on conductor 122 indicating even situations in the zero and one storage flip-flops 158. Each OR gate would have its input terminals connected to the "—1" conductor of one flip-flop and the "—0" conductor of the other. The output terminals of the two OR gates would be connected to the input terminals of the AND gate and the output terminal thereof would be connected to conductor 122.

In the check bit insertion unit 192, there has been provided very simple circuitry for determining the evenness of the number of bits stored in Storage I. In particular, the use of three dual level circuits, after determining the parity of pairs of flip-flops, greatly reduces the amount of circuitry required to produce the necessary output. Conventional practice would dictate the use of a plurality of AND and OR gates organized into two stages, first to determine the parity of the outputs of two of the OR gates, e.g., 122 and 124, and then to determine the evenness or oddness of the overall situation, that is, for example, between the resultant parity of two OR gates, 122 and 124, and the third OR gate 126.

THE PARITY MONITOR UNIT

Referring now to FIG. 10, there is shown in detail the parity monitor unit 214 which comprises seven dual level circuits, each designated M2. The input of each dual level circuit is connected to one conductor of cable 212. Thus, each of the dual level circuits M2 is governed in operation by a signal on a conductor of cable 212, indicating that the respective X, eight, four, two, one, zero or check circuit of output circuits 202 (FIG. 4D) is firing. The "—0" and "—1" outputs of the dual level circuit M2, which are connected to the X, eight, four, two, one and zero output circuits, supply inputs to circuitry within the dotted box M4, which performs the same function, and preferably is the same circuitry, as that shown within the dotted box M4 of FIG. 9.

The negative even ("—E") output conductor M6 of the circuitry M4 is supplied as an input to another dual level circuit, M8, which produces a negative signal on output conductor M10 when the overall parity of the X, eight, four, two, one and zero channels is even, and a negative signal on negative odd "—0" conductor M12 if the parity thereof is odd. That is, if the number of monitored channels firing is odd, conductor M12 will be negative. The overall parity between these channels is then compared with the parity of the check channel, by means of AND gates M14–M16, and OR gate M18. AND gate M14 has one input thereof connected to the "—1" conductor of the dual level circuit M2, which is connected to the check channel output circuit by cable 212. The other input thereof is connected to the negative odd conductor M12 of dual level circuit M8. AND gate M14 therefore produces an output signal on output conductor M20 when dual level circuit M8 indicates an overall odd parity among the channels it monitors, provided the check channel contains a bit.

AND gate M16 has one input thereof connected to the "—0" conductor of the dual level circuit M2, which is connected to the check channel. The other input is connected to the negative even conductor M10 of dual level circuit M8. AND gate M16 therefore produces, on its output M22, a negative signal when dual level circuit M8 indicates an even number of bits in its monitored channels, provided the check channel does not contain a bit, this being an overall even situation. Therefore, the output conductor M24 of OR gate M18 is energized (in the manner of previously described negative OR gates) whenever the overall situation is even; due to the oddness of the channels monitored by dual level circuit M8 and the fact that the check channel contains a bit, or because the overall situation monitored by dual level circuit M8 is even and the check channel does not contain a bit.

Conductor M24 is connected to the input of a cathode follower circuit M26 where the signal is amplified and then appears as an output signal on parity even conductor 216 connected to the error signaling unit 238 (FIG. 4C). A negative signal on conductor 216 therefore indicates that the parity of the output circuits is even.

The dual level circuits of the parity monitor unit are substantially the same as the dual level circuits of the check bit insertion unit (FIG. 9), as are the AND and OR gates of the parity monitor unit substantially similar to the AND and OR gates of the check bit insertion unit. Cathode follower M26 may be any convenient power power amplification device, such as, for example, the cathode follower circuit D6 of FIG. 7.

THE LENGTH OF MESSAGE MONITOR UNIT

The length of message monitor unit 218 is shown in detail in FIG. 11. Elements of this portion of the apparatus are identified by reference numerals preceded by the letter L. This unit comprises three AND gates, L1–L2–L3, each of which has connected as one input thereto one of the three conductors 132, which are respectively connected to the one, two and four output conductors of translator unit 128. The other input of each of the three AND gates L1–L2–L3, is supplied by conductor L4, which is connected to the output of a 4 millisecond delay multivibrator L6. The length of message sync pulse conductor 224, from the control circuits 90, is connected to the input of delay device L6. The length of message sync pulse on conductor 224 is a positive pulse, and the 4 millisecond delay device L6 is responsive to the terminating portion of the positive pulse on conductor 224, and, 4 milliseconds thereafter, produces a negative pulse on conductor L4. Now the length of message sync pulse originates at the scanner 58 of the transmitters 20 (FIG. 4A) and consists of the grounding of the arcuate contacts on scanner 58, which is connected to length of message conductor 114 of the main cable. This signal is converted through a relay in the control circuits 90 (FIG. 4B) to the positive pulse on conductor 224. The contacts on the scanner 58 are closely adjacent and, for all practical purposes, there is no time delay between the end of the length of message sync pulse and the grounding of the next conductor on the scanner 58, which is connected through contacts made in the variable information encoder 25 to one of the Hollerith conductors 49, of the Hollerith lines 46. Connection of a particular Hollerith conductor indicates the length of message, that is the number of characters of the message then being transmitted. By the time that 4 milliseconds has elapsed after the end of the length of message sync pulse on conductor 224, the translator 128 will have translated the length of message character into a binary number consisting of the selective energization of combinations of the one, two and four translator output conductors 132. The negative pulse on conductor L4 will allow the AND gates L1–L2–L3 to set three flip-flops, L7–L8–L9, with a number corresponding to the number of characters of the message being transmitted.

It will be understood that the actual number of characters of the message is not transmitted, but what is transmitted is one of the cardinal numbers, one through seven (by the grounding of one of the Hollerith lines one through seven), which will be determined by taking the actual number of characters of the message being transmitted and dividing this number by 8, the remainder of this division, if differing from zero, being the number transmitted on the Hollerith lines 46. This is known in the art as a modulus 8 number, since in effect what is done is to count the number of characters as though one could not count above 8, that is, the ninth character counting as one. At the translator this number is converted into its binary representation, and the flip-flops L7–L8–L9 then store this number. It will be apparent, therefore, that if a fourth flip-flop were included in the length of message monitor unit, it would be supplied with the activity of the "eight" output conductor of the translator 128, and the number transmitted would be transmitted on a modulus 16 basis, since a four element storage would be able to store the numbers from 1 to 15, 16 being indicated as zero. Flip-flops L7–L8–L9 are substantially the same as the standard flip-flop previously described and illustrated in FIG. 4C as the tape feed flip-flop 160 of Storage I.

The length of message monitor unit 218 also contains a three-stage binary counter, comprising three flip-flop counters L10, L12, and L14. The counters are connected together in such a manner (as shown in FIG. 9) that when they receive a first pulse they are set to their "1" state and when they receive a second pulse, they are set to their "0" state and simultaneously set the next stage of the counter to its "1" state. Thus, the three-stage binary counter comprising L10, L12 and L14 will count up to seven pulses and indicate this count by each of the three counters being in the "1" state, and upon receiving an eighth pulse will all be set to "0." A ninth pulse starts the next cycle, etc.

The first counter L10, i.e., the "one" counter, is connected to character count conductor 220 from the error signaling unit 238 (FIG. 4C). As will be explained below in discussing the error signaling unit 238, the character count signal on conductor 220 consists of a negative impulse every time the tape feed output circuit 204 fires (FIG. 4D), during periods when the transmitter message gate is being received from a transmitter, or a negative impulse at the beginning of the transmitter message gate. For this reason the character number transmitted from the transmitter is the actual number of characters on a modulus eight basis, plus one for the initial transmitter message gate. This insures that if no characters are transmitted, a length of message error will be indicated as the character count will be one (the transmitter message gate), and the flip-flops L1–L2–L3 will indicate zero. Counter "one," L10, therefore, upon receiving the first negative pulse on conductor 220, will be set to its "1" state, producing a negative output on conductors L16 and L18. Upon receiving a second pulse on conductor 220, counter L10 will no longer produce negative signals on conductors L16 and L18, since it will be then set to its "0" state, and will produce negative signals on conductors L20 and L22. Thus, conductor L20 goes negative, as counter L10 is being set to its zero state by the second pulse, and thereby will set counter "two," L12, to its "1" state. Counter L12 will then produce negative outputs on its respective "—1" conductors. Counter L10, upon receipt of the fourth negative pulse on conductor 220, corresponding to the third character of the message recorded, will again be set to "0" and counter L12 will then receive its second pulse and also be set to "0." Counter "four," L14, being connected to counter L12 in the same manner as counter L12 is connected to counter L10, will monitor the "—0" conductor, L66 connected to counter L12, and as counter L12 goes to its "0" state, will be set to "1," indicating that four pulses have been received on conductor 220. Counter L14 will then produce a negative signal on its "—1" conductors until four more pulses have been received on conductor 220, at which time counter L10 will be set to its "0" state, thereby setting counter L12 to its "0" state, which in turn will set counter L14 to its "0" state. All counters will then produce a negative signal on their "—0" conductors.

The one, two and four storage flip-flops, L7–L8–L9, respectively, are also monitored at both their "—1" and "—0" plates. The relative correspondence between the three storage flip-flops, L7–L8–L9, and the three stages, L10, L12, and L14 of the counter, is constantly being monitored, e.g., AND gate L28 being connected to the "—1" conductor L18 of counter L10 and the "—1" conductor L24 of flip-flop one L7, monitors for binary one situations existing simultaneously in both devices. AND gate L30, connected to the "—0" conductor L22 of counter L10 and the "—0" conductor L26 of flip-flop "one" L7, monitors for the other situation of agreement between counter "one," L10, and flip-flop "one," L7. The two signals produced by AND gates L28 and L30 pass through an OR gate, L32, and are supplied on output conductor L34 thereof as one input to a three input AND gate, L36. The other two inputs, L38 and L40, supplied to AND gate L36 are derived from AND and OR gate circuitry organized in the same manner as AND gates L28 and L30, and OR gate L32, associated with the "one" flip-flop, L7, and counter L10. A signal on conductor L38, as will be understood, indicates agreement between the "two" flip-flop, L8, and the "two" counter, L12, while a signal on conductor L40 indicates agreement between the "four" flip-flop, L9, and the "four" counter, L14. Thus, a signal on output conductor L42 of AND gate L36 indicates that all counters agree with their respective flip-flops, and that the number of characters punched on the tape by the output circuits 202 (FIG. 4D) is in agreement, on a modulus eight plus one basis, with the character number received and indicating the actual number of characters of the message recorded at the translator 128 (FIG. 4B). This signal passes through a polarity inversion circuit L44, which is exactly the same as the dual level circuits of the check bit insertion unit 192 (FIG. 9), and output conductor L46 thereof is negative when no signal is received by the polarity inversion circuit L44 on conductor L42.

The negative disagreement signal on conductor L46 supplies one input to an AND gate L48, the other input thereof being supplied by the end of transmitter message conductor 230, from the special function unit 240 (FIG. 4C) to be described below. Thus, after the transmission of a complete transmitter message, when the transmitter message gate signal ends, AND gate L48 will be interrogated, and if at this time the number of characters punched on the output tape 28 does not agree, on a modulus eight plus one basis, with the length of message character number received from the transmitters, then AND gate L48 will produce an output signal on the transmitter length of message error conductor 222 for use at the error signaling circuits 238 (FIG. 4C).

As will be explained below with respect to the special function unit, after the termination of the transmitter character gate, a reset counter signal will be sent via conductor 228, which is connected to the three counters L10, L12, and L14 to reset these counters to their "0" state. Also, prior to receipt of the next character number, a reset flip-flop signal will be sent from the special function unit 240 on conductor 234 which is connected to the three flip-flops L7–L8–L9. Upon receipt of the reset flip-flop signal, flip-flops L7–L8–L9 are reset to their "0" state. Thus, both the counters and the flip-flops are reset and are ready to compare the next length of message character to the number of characters (plus one) actually recorded on the tape 28 during the next transmitter message.

The counters L10, L12 and L14 are, however, also used to count the number of characters recorded in the central message, as they are supplied with a character count signal on conductor 220 each time the tape feed output circuit 204 fires.

At the end of the central message the three counters L10, L12 and L14 are compared with the predicted number of characters of the central message, by means of three double poled, single throw switches L50, L52 and L54. Since the number of characters of the central message is preset, switches L50, L52 and L54 may be preset to this number of characters on a modulus eight plus one basis as a pulse will also occur on character count conductor 220 at the beginning of the central message gate. Switch L50 corresponds to binary "one" switch, L52 to binary "two" and switch L54 to binary "four" and the labels adjacent to the poles thereof indicate the binary number chosen when the switch is thrown to that pole. The number illustrated is four and two or six. That is, the number of characters of the central message plus one that has been preset in the switches may be 6, 14, 22, 30, etc.

Agreement between the predicted central message length and the actual number of pulses counted in the binary counters L10, L12, and L14 is determined in the following manner. When a switch is thrown in a manner to indicate that the corresponding binary number should be present in the counters connected thereto, (such as is shown for switches L52 and L54) the switch will connect the "—0" conductor of the respective counter to one input of a three input OR gate L56. Thus in the example illustrated, when six character count signals have been received on conductor 220 by the binary counter L10, counter "two" will be in the "1" state, counter 'four" will be in the "1" state, and counter "one" will be in the "0" state. The "—1" conductor L16 of counter "one" will not supply a negative signal to OR gate L56 via switch L50 since counter "one" is in the "0" state. Counter "two" being in the "1" state, will not supply a negative signal via the "—0" conductor thereof through the "two" switch L52 to OR gate L56. And counter "four," being in the "1" state, will not supply a negative signal on its "—0" conductor through the "four" switch L54 to OR gate L56. Therefore, no negative signal will be produced on the output conductor L58 of OR gate L56. On the other hand, any other number of character count signals on conductor 220 will place a negative signal on at least one of the output conductors of the counters, such as the "—1" conductor L16 of counter "one" when seven characters have been counted. This negative signal will pass through its respective switch, through OR gate L56, and will produce a negative signal on conductor L58, indicating that there is disagreement between the predicted number and the actual number of characters of the central message.

A negative signal on L58, indicating that the counters do not agree with the central message length switches, is connected to one input of a two input AND gate L60, the other input thereof being supplied by a signal on the end of central message conductor 226, from the special function unit 240 (FIG. 4C). A negative signal is produced by the special function unit 240 on conductor 226 at the end of the central message gate. This signal interrogates AND gate L60, and will produce a negative signal on output conductor 236 thereof if a negative signal exists on conductor L58 indicating that the central length of message switches disagree with the counters. Output conductor 236 of AND gate L60 is the central length of message error conductor and is supplied as an input to the error signaling unit 238 (FIG. 4C). It will be understood by reference to the following description of the special function unit 240 that a "reset counters" signal is sent to the length of message monitor unit via conductor 228, after the end of the central message and before the beginning of the next transmitter message, so that the counters will all be reset prior to counting the characters of a transmitter message.

The AND gates of the length of message monitor unit 218, above described, are all preferably cathode follower AND gates, of the type hereinbefore described, and the OR gates are preferably diode OR gates, of the kind hereinbefore described.

Counter "four," L14, has been shown in detail in FIG. 11, and the circuit of counters L10 and L12 are exactly the same. Counter L14 comprises two triodes, L62 and L64, each one half of a double triode type 5963. These triodes are connected together, as shown, to form a bistable device which will change from one state to the other upon being supplied with a signal on input conductor L66 connected thereto. The cathodes of the two triodes are connected together by conductor L68, and to ground through parallel connected capacitor L70 and resistor L72. The grid of triode L62 is connected through two series connected grid resistors, L74 and L76, to ground, and the grid of triode L64 is connected through series connected resistors L78 and L80 to the "reset counters" conductor 228, which when not resetting counter L14 continuously supplies a ground thereto. Input conductor L66 is connected to the grids of triodes L62 and L64 through capacitors L82 and L84, respectively, and series connected grid resistors L74 and L78, respectively.

The plates of the triodes L62 and L64 are connected to a source of plus 250 volts DC (not shown), through plate resistors L86–L87. Feedback between the plate of triode L64 and the grid of triode L62 is provided by parallel connected capacitor L88 and resistor L90, which are connected in series with resistor L74 to the grid of triode L62 and directly to the plate of triode L64. In the same manner, capacitor L92 is connected in parallel with a resistor L94, providing feedback from the plate of triode L62 to the grid of triode L64 through grid resistor L78.

The preferred values of the various components of this bistable counter L14 and counters L10 and L12 are as follows: resistors L74 and L78 are 10,000 ohm, ½-watt resistors; resistors L76 and L80 are 330,000 ohm, ½-watt resistors; resistors L86–L87 are both 33,000 ohm, 1-watt resistors; resistor L72 is a 22,000 ohm, 1-watt resistor; and resistors L90 and L94 are both 470,000 ohm, ½-watt resistors. Capacitors L88 and L92 are both 33 micromicrofarads in capacitane; capacitors L82 and L84 are 20 micromicrofarads; and capacitor L70 is .005 microfarad.

THE ERROR SIGNALING UNIT

In FIG. 12 of the drawings, elements of the error signaling unit of the invention are designated by reference numerals preceded by the letter E. Now referring to FIG. 12, the error signaling unit 238 of the central receiver-recorder of the invention is shown in detail. The error signaling unit 238 comprises an error relay E2 whose energization coil is connected at one terminal thereof to a source of B plus, that is a positive DC voltage, and whose other terminal is connected via conductor E4 to an OR gate, E6. Energization of any one of the input conductors E8, E10 and E12 connected to the OR gate E6 will energize error relay E2.

A four input OR gate E14, when energized at any one of its four input conductors E16, E18, E20 and E22, will produce a negative signal which will be sent via the output conductor thereof to a delay device, E24, which will produce a positive pulse of 115 milliseconds duration upon receipt of this signal. The 115 milliseconds duration positive pulse will be fed via output conductor E26, of delay E24, to a relay control circuit E28, wherein it will be amplified and inverted to appear as a 115 millisecond negative pulse on conductor E10, thus energizing error relay E2.

Input conductor E18 of OR gate E14 is connected to the central length of message error conductor 236 from the length of message monitor unit 218 (FIG. 4C). Input conductor E20 of OR gate E14 is connected to the transmitter length of message error conductor 222, also originating at the length of message monitor unit 218 (FIG. 4C). Thus, either a central or a transmitter length of message error signal, on conductors 236 or 222 respectively, will cause error relay E2 to energize.

Input conductor E16 to OR gate E14 is supplied with a negative signal upon the occurrence of a "short pulse error," which is monitored in the following manner. The data arrival signal on conductor 136 from the translator unit (FIG. 4B) is supplied as the input to a delay device E30, and to an inverter amplifier E32. Delay device E30 is adjusted to provide, on output conductor E34 thereof, a negative pulse 6.5 milliseconds after the beginning, that is the negative drop, of the data arrival signal on conductor 136. Inverter amplifier E32 produces on its output conductor, E36, a positive pulse having the same duration as the data arrival pulse on conductor 136. Conductor E36 is connected at one input terminal of a two input AND gate E38. The other input thereto is connected to conductor E34. Thus, the positive data arrival pulse on conductor E36 will, if the data arrival signal on conductor 136 is longer than 6.5 milliseconds, inhibit the operation of AND gate E38. If the data arrival signal is less than 6.5 milliseconds, the negative pulse on conductor E34 will pass through AND gate E38 and produce a short pulse error signal on conductor E16. Therefore, if, for any reason, a character arriving at the translator 128 contains pulses all shorter than 6.5 milliseconds, a "short pulse error" signal will be produced on conductor E16, and error relay E2 will be energized thereby.

The parity even conductor 216, from the parity monitor unit 214 (FIG. 4D), is connected at one input terminal of a two input terminal parity error AND gate E40. The other input terminal thereof is connected to conductor E42. The output sync signal on conductor 182 is connected at one input terminal of a two input AND gate E44. The other input thereof is connected to conductor E46. Conductor E46 is connected to a normally closed contact on a tape feed count relay E48. When tape feed count relay E48 is de-energized, as shown in the drawing of FIG. 12, plus 250 volts from a source (not shown) is supplied on message gate conductor E46 as one input to AND gate E44, and output sync pulses occurring on conductor 182 at this time will not pass through AND gate E44. When relay E48 is energized during occurrence of a message gate signal as will be explained below the inhibiting positive potential will be removed. Then the output sync pulses will push through AND gate E44 and be supplied to a pulse shaping network E50 via conductor E52. Pulse shaping network E50 is a dual level circuit similar to those described in reference to the check bit insertion unit (FIG. 9). Network E50 supplies positive signals on output conductor E54 thereof, and negative signals on conductor E56 thereof, upon receipt of the negative output sync signals on conductor E52. Conductor E56 supplies the input to a delay flop E58, whose output is the conductor E42, supplying one input to the parity error AND gate E40.

As will be remembered from the description of the output circuits 202, hereinabove, the output sync pulses on conductor 182 are of 5 milliseconds duration. These 5 millisecond pulses, which will pass through pulse shaping circuit E50, will supply the delay E58, and three milliseconds after the output sync signal, that is after the negative drop on conductor E56, delay device E58 will produce a negative pulse on output conductor E42 thereof. This negative pulse will interrogate parity error AND gate E40, and if a parity even (negative) signal is being received from the parity monitor unit 214 (FIG. 4D), parity error conductor E22 will be negative. This energizes error relay E2. The 3 millisecond delay of delay device E58 is to insure that the parity interrogation pulse on conductor E42 occurs during the 5 millisecond parity even signal (corresponding to the 5 millisecond firing of the output circuits 202 (FIG. 4D).

The energization coil of tape feed count relay E48 is connected at one terminal thereof to a source of minus 48 volts DC, and at the other terminal thereof to a message gate conductor X2, from the special function unit 240 (FIG. 4C), to be described hereinbelow. The message gate signal on conductor X2 is a positive signal when a message gate is being received, either from the central receiver-recorder or a transmitter. Tape feed count relay E48 will be energized when a message gate is being received, and the plus 250 volts inhibit signal on message gate conductor E46 will be removed, allowing AND gate E44 to pass the output sync signals on conductor 182. Simultaneously, the plus 250 volt pulse DC supplied to the swinger E60, of tape feed count relay E48, will be applied to a tape feed count conductor E62. Conductor E62 supplies one input to positive OR gate E64, the other input thereof being supplied by conductor E54. It will be apparent to those skilled in the art that positive OR gate E64 may be essentially the same kind of circuit, hereinbefore described, as a negative AND gate. The circuitry comprising a negative AND gate may usually provide a positive OR gate at the same time. Thus, a positive signal will be seen on output conductor E66 of positive AND gate E64 when either of conductors E54 and E62 are positive, and a negative output will be seen on conductor E66 when both conductors E54 and E62 are negative. Conductor E66 is connected to the input of an inverter amplifier E68, and the negative output thereof is connected to the character count conductor 220, which, in turn, is connected to the length of message monitor unit 218 (FIG. 4C) as previously described.

It will thus be seen that a character count signal will be produced on conductor 220 which will be counted in the length of message monitor unit 218, either upon arrival of an output sync signal on conductor 182 at the error signaling unit, or upon the beginning of the message gate signal. The beginning of the message gate is counted in the same manner as a character, by the length of message monitor unit 218. The reason this is done is that if a transmitter were to begin transmission and be prematurely cut off, it would transmit to the central receiver-recorder a transmitter message gate signal. If, as in the presently disclosed preferred embodiment of the invention, the central receiver-recorder message was being recorded last, no transmitter message would be recorded on the tape. Then, a central receiver-message would be recorded, since neither a parity nor a length of message monitor error would ordinarily be detected. However, as shown, the message gate itself from the transmitter is counted as a character, and since no length of message character number is received at the central receiver-recorder if the transmitter is prematurely cut off, the counters and the storage flip-flops of the length of message monitor unit 218 will disagree. A length of message error signal on conductor 236 will energize error relay E2, recording an error symbol on the tape, as will be described hereinbelow. And, as also to be described below, this will prevent the central receiver-recorder from recording its message on the tape. Thus, time will be conserved and the error will not go undetected.

A central error counter E70 is included in the error signaling unit 238. This is the same kind of circuit as above described in the length of message monitor unit counters. Counter E70 is set by a negative signal on input conductor E72 thereof, which is the output of an OR gate E74. One input to OR gate E74 is connected to the central length of message error conductor 236, and the other input to AND gate E78. Conductor E76 is connected to the output of a three input AND gate E78. One input of AND gate E78 is the parity even conductor 216. Another input is the parity interrogation signal on conductor E42, originating at delay device E58. The third input to AND gate E78 is a central message gate conductor X4, from the special function unit 240 (FIG. 4C). Conductor X4 has a negative signal thereon when the central message gate is being produced at the central receiver-recorder. Thus, AND gate E78 will produce a negative output signal on conductor E76 during the central message, as indicated by the central message gate, whenever a parity error occurs. Therefore, OR gate E74 will produce a negative signal on the conductor E72 which will set the central error counter E70 whenever either a central length of message error or a central parity error occurs.

At the same time that one of these errors occurs, as indicated by a negative signal on conductor E72, this signal will be supplied by conductor E72 to the input of a 50 millisecond delay E80. Delay device E80 will produce on conductor E82, a pulse 50 milliseconds after receipt of the error pulse on conductor E72. This pulse is supplied as one input to an AND gate E84. The other input, E86, supplied to AND gate E84, is taken from the negative zero conductor of central error counter E70. Thus, on receipt of the first error signal, counter E70 will be set to its one state and, upon receiving the second central error signal on conductor E72, counter E70 will be set to zero. Delay device E80, 50 milliseconds thereafter, will produce a pulse on conductor E82, which in conjunction with the negative zero signal on conductor E86 will cause AND gate E84 to apply a negative signal to the input of a delay E86. Delay device E86 will then produce a positive signal for 115 milliseconds for a relay control circuit E88, substantially the same as relay control circuit E28. Circuit E88 will produce a 115 millisecond negative signal on conductor E90, for use at the control circuits 90 (FIG. 4B). This signal is called the "two consecutive central error signal."

At the end of an error-free central message, counter E70 will be reset by the removal of ground on conductor X6 from the special function circuits (FIG. 13), to be described below. The removal of ground resets the central error counter E70 in substantially the same way as the removal of ground resets the counters of the length of message monitor unit 218 (FIG. 11).

Error relay E2, upon being energized by any one of the errors described above, which produce signals on the inputs to OR gate E14, will close contacts E92 thereon, supplying the message gate signal of conductor X2 to a conductor E94. Conductor E94 is connected at one input terminal of a positive OR gate E96. Therefore, if the positive message gate signal exists on conductor X2 and the error relay E2 is energized, a positive signal will be provided to the input of a relay control circuit E98, which will produce a continuous negative signal on conductor E12 to energize the error relay E2 through OR gate E6. Thus, once an error occurs, so long as the message gate is received, the error relay E2 will remain energized. Another input to positive OR gate E96 is supplied by the error lock up signal from tape punch 26 (FIG. 4D), on error lock up conductor 242. A third input of OR gate E96 is an error lock up signal on conductor 256 from the control circuits 90 (FIG. 4B). The signal on conductor 242 is supplied to OR gate E96 whenever any malfunction occurs at the punch, such as tape failure, tape break, improper tape tension, etc., and so long as the malfunction continues the positive signal on conductor 242 will, through OR gate E96, relay control E98, and OR gate E6, energize relay E2. The signal on conductor 256 occurs during periods of low line voltage, as will be explained below in the description of the control circuits 90 (FIG. 15).

Contacts E100 on error relay E2 are normally closed when error relay E2 is de-energized. Contacts E100, therefore, normally connect character gate conductor 51, from the character gate lines 48 of the common cable, to a character gate conductor 130, which can be traced through the special function unit 240 (FIG. 13) to the translator unit of FIG. 4B. When error relay E2 is energized, the character gate signal for the translator 128 is ended and no more characters will be processed by the central receiver-recorder for punching on the tape 28.

Transfer contacts E102 of error relay E2 normally ground a "no error" conductor E104, when error relay E2 is de-energized and, when energized, error relay E2 transfers contacts E102 to then provide a ground on "error" conductor E106. This is supplied as an input to the special function unit 240 (FIG. 13). Error conductor E106 also supplies one input to an AND gate E108, the other input thereof being supplied by conductor X8. Conductor X8 is supplied with a negative signal in the special function unit (FIG. 13) at the end of a message unit, that is, at the end of the central message gate and at the end of the transmitter message gate. The output of AND gate E108 is supplied as an input to a delay E110, which produces as an output a 115 millisecond positive pulse for relay control circuit E112 which, through conductor E8, energizes error relay E2. Thus, if an error occurs at the end of a message unit, error relay E2 will be insured of energization for 115 milliseconds after the end of the message unit. This time is utilized, as well be understood by reference to the special function unit 240 to be described below, to insure that an error character will be punched on the tape prior to the beginning of the next message.

Finally, contacts E114 on error relay E2 are normally open and, upon error relay E2 being energized by an error, minus 48 voles DC will be supplied by contacts E114 to an error conductor E116 for use at the control circuits 90, to be described below.

Since the relay control circuits E112, E28 and E98 are all the same circuit, only relay control circuit E28 has been shown in detail. It comprises two triodes E118 and E120, each being one half of a double triode type 5687. The cathodes of the two triodes E118 and E120 are grounded, and the plates thereof are each connected through 7500 ohm, 5-watt resistors, E122—E122, to the output conductor E10 thereof which, through OR gate E6, is connected to one side of the energization coil of the error relay E2. The grids of both triodes E118 and E120 are connected to the mid point between two series connected referencing resistors, E124 and E126. Resistor E124 is 1½ megohms rated at ½ watt, and resistor E126 is 2.4 megohms, rated at ½ watt.

THE SPECIAL FUNCTION UNIT

In FIG. 13 of the drawings, elements of the special function unit of the invention are designated by reference numerals preceded by the letter X. Referring now to FIG. 13, the special function unit 240 produces various special signals which are used in the central receiver-recorder.

For example, positive OR gate X10 (at the bottom of FIG. 13) produces a positive output signal on conductor X2 for use at the error signaling circuits 238 (FIG. 12), and to supply message gate conductor 248 which is connected to the control circuits 90 (FIG. 4B). Transmitter message gate conductor 244 is connected to a filter relay X12, which produces a positive signal on output X14 thereof upon receipt of a negative transmitter message gate signal on conductor 244, and this positive signal is supplied as an input to OR gate X10. Thus, the negative transmitter message gate signal on conductor 244, will produce a positive message gate signal on conductor X2. Filter relay X12 also produces a negative signal on conductor X16 for use in the special function unit.

The negative central message gate signal on conductor 246, from control circuits 90 (FIG. 4B), is supplied to a second filter relay X18. Filter relay X18 supplies a ground to conductor X4 connected thereto, upon receipt of the negative central message gate signal on conductor 246. This negative signal on conductor X4 is the central message gate signal used in the error signaling unit 238, above described. Upon receiving the central message gate signal on conductor 246, filter relay X18 also produces a positive signal on conductor X20, which is supplied as one input to positive OR gate X10. Filter relay X18 also produces as an output on conductor X22, the end of central message conductor, a signal which goes negative at the end of the central message gate on conductor 246. The positive message gate signal supplied by filter relays X12 and X18 to conductor X2, through positive OR gate X10, is a ground signal. This ground signal is supplied by the filter relays X12 and X18 to conductors X14, X20 and X2, when they are energized upon receipt of a transmitter gate or a central message gate, respectively. When these relays are deenergized, the ground is transferred to the respective conductors X16 and X22.

A message gate ground may also be supplied to message gate conductor X2 through OR gate X10 by conductors X24 and X26, which are connected to contacts X28 and X30, respectively, of an error character relay, X32, and an end of message relay, X34. As will be explained below, error character relay X32, and end of message relay X34, are adapted to punch an error character and end of message character on tape 28 (FIG. 4D). A message gate must be supplied by conductor 248 to control circuits 90, as will be explained below, in order to have these characters punched on the tape.

Still referring to FIG. 13, the end of transmitter message signal on conductor X16, and the end of central message signal on conductor X22, both being the application of grounds to their respective conductors by the respective filter relays X12 and X18, are differentiated by the differentiating networks X36 and X38. These signals produce negative pulses on the end of transmitter message conductor 230, and end of central message conductor 226, which are both connected to the length of message monitoring unit 218 (FIG. 11), previously described. Both the end of transmitter message conductor X16, and the end of central message conductor X22, are connected via the two double pole single throw ganged switches X40 to conductors X42 and X44. Conductors X42 and X44, upon being supplied by the ground at the end of the central message or at end of the transmitter message, supply these signals as inputs to differentiation networks X46 and X48, which produce negative pulses on the inputs to OR gate X50. Thus OR gate X50 will produce a pulse on output conductor X52 thereof at the end of the central message and at the end of the transmitter message. End of message unit conductor X8 is connected to conductor X52, and this negative pulse is supplied by conductor X8 for use at the error signaling unit 238 (FIG. 12), as previously described.

Conductor X52 also is connected to delay device X54 which, twenty-five milliseconds after receipt of the negative pulse on conductor X52, produces a negative pulse on conductor X56. This pulse is supplied as one input to a negative AND gate X58; the other input thereto being the error conductor E106 which, as previously described, is supplied with a ground (considered a negative signal by AND gate X58) upon energization of error relay E2 (FIGURE 12). Thus, twenty-five milliseconds after the end of the central message gate signal or the transmitter message gate signal, originating at the control circuits 90, due to an error, from AND gate X58, will produce a negative pulse. This pulse is supplied to the input of a delay device X60, to produce a 50 millisecond positive pulse which is supplied to a relay control circuit X62. Relay control circuit X62 is connected at the output thereof to one side of the coil of error character relay X32, and therefore, for a period of 50 milliseconds after AND gate X58 produces the negative pulse for delay X60, error character relay X32 will be energized. Energization of the error character relay X32 will ground a plurality of Hollerith conductors 49, of the Hollerith lines 46, and will produce a message gate ground on conductor X28. Therefore, an error character will be translated by the translator unit 128 and will result in the punching of this error character on the tape. Energization of the error character relay X32 will open normally closed contacts X64 thereon, removing a ground from end of message conductor 250, which is supplied with ground through normally closed contacts X66 of the end of message relay X34. The end of message signal on conductor 250 is utilized in a manner to be described below in the discussion of the control circuits 90.

A seven millisecond delay device X68 is connected to the output of delay device X60. At the end of the positive output pulse produced by delay X60, delay X68 produces a positive output pulse of seven milliseconds duration. This seven millisecond pulse, through relay control circuit X70, energizes a character gate relay X72, thus supplying a ground on character gate conductor 130 for the translator. The output of delay device X68 is also connected to relay control circuit X74 and, through relay control circuit X74, error character relay X32 remains energized for an additional seven milliseconds, after the fifty millisecond energization produced by delay X60. It is at this time that translator 128 translates the error character supplied thereto on the Hollerith lines 46.

Conductors X42 and X44 (at the top of FIG. 13) are also connected to two twenty-five millisecond delay devices X76, and X78. Thus, in one position of switches X40, delay device X76 is supplied with the end of central message signal on conductor X22; and, in the other position of switches X40, (as shown), delay X76 is supplied with the end of transmitter message signal on conductor X16. Switches X40 are thrown to the position shown when it is desired that the transmitter message be recorded first on the tape 28. The switches X40 are thrown to their other position when it is desired that the central message be recorded first. It will be understood that switches X40 may be relay contacts upon a relay supplied with energization from the control unit 90, which may be one of two interchangeable chassis, either for the recording of the central message or the transmitter message first.

In the situation illustrated in FIG. 13, delay X76 produces a negative pulse on its output conductor X80 twenty-five milliseconds after the end of the transmitter message, that is, after the application of the ground to conductor X16. Delay X78 produces a negative output signal on its output conductor X82 twenty-five milliseconds after the ground is supplied to conductor X22, the end of central message conductor. Conductor X80 is connected to one input of a two input AND gate X84, the other input thereto being supplied by "no error" conductor E104 from the error signaling unit 238 (FIG. 12). Thus, twenty-five milliseconds after the end of the transmitter message, if there has been no error, AND gate X84 will produce a negative signal as an input to a delay device X86. Delay device X86 will produce a positive fifty millisecond duration control pulse for relay control circuit X88, which will energize for fifty milliseconds the "no error" first data group relay X90. When the central message is recorded first, that is the switches X40 are in their other position (not shown), energization of relay X90 will remove a ground from conductor X92. X92 is connected through contacts of the gang switches X40 to the central error counter reset conductor X6. Removal of this ground will, as was explained in relation to the error signaling unit 238 (FIG. 12), reset to zero the central error counter E70. Energization of the "no error" first data group relay will also close normally open contacts X94 thereon, completing a circuit across conductors 252, connected to the control circuits 90 (FIG. 4B).

An AND gate X96 has connected to one input terminal thereof output conductor X82, from delay X78, and as the other input conductor connected thereto, "no error conductor" E104. AND gate X96 therefore produces a negative pulse for a one hundred and fifteen millisecond delay device X98, connected thereto, twenty-five milliseconds (as determined by delay X78) after the end of the central message, if a no error signal is received on conductor E104. Delay device X98 produces a one hundred and fifteen millisecond duration positive pulse which is inverted and supplied through relay control circuit X100 to an end of message relay X34. End of message relay X34 is therefore energized for one hundred and fifteen milliseconds. Upon energization of the end of message relay X34, a ground is supplied to selected conductors 49, of the Hollerith lines 46, corresponding to an end of message code character to be punched on the tape 28. Contacts X30, on end of message relay X34, are closed to supply a ground to the message gate input conductor X26 for OR gate X10. Contacts X66 of end of message relay X34 transfer, thereby removing ground from conductor 250, and supplying a ground to conductor X102. The ground signal on conductor X102 has no effect unless transfer switch X40 is in its illustrated position, in which case (i.e., the central message being recorded first) the central error counter reset conductor X6 would be supplied with a ground. The output of delay device X98 is also supplied as an input to a seven millisecond delay X104 which, in much the same manner as seven millisecond delay X68, energizes character gate relay X72 through relay control circuits X106 for seven milliseconds. This supplies a character gate ground signal on conductor 130 for use on the translator 128 (FIG. 4B). The output of delay X104 is also used to energize the end of message relay X34 through relay control circuits X108 for seven milliseconds after the one hundred and fifteen milliseconds that it is energized by the output of delay X98. It is during this period that the end of message character is translated by the translator, eventually resulting in its recording on the tape 28 (FIG. 4D).

For systems wherein the customer records special space characters on the data cards 42 read at the transmitter 20 (FIG. 4A), an AND gate X110 is provided. AND gate X110 monitors the Hollerith conductors 49 selected to indicate the space character and character gate conductor 130. AND gate X110, upon receipt of a space character on the Hollerith conductors 49 simultaneously with a character gate signal in conductor 130, will produce a negative signal, for a relay control circuit X112, of the same duration as the pulses of the space character arriving on the Hollerith conductors 49. Relay control circuit X112 will energize a punch space relay X114 for this period. Upon being energized, punch space relay X114 will supply a ground "data arrival signal" on conductor 136, for use at the translator 128 (FIG. 4B) and the error signaling unit 238 (FIG. 12). Energization of the punch space relay X114 will also remove the ground which has been applied on punch space conductor 142, which will prevent the translator 128 from translating the space code arriving on the Hollerith conductors 49. The data arrival signal on conductor 136 will, as previously described, result in the setting of the check channel flip-flop of Storage II, thus resulting in the punching of a hole in the check channel on the tape 28, which in the tape code is a space character.

The message gate ground signal on conductor X2 results in the energization of a length of message monitor reset relay X116. Normally closed contacts X118, of length of message monitor reset relay X116, normally supply minus 150 volts DC to the "reset flip-flops" conductor 234. Energization of relay X116 at the beginning of the message gate will reset the flip-flops of the length of message monitor circuits 218. Normally closed contacts X120, of relay X116, supply a ground on the "reset counters" conductor 228, which also goes to the length of message monitor circuits 218. Removal of this ground at the end of the message gate signal on conductor X2 resets the counters of the length of message monitor circuit. Thus, the counters are reset at the end of the message gate, and the flip-flops are reset at the beginning of the message gate.

The delay and relay control circuits shown in FIG. 13 in block form are substantially similar to the delays and relay controls previously described in detail, and it will be obvious to those skilled in the art how to properly bias and couple these circuits.

THE TEST AND RESET UNIT

The test and reset unit 262 is shown in detail in FIG. 14, wherein elements thereof are designated by reference numerals preceded by the letter Y. Referring now to FIG. 14, it is in the test and reset unit 262 that a message gate signal on conductor 248, from the special function unit 240, creates control signals for the other circuits of the invention, whereby, if a message gate signal does not exist on conductor 248, no data received on the Hollerith lines 46 will be punched on the output record of the central receiver-recorder. As previously explained in discussing the special function unit 240, the message gate signal consists of a ground on conductor 248. A ground on conductor 248 will energize a master reset relay Y2, since one terminal of its energization coil is connected to message gate conductor 248 and the other to a source of minus 48 volts DC (not shown). A diode Y4 is connected across the energization coil of master reset relay Y2, and the energy stored in the energization coil of relay Y2 is discharged through diode Y4 upon de-energization of the relay. Diodes, such as Y4, are used throughout the present invention for noise suppression, although for purposes of simplification they have not always been shown.

Master reset relay Y2 then will be energized by a message gate signal on conductor 248. The swingers Y6 of relay Y2, which are all connected to ground, will then ground conductor Y8, enable "check bit insertion" conductor 198, and "test and reset" conductor Y10. The ground supplied to conductor Y8 will notify the control circuits 90, to which it is connected, that a message gate is being received, and this signal is utilized in the control circuits in a manner to be explained below. The ground on the "enable check bit insertion" conductor 198 enables that unit in the manner previously described.

When no message gate signal is being received on conductor 248, master reset relay Y2 is de-energized, and grounds are supplied to the three conductors of the master reset cable 172. Thus, when no message gate is being received, the delay devices of the data flow control unit 150 (FIG. 7) are converted into free running multivibrators, as previously described. Any signals coming to the translator unit 128 on the Hollerith lines 46, if they should happen to get translated, will be inhibited in Storage I and Storage II, since these storage units constantly are being reset to zero. Thus, erroneous characters of this type will not be recorded on the output medium of the central receiver-recorder.

Relay Y12, of the test and reset unit 262, has one side of its coil connected to ground and the other side connected to stop conductor Z2, from the control circuits 90. This conductor is energized, to energize relay Y12 whenever the central receiver-recorder is not in the previously described stop condition. The control circuits to be described below are considered to be in the stop condition when they are conditioned so that no transmissions will be initiated at the transmitters 20 of the system. De-energization of this "stop relay Y12 closes contacts Y14 thereon, and thereby conditions for receipt of ground signals, message gate conductor 248, character gate conductor Y16 (which is connected to the character gate lines 48) and tape feed conductor Y18. Closure of contacts Y14 also conditions tape leader conductor 148 for connection to a source of +250 volts DC.

Upon pressing the tape feed push button Y20 on the front panel 36 (FIG. 1), if stop relay Y12 is de-energized, grounds will be supplied: to conductor 248 simulating a message gate, to conductor Y16 simulating a character gate, and to conductor Y18 (which will result in energization of a tape feed relay Y22); and +250 volts DC is supplied to tape leader conductor 148 to enable the sync insertion unit 144 (FIG. 4B). One terminal of the coil of the tape feed relay Y22 is connected to conductor Y18, and the other side to a source of minus 48 volts DC (not shown), and therefore, upon pressing the tape feed push button Y20, tape feed relay Y22 will energize, and contacts Y24 thereon will connect conductor Y10 to selected Hollerith conductors 49. Since conductor 248 is being supplied with a simulated message gate signal, master reset relay Y2 will energize and the swingers thereon, Y6, will supply a ground to ground conductor Y10 grounding the selected Hollerith conductors 49. Tape leader is generated by punching all holes. It can be seen, by reference to FIG. 5, that if the three Hollerith conductors grounded are the "twelve," "seven" and "eight" conductors, all of the output lines 132 of the translator unit 128 will be energized. The sync insertion unit 144 (FIG. 4B) will generate input sync signals for the central receiver-recorder, since it is being supplied with +250 volts on tape leader conductor 148. This will result in punching all channels of the tape including the check channel, since energization of all six output conductors 132 from the translator is an even situation on the tape 28 (FIG. 4D).

Test characters are generated in the following manner. A plurality of test character switches Y26 may be manually closed to connect ground conductor Y10 to the swingers Y28 of a test character relay Y30. Thus, when test character relay Y30 is energized and conductor Y10 is grounded, the selected switches Y26 which are closed will supply grounds to selected Hollerith conductors 49. A test character push button Y32 is located at the central receiver-recorder and, when depressed, connects one side of a test relay Y34 to a source of −48 volts DC (not shown). Since the other side of the coil of test relay Y34 is grounded, pressing the test push button Y32 will energize relay Y34 and the swingers thereon Y36 will supply grounds to the character gate conductor 48, message gate conductor 248, and test character conductor Y38. One side of the coil of test character relay Y30 is connected to conductor Y38 and the other side to a source of −150 volts DC (not shown). Therefore, upon pressing the test character push button Y32, the test character relay Y30 will be energized. Master reset relay Y2 will also be energized by means of the ground supplied to conductor 248. A ground, therefore, will be supplied on ground conductor Y10, through the closed switches Y26 and the closed contacts Y28 of relay Y30, to the selected Hollerith conductors 49. The test character will be supplied to the translator 128 and eventuate in the punching of the corresponding tape code character on the output tape 28.

THE CONTROL CIRCUITS

The control circuits 90 of the central receiver-recorder of the invention are shown in detail in FIG. 15, which comprises FIGS. 15A, 15B and 15C. In FIG. 15, elements of the control circuits are designated by reference numerals preceded by the letter Z. The control circuits of the invention have five main functions to perform: first to monitor the nominally 115 volt AC power lines to which the central receiver is connected, for conditions of low voltage which might cause erroneous characters to be recorded on the output medium; second, to respond to a ready to transmit signal sent from a transmitter 20 (FIG. 4A), and to selectively initiate transmission at such a transmitter; third, to sequence the message to be recorded on the output medium so that the characters of both the transmitter and the central message are recorded in proper order; fourth, to monitor the central receiver-recorder for certain error condition, and to take appopriate action upon receiving signals indicating such; and fifth, to control the secondary clocks 64 (FIG. 4A) at the transmitters, and the time data coder 120 (FIG. 4B) at the central receiver-recorder. As has been mentioned previously, the control circuits 90, are in the preferred embodiment of the invention, mounted on a single chassis which comprises either one of two possible control circuits. One of these chassis will control the central receiver-recorder to record the transmitter message on the output medium prior to the central message, and the other will control the central receiver-recorder to record the central message first. The control circuits shown in FIG. 15 are so organized that the transmitter message is recorded first.

The low voltage monitoring portion of the control circuits 90 is shown in the lower right-hand corner of FIG. 15C. A DC power supply Z4 is connected across the 115 volt AC line Z6 and an AC common line Z8. Power supply Z4 has a 200 microfarad capacitor Z10 connected therein across its output terminals Z12 and Z14. Power supply Z4 produces a nominally unregulated DC output of 150 volts across its output terminals Z12 and Z14. Thus the DC voltage across Z12 and Z14 follows the AC line voltage proportionately. However, the large output capacitance of capacitor Z10 to some extent smooths the DC voltage appearing at the output terminals of the power supply Z4 so that only comparatively long term changes in the AC line voltage produce changes in the DC output across terminals Z12 and Z14. A 2,000 ohm, 25-watt resistor Z16 is connected across the output terminals Z12 and Z14 of the power supply Z4.

A voltage monitor relay Z18 is connected in series with three resistors Z20, Z22 and Z24, across output terminals Z12 and Z14. Resistor Z20 is a 150,000 ohm, ½-watt resistor and resistors Z22 and Z24 are both 50,000 ohm maximum potentiometers. Noise suppressing diode Z26, Sarkes Tarzian type No. 10, is connected across the coil of voltage monitor relay Z18 in the manner previously pescribed for other relays on the central receiver-recorder, for purposes of noise suppression. All relays of FIG. 15 are shown de-energized as are all other relays of the drawings.

As will be well known to those skilled in the art, a relay such as relay Z18 will have definite energization and de-energization characteristics. That is, relay Z18 will energize when a predetermined voltage is applied across its energization coil. However, once energized a relay such as voltage monitor relay Z18 will remain energized even after the potential applied across its energization coil has dropped far below the energization potential. It has hitherto been supposed that a relay could not be used to monitor for a particular voltage, as its contacts would close at one potential and open at another. However, in the present invention this difficulty has been overcome by the use of a second shunt relay Z28. Shunt relay Z28 has its coil connected in series with a resistor Z30 and normally open contacts Z32 of voltage monitor relay Z18, across a well regulated 150 volt DC supply (not shown). Thus, when voltage monitor relay Z18 is energized, contacts Z32 thereon will close a circuit energizing shunt relay Z28. At this time the normally closed contacts Z34 of relay Z28 will open and the normally closed contacts Z36 thereof will close.

As can be seen in FIG. 15C the normally closed contacts Z34 shunt resistors Z20 and Z22, which are connected in series with the coil of the voltage monitor relay Z18. It can thus be seen that, when voltage monitor relay Z18 is de-energized, its contacts Z32 will be open, shunt relay Z28 will be de-energized, and its normally closed contacts Z34 will shunt resistors Z20 and Z22. Thus de-energized voltage monitor relay Z18 will be connected across terminals Z12 and Z14 in series with a single resistor Z24. However, when voltage monitor relay Z18 is energized its contacts Z32 will close, energizing shunt relay Z28 whose contacts Z34 will open, no longer shunting resistors Z20 and Z22. Voltage monitor relay Z18 will then be connected across terminals Z12 and Z14, in series with resistors Z20, Z22 and Z24. Because of the voltage divider action of the three resistors Z20, Z22, and Z24, and the energization coil of voltage monitor relay Z18, when voltage monitor relay Z18 is de-energized, a greater proportion of the voltage appearing at terminals Z12 and Z14 will be applied across the energization coil of voltage monitor relay Z18 than will be applied across the coil when the voltage monitor relay is energized. This is because, when relay Z18 is energized, additional resistances Z20 and Z22 will be added to the voltage divider circuit.

Resistors Z22 and Z24 can therefore be adjusted so that voltage monitor relay Z18 will energize and de-energize when the potential across terminals Z12 and Z14 of the power supply Z4 is substantially at one particular voltage. Thus, a circuit has been provided whereby the contacts Z36 on shunt relay Z28 will provide an indication of whether the voltage across terminals Z12 and Z14, and therefore across the AC lines Z6 and Z8, is below a predetermined minimum.

A low voltage relay Z38 is connected in series with contacts Z36 and a resistor Z40, across the regulated 150 volt DC supply. Closing of contacts Z36 will therefore energize low voltage relay Z38, indicating that the proper voltage is appearing across the AC lines Z6 and Z8. A low voltage will de-energize shunt relay Z28, opening contacts Z36 to de-energize low voltage relay Z38. When relay Z38 is de-energized its normally open contacts Z42 will close. Contacts Z42 will energize a low voltage lamp Z46 which is located on the front panel 36 of the central receiver-recorder (FIG. 1) by connecting it between a 5-volt AC line Z48 and the AC common line Z8. Contacts Z44, when closed, will energize an audible alarm Z49 by connecting it across the AC common line Z8 and the 115 volt AC supply lines Z6. De-energization of voltage monitor relay Z18, which indicates a low voltage condition, will supply a ground to error conductor 256 which, as previously explained, will energize the error relay E2 of the error circuits 238 (FIG. 12). Resistors Z30 and Z40, connected in series with relays Z18 and Z38 respectively, are both 54,000 ohm, 4-watt resistors.

Referring now to FIG. 15A, when the central receiver-recorder of the invention is plugged into the 115 volts AC power lines, 115 volts AC appears between AC common line Z8 and AC line Z6. Also, 5 volts AC appears on conductor Z48. Minus 48 volts DC appears on line Z52, and 145 volts DC appears across lines Z54. Thus, an operator presses the power ON push button Z56, minus 48 volts DC is supplied to the power ON line Z60. This applies power to the punch 26 (FIG. 4D). If all punch interlocks such as proper tape tension, amount of tape, etc., are fulfilled, one of the punch interlock lines 260 connected to a punch relay Z62 will energize this relay, and the swinger of relay Z62 will supply minus 48 volts DC to the power ON conductor Z60, so that conductor Z60 will remain energized when the operator releases the power ON button Z56.

Before the operator pushes the power ON push button Z56, punch relay Z56 will be de-energized and its swinger will supply minus 48 volts DC to error conductor 106 of the main cable, and this error indication will also be supplied to conductor 106 when the punch interlocks are not satisfied after the power ON push button Z56 is depressed.

Referring now to FIG. 15C, the power ON conductor Z60 will then supply minus 48 volts DC to one side of a length of message sync signal relay Z64, the other side of the coil thereof being connected to the length of message sync conductor 114 of the main cable. Thus, when the length of message sync signal, which is a ground, appears on conductor 114, sync relay Z64 will energize and its swinger, which is connected to a source of minus 150 volts DC (not shown), will supply a negative signal to a 20 millisecond delay device Z66. Delay device Z66 will energize a character gate relay Z68 for 20 milliseconds from the beginning of the sync signal on conductor 114. The swinger of the character gate relay Z68, which is connected to a source of plus 250 volts DC (not shown), will supply this voltage to character gate line 140. This will enable the translator unit 128 (FIG. 4B) in the manner previously described. When the length of message sync signal is not being received, the swinger on relay Z64 normally supplies minus 150 volts to the sync pulse conductor 224 which is connected to the length of message minitor unit 218 (FIG. 4C). As was explained previously in the description of the length of message monitor unit (FIG. 11), the reappearance of the minus 150 volts on conductor 224 at the end of the length of message sync signal enables a delay device which interrogates a set of gates at the proper time to insert the length of message character number into storage flip-flops.

Energization of conductor Z60 will through a normally closed "start" push button Z70 (FIG. 15B) supply minus 48 volts DC to a "stop" conductor Z72. Stop conductor Z72 is connected to one side of the energization coil of a "stop" relay Z228. The other side thereof is connected to a swinger Z74 of a "transmitter start of message" relay Z226. Relay Z226 will be de-energized and swinger Z74 will connect the coil of relay Z228 to conductor Z79. Conductor Z72, which is energized by the minus 48 volts power ON line Z60 through the start button Z70, will be connected through normally closed contacts Z76 of power ON relay Z238 (FIG. 15C) to "stop preset" conductor Z78. Energization of this conductor will energize a "stop preset" relay Z232 transferring contacts Z80 thereon to supply a ground on conductor Z79. Conductor Z79, through contacts Z74 of relay Z226, will complete the circuit of the energization coil of stop relay Z228 and it will pull up. Contacts Z82 thereon then close, energizing "stop" lamp Z84 on front panel 36 (FIG. 1). Contacts Z86 open and contacts Z88 transfer. Thus, when the operator depresses the power ON push button Z56, the control circuits of the invention are immediately put in what is known as the "stop" condition. Since contacts Z86 of relay Z228 will be open, no energization will be supplied to stop conductor Z2, and the stop relay Y12 of the test and reset unit (FIG. 14) will remain de-energized, as will the "central off" conductor 108 which is connected to conductor Z2 through normally closed contacts Z90 of a "tape failure" relay Z252.

When the central receiver-recorder is in the stop condition, that is stop relay Z228 is energized, no messages may be received from the outlying transmitters 20, and various tests may be performed at the central receiver-recorder, such as those performed by the test and reset unit 262 (FIG. 4B). Thus, if the stop relay Z228 is energized, a ready to transmit signal on conductor 86 of the main cable, which is a ground signal, will not energize start search relay Z240 (FIG. 15C) connected thereto. This is because the other side of the coil of relay Z240 will not be supplied with minus 48 volts DC, which is required to energize relay Z240. This is because the other side of the coil of relay Z240 is connected to a "search on" conductor Z92 which, in order to be energized, requires that contacts Z94 of the power on relay Z238, and transfer contacts Z88 be in their de-energized position on stop relay Z228 in order to supply energization to search on conductor Z92.

In order to take the control circuits out of the stop condition, that is de-energize stop relay Z228, the operator depresses start push button Z70 which temporarily de-energizes stop conductor Z72, which will temporarily de-energize the stop relay Z228. When the stop relay was energized, its transfer contacts Z88 were connecting conductor Z98 to conductor Z100. Conductor Z98 was connected through contacts Z102 on normally de-energized "central test" relay Z236 to a "ready to receive conductor Z104." Conductor Z104, through the normally closed contacts of an "accumulator on" relay Z222, is connected to the power ON conductor Z60. Power on relay Z238 was energized when the stop relay Z228 was energized. The temporary de-energization of stop relay Z228, caused by depressing the start button Z70, will cause the stop relay to remain de-energized, since energization of power ON relay Z238, opened contacts Z76. This disconnected stop conductor Z72 from stop preset conductor Z78, which controls stop preset relay Z232. When so de-energized, relay Z232 no longer supplies a ground to conductor Z79 to energize stop relay Z228. It can thus be seen that power ON relay Z238 acts as an automatic stop relay, inasmuch as it automatically puts the control circuits 90 into the stop condition, that is it energizes stop relay Z228 when the power on push button Z56 (FIG. 15A) is depressed. Also, stop preset relay Z232 is a control on stop relay Z228, inasmuch as stop preset relay Z232 must be energized in order for stop relay Z228 to energize. Energization of the stop preset relay Z232 will not necessarily cause immediate energization of the stop relay Z228, since ground conductor Z79 is qualified through normally closed contacts Z74 on the start of message relay Z226.

After the stop relay Z228 has been de-energized by depressing the start push button Z70, a ready to transmit ground signal on conductor 86 will be able to energize start search relay Z240 (FIG. 15C). Search on conductor Z92 is energized through contacts Z94 of power on relay Z238, transfer contact Z88 of stop relay Z228, conductor Z98, and contact Z102 of central test relay Z236. So long as the accumulator on relay Z222 is not energized, minus 48 volts will be present on the ready to receive conductor Z104 to complete the circuit of "start search" relay Z240.

Energization of start search relay Z240 by the ready to transmit ground signal on conductor 86 will close contacts Z106 thereof, and transfer contacts Z108 thereof. The closing of contacts Z106 will supply minus 48 volts DC from the ready to receive conductor Z104 to a receiving conductor Z110. Operation of transfer contacts Z108 will supply minus 48 volts from "power on" conductor Z60 to a "search control" relay Z250 via a conductor Z112. Energization of the receiving conductor Z110 will condition for energization central message gate relay Z200, character gate relay Z202, start character gate relay Z204, start scanner relay Z208 and scanner control relay Z210 (FIG. 15A), which are all connected in parallel to conductor Z110.

Again referring to FIG. 15C, the minus 48 volts DC, supplied on conductor Z112 to search control relay Z250 will energize relay Z250. Its energization circuit is completed through normally closed contacts Z114 of search relay Z248 and transfer contacts Z80 on stop preset relay Z232 (FIG. 15B).

Energization of search control relay Z250 will close contacts Z116 thereon, connecting the energization coil of a "search" relay Z248 via conductor Z118 and transfer contacts Z120 of a "search inhibit" relay Z244 to receiving conductor Z110. Energization of search relay Z248 will open contacts Z114 thereof, de-energizing search control relay Z250. This will open contacts Z116 thereof to de-energize search relay Z248. De-energization of search relay Z248 will close contacts Z114 thereof, re-energizing search control relay Z250. This will close contacts Z116 thereof to re-energize search relay Z248. Thus, the two relays Z248 and Z250 act together as a mechanical multivibrator. So long as a ground is supplied to contacts Z114 by contacts Z80 on stop preset relay Z232 and minus 48 volts DC is supplied on conductors Z112 and Z118, search relay Z248 will continue to energize and de-energize.

The energization and de-energization of search relay Z248 will cause pawl Z122 to rotate ratchet Z124, which rotates wipers Z126 and Z128 of two stepping switch levels Z130 and Z132. Wiper Z126 will supply a ground to each of the search conductors 84 of the main cable. This ground will be supplied to one of the conductors 84 at each step of search relay Z248. Wiper Z128 which is connected to the "search on" conductor Z92, and therefore supplied with minus 48 volts DC, will supply this voltage to each conductor of search conductors 76 for six successive energizations of search relay Z248. In this manner, one revolution of the ratchet Z124, and wipers Z126 and Z128, will successively energize all combinations of the search conductors, including one conductor from each of the search line groups, 76 and 84.

As previously described, when the appropriate search conductors connected to a location relay $R_4$ (FIG. 4A) at a transmitter, ready to transmit a signal, are energized and grounded by wipers Z128 and Z126 respectively, the transmitter 20 will send back to the central receiver-recorder, via conductor 92 of the main cable, a "search inhibit" ground signal. This signal, as can be seen in FIG. 15C, will supply a ground to one side of the energization coil of search inhibit relay Z244. The other side of the coil of relay Z244 is connected through transfer contacts Z134 on central test relay Z236 to the ready to receive conductor Z104. Search inhibit relay Z244 will thus be energized and its transfer contacts Z120 will disconnect receiving conductors Z110 from conductor Z118, preventing the further energization of search relay Z248. Contact Z120 on search inhibit relay Z244 will also, upon energization, supply the —48 volts on receiving conductor Z110 to conductors Z136 and Z138. Conductor Z136, which is known as the "start of message" conductor, will supply minus 48 volts to one side of the energization coil of "start of message" relay Z224 (FIG. 15B). The other side of start of message relay Z224 is connected to the "end of message" conductor 250, from the special function unit 240 (FIG. 13), and, as will be understood from the previous description of that unit, will be grounded until an end of message or error character is punched on the output tape 28. Thus, start of message relay Z224 will be energized by the energization of search inhibit relay Z244.

Energization of relay Z224 will close contacts Z139 and Z140 thereof and transfer contacts Z142 thereof. The closing of contact Z139 will connect the ready to receive conductor Z104 to receiving conductor Z110. This will continue to energize receiving conductor Z110, even after the end of the "ready to transmit" signal on conductor 86 which, through contacts Z106 on start search relay Z240 (FIG. 15C), had been energizing receiving conductor Z110. Closure of contacts Z140 will connect conductor Z104 to the energization coil of a second "start of message" relay Z226, and relay Z226 will be energized. Closure of contact Z140 will also supply minus 48 volts from conductor Z104 to the transmitter hold conductor 98 of the main cable. The transfer of contacts Z142 of relay Z224 will connect 115 volt AC line Z6 to the motor control line of scanner control conductors 127, and the motor of scanner 126 (FIG. 4B) will be energized. As will be understood by reference to the previously identified Reynolds et al. application, the scanner 126 contains a motor and a clutch. The motor is started rotating prior to operation of the scanner. At the time the read-out is desired, the clutch is energized, and the scanner wiper goes around the scanner once, connecting the contacts successively.

Energization of relay Z226 opens normally closed contacts Z144, Z74 and Z150 thereof, and closes normally open contacts Z146 and Z148 thereof.

Now, energization of the search inhibit relay Z244 (FIG. 15C), as previously explained, also supplied minus 48 volts DC to conductor Z138. After relay Z244 was energized, but before relay Z226 was energized, conductor Z138 was connected via normally closed contact Z144 of relay Z226 to the energization coil of a "transmitter start" relay Z246. The circuit of the coil of relay Z246 is completed through grounded "end of message" conductor 250. When transmitter start relay Z246 is energized, its contacts Z152 closed, connecting conductor Z136 to transmitter start conductor 94 of the main cable. Contacts Z154 of relay Z246 closed connecting conductor Z138, via contacts Z156 of relay Z242, to the energization terminal of transmitter start relay Z246. In this manner, it is insured that transmitter start relay Z246 remains energized, even after the search inhibit relay Z244 is de-energized. When start of message relay Z226 is energized, however, contacts Z144 thereof open and, as can be seen in FIG. 15C, energization of "transmitter message gate" relay 242, opening its contact Z156, will cause relay The transmitter message gate relay Z242 is energized Z246 to be de-energized.

upon receipt of a ground signal on transmitter message gate conductor 102. This can be seen, by reference to the previously described transmitter circuitry (FIG. 4A), to occur when transmitting relay $R_9$ thereof energizes, which is at the beginning of the transmitter message. In this manner, the transmitter start signal on conductor 94 is caused to continue until the time that both the transmitter message gate relay Z242 and the start of message relay Z226 are energized. This provides time for the operation of the various control relays in the transmitter 20 (FIG. 4A), and energization of the start of message relays Z224 and Z226 at the central receiver-recorder (FIG. 15B).

Energization of transmitter start relay Z246 closed contacts Z158 thereon to supply a ground to transmitter message gate conductor 244 for use at the special function unit 240 (FIG. 4C). When relay Z242 is energized, contacts Z157 thereon also supply the ground. Thus, the transmitter message gate signal on conductor 244 begins at the beginning of the transmitter start signal and continues so long as the transmitter message gate signal on conductor 102 of the main cable is received.

Again referring to FIG. 15B, opening of contacts Z74 of start of message relay Z226 disconnects the coil of stop relay Z228 from ground supply conductor Z79, so that stop relay Z228 cannot be energized to put the central receiver-recorder into the stop condition. Opening of contacts Z150 of relay Z226 disconnects the energization circuit of central test relay Z236, insuring that no central test may be made now that a transmitter is transmitting a message. Closure of contacts Z146 supplies minus 48 volts DC from the unqualified minus 48 volts supply conductor Z52 to a "time pulse hold" conductor Z158. As will be explained below, energization of time pulse hold conductor Z158 prevents the supply of minute impulses on "minute impulse lines" 122 to the time data coder 120 (FIG. 4B), insuring that the central message will not be recorded during the period when the time characters are changing. Closure of contacts Z148 on relay Z226 connects the ready to receive conductor 104 to the first start of message relay Z224, thus insuring energization of relays Z224 and Z226 after search inhibit relay Z244 (FIG. 15C) has de-energized.

The transmitter, whose location relay $R_4$ (FIG. 4A) has been energized and therefore is receiving the transmitter hold signal on conductor 98, and has received the short transmitter start signal on conductor 94, will now transmit its message. At some time during the message, the length of message sync pulse will be sent on conductor 114, energizing length of message sync relay Z64 (FIG. 15C), producing the character gate and sync pulse signals on conductors 140 and 244, respectively. The error signaling unit 238, and the special function unit 240 will, during and just after the message, process the message for possible errors. If there is no error, at the end of the first data group (in this case the transmitter message), the two conductors of the "no error" first data group line 252 will be connected together by the no error first data group relay X90 of the special function unit (FIG. 13). The connecting together of the no error first data group conductors 252 will connect a "start central message" relay Z234 to conductor 252, thereby supplying minus 48 volts to one side of the energization coil of relay Z234. Since the other side of the coil is connected to the ground on "end of message" conductor 250, relay 234 will energize. Contacts Z160 thereof will close, supplying minus 48 volts to the energization coil of relay Z234 from the power on conductor Z60, independently of the no error first data group conductors 252. Thus, relay Z234 will remain energized after the no error first data group relay X90 of the special function unit 240 is no longer energized.

The function of the start central message relay Z234 is to supply a ground through transfer contacts Z162 to contacts Z164 of a "scanner control relay" Z210 (FIG. 15A). This ground will, through the normally closed contacts Z164, provide a ground to the central message gate conductor 246, for use at the special function unit 240 (FIG. 4C). Closure of contacts Z166 of relay Z234 will condition for energization the start scanner relay Z208 (FIG. 15A), by a ground signal on "ready to receive" conductor Y8, originating at the test and reset unit 264 (FIG. 4B). This conductor Y8 will be grounded upon receipt of a message gate signal on conductor 248 (FIG. 4B), at the test and reset unit 262. In effect therefore, energization of relay Z234 will result in energization of relay Z208 as well as relay Z210. And, as will be explained below, this will result in energization of the scanner clutch. Closure of contacts Z168, of start central message relay Z234, connects "ready to receive" conductor Z104 to "receiving" conductor Z110, insuring the continued energization of conductor Z110.

Energization of the start scanner relay Z208 (FIG. 15A) closes contacts Z170 thereon, conditioning a "central message gate" relay Z200 for energization by a "start character gate" signal on conductor 110, from the scanner 126 of the central receiver-recorder (FIG. 4B). Closure of contacts Z172 on relay Z208 connects the 115 volt AC conductor Z6 to normally closed contacts Z174 of scanner control relay Z210. This energizes a conductor Z176 connected to the clutch control line of the scanner control cable 127 (FIG. 15B). In this manner, the scanner 126 is energized to scan the time data coder 120, and the fixed data plugboard 124 (FIG. 4B), to provide the central message characters on the Hollerith lines 46.

As the scanner 126, which is substantially identical to the scanner 58 of the transmitter 20 (FIG. 4A), begins its scan, it produces a start character gate signal on conductor 110, as is explained in detail on the previously identified Reynolds et al. application. The signal on conductor 110 energizes the start character gate relay Z204, and the contacts Z178 thereof close. This supplies a ground, originating at normally closed contacts Z180 upon end character gate relay Z202, to character gate conductor 51 of the character gate lines 48. This also supplies a ground to the energization coil of start character gate relay Z204, so that it remains energized after the ground signal on conductor 110 has ended. At the end of its scan, scanner 126 produces an "end character gate" ground signal on conductor 112, which energizes the end character gate relay Z202. This opens contacts Z180 thereof, removing the ground signal from character gate line 51.

This also removes the ground from the energization coil of relay Z204, so that it de-energizes. In the same manner, previously described, the start character gate relay Z204, and end character gate relay Z202, provide a character gate signal on conductor 51 during a transmitter message, upon receipt of the start character signal on conductor 110, and end character gate signal on conductor 112.

During the central message, closure of contact Z170 on the scanner relay Z208 energizes the central message gate relay Z200, and the contacts Z182 thereof close, so that when contacts Z178 on start character gate relay Z204 close, the central message gate relay Z200 will become self-locking and remain energized even after start scanner relay Z208 has de-energized. Relay Z200 will remain energized until the end character gate relay Z202 energizes, opening contacts Z180 thereof. Contacts Z184 of relay Z200 are also closed upon energization thereof, and supply a ground signal to the central message gate conductor 246 independently of contacts Z164 on scanner control relay Z210. In this manner, a central message gate signal is produced on conductor 246 for the duration of the scan of scanner 126 (FIG. 4B).

A cam switch Z186 (shown in FIG. 15A) is provided in scanner 126, which momentarily closes at the beginning of the operation of the scanner 126. This supplies a ground to scanner control relay Z210, which causes contacts Z164 thereon to transfer and continue to supply this ground to scanner control relay Z210, thus locking it in its energized state. Contacts Z174, therefore, will open and clutch conductor Z176 of scanner control lines 127 will no longer be energized. However, it will be understood, by reference to the previously identified Reynolds, et al. application, that the scanner 126 has an off normal homing switch which supplies the necessary energization to the scanner clutch to insure that the scanner completes its sweep. Scanner control relay Z210 insures that the scanner sweeps only once, so that only one central message is recorded per transmitter message.

At the end of the central message, the punching of an "end of message" character or an "error" character on tape 28, by means of the respective relays of the special function unit 240 (FIG. 4C), will temporarily remove the ground from the end of message conductor 250. This will, of course, de-energize all the relays connected thereto which are not self-locking, that is, relays Z224, Z234, Z236 and Z246. Relay Z226 will also de-energize, since it is controlled by relay Z224. All relays previously described above will therefore be de-energized except the power on relay Z238, and the start search relay Z240 and the search inhibit relay Z244, which may be energized. If search inhibit relay Z244 is energized by a search inhibit signal on conductor 92, transmission will immediately begin from the transmitter whose location relay is energized by the search conductors 76 and 84 connected by wiper arms Z126 and Z128 (FIG. 15C). Referring to FIG. 15C, it will be remembered that the stepping of search relay Z248 (FIG. 15C) was concluded by energization of the search inhibit relay Z244 at the beginning of the precedingly described transmission. Now, the search inhibit relay Z244 was de-energized during the preceding message when, upon energization of transmitting relay $R_9$ (FIG. 4A) at the transmitting transmitter, location relay $R_4$ was de-energized, opening contacts $C_3$ thereof and terminating the search inhibit signal on conductor 92. When this happened search inhibit relay Z244 de-energized. Search relay Z248 was again able to step in the manner previously described when start search relay Z240 was energized by a ready to transmit signal on conductor 86. Now, the transmitter transmitting the previously described message was not, at this time, transmitting a ready to transmit signal, since contacts $C_{12}$ on relay $R_9$ thereof (FIG. 4A) were opened at the beginning of the message. Thus, when another transmitter was ready to transmit and was transmitting a "ready to transmit" signal on conductor 86, start search relay Z240 (FIG. 15C) energized, resulting in the location of a second ready transmitter. Since, a complete message recorded on the output medium of the central receiver-recorder takes approximately 2.4 seconds, and it only takes 29 milliseconds for stepping switch relay Z248 to rotate wipers Z126 and Z128 360°, it will be seen that, during peak loading periods, transmitters will be readied for transmission during periods when other transmitters are transmitting. This means that there will be no lost time during peak loading periods while a transmitter is being readied for transmission. Each message will be transmitted from each successive transmitter, with substantially no intervening time.

Now referring to FIG. 15B, it will be understood that, if during a message the stop push button Z188 is depressed, minus 48 volts DC from the power on conductor Z60 will be supplied to conductor Z78, energizing the stop preset relay Z232. Contacts Z190 of relay Z232 will then supply minus 48 volts DC to the energization coil thereof, locking the relay in its energized state. Contacts Z80 of relay Z232 will transfer, and a ground will be supplied on conductor Z79. Therefore, at the end of a message when relay Z226 de-energizes, as previously described, its contacts Z74 will close, supplying a ground to stop relay Z228. Stop relay Z228 will then energize, placing the control circuits in the previously described stop condition. In this manner, an operator cannot, by depressing the stop button Z188, cause the central receiver-recorder to go into the stop condition during a message, which might otherwise result in the loss of information.

Still referring to FIG. 15B, a "tape failure" relay Z252, which has one side of its energization coil, connected to a "tape failure" line Z192 of the punch interlock conductors Z260, will be energized if the tape breaks, runs out, or some other condition exists at the punch 26 (FIG. 4D) to prevent the recording of characters on the output medium of the invention. Energization of the tape failure relay Z252 will open normally closed contacts Z90 thereon to discontinue the energization of central off conductor 108 from stop conductor Z2, so that the various transmitters will be notified of this condition. As will be understood by reference to the previously identified Reynolds, et al. application, de-energization of the central off conductor 108 will immediately discontinue any message then in progress at any of the transmitters 20, and no transmissions will be initiated until relay Z252 is de-energized. If during a message, "second central error" conductor E90 from the error signaling unit 238 (FIG. 4C) has a second central error signal applied thereto, a "second central error" relay Z254 connected thereto (FIG. 15B), which is also connected to a source of B plus (not shown), will energize. Contacts Z194 thereon will close, connecting the coil of another "second central error" relay Z230 to the power on conductor Z60 through the start switch Z70. Upon punching of an error character on the tape, removal of ground from conductor 250 will de-energize relay Z234. Contacts Z162 of relay Z234 will then supply a ground to the second central error relay Z230, thereby energizing it. Closure of contacts Z194 of relay Z254 supplies minus 48 volts DC from the start push button Z70 to the stop preset relay Z232. Closure of contacts Z196 on second central error relay Z230 immediately puts the central receiver-recorder into stop condition, by energizing stop relay Z228 through contacts Z194 on relay Z254. Closure of contacts Z198 of relay Z230 connects an error lamp Z300 located on the front panel 36 (FIG. 1) by connecting it across the AC common conductor Z8 and the minus 5 volts conductor Z48. Closure of contacts Z302 on relay Z230 connects the AC common conductor Z8 to the audible alarm Z48 (FIG. 15C) to thereby energize it.

Referring now to FIG. 15A, an error signal on conductor E116, from the error signaling unit 238 (FIG. 4C), which is a minus 48 volts DC potential supplied by the error relay E2 (FIG. 12), will energize error conductor 106, notifying the transmitters 20 that an error has occurred. And, as previously described, energization of the error relay E2 removes the ground from conductor 250, concluding the transmission then in progress.

Now referring again to FIG. 15B, when it is desired to test the operation of the central receiver-recorder by having its message punched on the output medium of the central receiver-recorder the operator depresses a normally open readout push button Z304. Then, if start search relay Z240 (FIG. 15C) is de-energized, contacts Z108 thereon will connect the power on conductor Z60 through the readout push button Z304 and through normally closed contacts Z150 on start of message relay Z226 to the coil of central test relay Z236. Relay Z236 will energize, if an end of message or error character is not being punched, that is if a ground is supplied on conductor 250 connected to the coil thereof. In this manner, the central test relay Z236 will only be energized by depressing the readout push button Z304 if a ready to transmit signal is not being received and a transmission is not in progress, as would be indicated by the energization of the start of message relay Z226.

Energization of central test relay Z236 transfers contacts Z134 thereof, connecting time pulse hold conductor Z158 to ready to receive conductor Z104 to thereby prevent changing of the time character during the readout sequence, as will be described below. Contacts Z102 of relay Z236 transfer, connecting "ready to receive" conductor Z104 to the "start central message" gate relay Z234, energizing it to initiate a central message. Contacts Z306 of relay Z236 transfer, to connect, through contacts Z142 of relay Z224, the scanner motor conductor of the scanner control lines 127 to the 115-volt AC conductor Z6. This starts the motor of the scanner 126 (FIG. 4B). Energization of the start central message gate relay Z234 will close contacts Z308 thereof to energize the central test relay Z236 in the same manner as readout push button Z304, which is connected in parallel with contacts Z308. In this way, central test relay Z236 will remain energized for the period of the central test message.

Referring to FIG. 15A, fast correction relay Z216, minute impulse relay Z218, polarity reverse relay Z220 and an accumulator on relay Z222 (FIG. 15B) are all connected for energization to master clock cable 118, which is connected to the master clock of the system 116 (FIG. 4B). It will be understood that master clock 116 produces a pulse each minute which will energize relay Z218 and will correct the secondary clocks at given periods by energizing fast correction relay Z216, and polarity reversing relay Z220, and by providing rapid energization and de-energization of minute impulse relay Z218, Also, when the master clock is re-energized after periods of power failure, the accumulator on relay Z222 will be energized, together with relays Z216 and Z220, and a plurality of rapid impulses will rapidly energize and de-energize relay Z218 to correct the secondary clocks. As previously explained, energization of the accumulator on relay Z222 prevents energization of ready to receive conductor Z104 so that no transmission will occur at this time.

Closure of contacts Z310 on relay Z218 connects minus 48 volt conductor Z52 to transfer contacts Z312 on polarity reverse relay Z220, and this will supply minus 48 volts DC to one of the clock conductors 66 connected to the main cable 24. The other conductor will be connected to transfer contacts Z314 on polarity reverse relay Z220. Thus, normal energization of minute impulse relay Z218 will produce a minute impulse across the clock conductors 66. During periods when the polarity is reversed and the minute impulses are rapid, the pulses will be produced on clock conductors 66 in the opposite polarity. Energization of minute impulse relay Z218 transfers contacts Z316 thereon to supply minus 48 volts to time control relay Z214, to energize this relay. Energization of relay Z214 closes contact Z318 thereon, connecting the coil of time control relay Z214 to time pulse hold conductor Z158. Thus, if time pulse hold conductor Z158 has been energized in any manner, as previously described, time control relay Z214 will remain energized. Energization of relay Z214 closes contacts Z320 thereon. This will produce a 145 volt minute impulse on minute impulse conductors 122 connected to the time data coder 120 (FIG. 4B), since polarity reversing contacts Z324 of polarity reverse relay Z220 are connected to a source of 145 volts DC, (not shown). Contacts Z324 operate in the same manner as the polarity reversing contacts Z312 and Z314 of relay Z220. Upon energization of relay Z214, contacts Z322 thereon close, connecting the coil of a time failure relay Z212, to contacts Z326 on relay Z212 which will, if time failure relay Z212 has already been energized, cause it to remain energized so long as time control relay Z214 is energized.

The time data coder 120 (FIG. 4B) is designed in such a way that the time character is not changed therein until the end of the minute impulse is supplied on conductors 122. Thus, if time control relay Z214 energizes during a message, it will lock up because of the energization supplied thereto from time pulse hold conductor Z158 through its own contacts Z318 and the time data coder 120 will not change its character until the end of the message then in progress.

Energization of the minute impulse relay Z218 will close contacts Z328 thereon to supply minus 48 volts from power on conductor Z60 to conductor Z330. Energization of the stop preset relay Z232 (FIG. 15B) will close contacts Z332 thereon, to also energize conductor Z330. Contacts Z334 of time failure relay Z212 will, when relay Z212 is energized, connect conductor Z330 to the stop preset conductor Z78. It will be remembered that, when energized, conductor Z78 energizes the stop preset relay Z232 (FIG. 15B). Thus, if time failure relay Z212 is energized when a minute impulse occurs, or when stop preset relay Z232 is energized, an error lockup situation will ensue, that is, the stop preset relay will be energized so long as time failure relay Z212 remains energized.

In order to insure that the minute impuses on minute impusle conductors 122 are received at the time coder 120 (FIG. 4B), cam switch Z338 located thereat (shown on FIG. 15A) opens each time the minute impulses are properly received at the time coder 120. When closed, cam switch Z338 completes a circuit through normally closed contacts ZZ340 of fast correction relay Z216, to supply minus 48 volts to time pulse hold conductor Z158. Thus, if the minute impulses are not properly received, and cam switch Z338 does not open, time control relay Z214 will be continuously energized. If this occurs at any time, except when fast correction relay Z216 is energized, contacts Z342 thereof will complete a circuit through transfer contact Z316 of minute impulse relay Z218 to connect minus 48 volts from supply conductor Z52 to contacts Z322 on time control relay Z214. Since time control relay Z214 has locked up due to the fact that cam switch Z338 has not opened, time failure relay Z212 will remain energized and lock itself up through contacts Z326 thereon, and contacts Z322 of time control relay Z214. The previously described stop lock up situation will then ensue due to the energization of conductor Z78 through contacts Z334 of time failure relay Z212. This will continue until manual correction of the time data coder.

It will be seen therefore that control circuits have been described as shown in FIG. 15 wherein the initially mentioned five functions are performed.

It will thus be seen that the objects set forth above, among those made apparent from the preceding description, are efficiently attained and, since certain changes may be made in practicing the disclosed method of communication and in the apparatus set forth without departing from the scope of the invention, it is intended that all matter contained in the above description or shown in the accompanying drawings shall be interpreted as illustrative and not in a limiting sense. It is to be understood, for example, that while the preferred embodiment discloses a multiconductor communication cable as the intercommunicating link between transmitting stations and the central receiver-recorder, the invention is not so limited but may be employed with other suitable types of communication channels such as, but not limited to, multiple frequency carrier circuits over a common conductor, or radio frequency communication channels which may be either amplitude or frequency modulated. It is further to be understood that while the continuous medium record output disclosed herein is punched tape, the invention is equally applicable to magnetic tape, or to any other form of record media. Wherever thermionic devices have been disclosed herein it will be understood that equivalent electronic devices, including solid state devices such as transistors, may be substituted without departing from the invention.

It is also to be understood that the following claims are intended to cover all of the generic and specific features of the invention which, as a matter of language, might be said to fall therebetween. Particularly, it is to be understood that in said claims, elements recited in the singular are intended to include compatible combinations of equivalent elements wherever the sense permits.

Having described our invention, what we claim as new and desire to secure by Letters Patent is:

1. An automatic data collection and recording system comprising in combination, a central office, a plurality of outlying stations, a common multicircuit communication channel connected to each of said outlying stations and to said central office, means at each station for sending a calling signal over said communication channel to said central office, station selection means at said central office responsive to receipt thereat of a calling signal from any of said outlying stations to select a calling station and to initiate automatic transmission from the selected calling station to the central office, and means including said selection means for selectively engaging another calling station while receiving and recording at said central office a transmission from a previously selected calling station and preparing said other calling station for immediate transmission of data to said central office upon termination of data transmission by said previously selected calling station.

2. In a system for automatic data collection, the combination comprising a plurality of data transmitters, a central receiver-recorder connected to each of said transmitters to receive data therefrom individually, search and selection means at said receiver-recorder including search lines connecting each of said transmitters to said central receiver-recorder for selecting an individual transmitter for transmission thereto, means at each of said transmitters for sending to said receiver-recorder a ready to transmit signal, means at said receiver-recorder to initiate operation of said search and selection means upon receipt of said ready to transmit signal, location means at each of said transmitters responsive to a particular distinctive signal received thereat over said search lines, said location means adapted to send a search inhibit signal to said receiver-recorder upon receipt of said distinctive signals, means at said central receiver-recorder responsive to receipt thereat of said search inhibit signal to inhibit operation of said search and selection means, further means at said central receiver-recorder for sending to said transmitters a transmitter hold signal and a transmitter synchronization signal when said receiver-recorder is ready to receive a transmission from a selected transmitter, and initiating means at each of said transmitters enabled by operation of said location means thereat to initiate transmission from a selected transmitter when said transmitter hold and transmitter synchronization signals are received simultaneously.

3. The combination defined in claim 2 wherein said initiating means is further adapted to inhibit the operation of said location means and to inhibit the operation of said means for sending a ready to transmit signal, whereby said search inhibit signal is terminated and said central receiver-recorder is responsive to receipt of another ready to transmit signal from another transmitter for selection of another transmitter that is ready to transmit.

4. The combination defined in claim 3 wherein said last named means is further adapted to inhibit transmission when said transmitter hold signal is no longer received.

5. The combination defined in claim 2 wherein said search lines comprise first and second groups of conductors each equal in number to the square root of the number of transmitters that may be selected by said central receiver-recorder, and wherein said search and selection means comprise sequential switching means adapted to successively connect in circuit pairs of said conductors, said pairs being formed of one conductor from each of said groups of conductors, and said location means at each transmitter is connected to a different pair of said pairs of conductors.

6. The combination defined in claim 2 wherein said plurality of search lines comprises distinct groups of conductors, each said group having an equal number of conductors, said search and selection means comprises sequential switching means adapted to successively connect in circuit a plurality of conductors including one conductor from each of said groups, and said location means at each of said transmitters is connected to a different combination of said conductors.

7. In a system for automatic data collection, the combination comprising, a plurality of data transmitter stations, a central receiver-recorder connected to each of said stations by a common multi-conductor cable and adapted to receive data from said stations, individually, a plurality of search lines in said cable connecting said transmitter stations to said central receiver-recorder, said search lines comprising two distinct groups of conductors, each of said groups of conductors equal in number to the square root of the number of transmitter stations which may be selectively connected to said central receiver-recorder, station location means at each of said stations, each of said station location means connected to a different pair of conductors, one conductor of each of said pairs being selected from each of said groups, and selection means at said central receiver-recorder for selecting any one of said transmitter stations by connecting in circuit the pair of conductors to which the selected station's location means is connected.

8. Means for selectively signaling one of a plurality of local stations from a central station, comprising in combination, two groups of conductors connecting said central station with all of said local stations, the number of conductors in each group equal to the square root of the number of local stations selectively connectable with said central station by means of said groups, signal receiving means at each of said local stations connected to a different pair of said conductors, said pairs of conductors being selected one from each of said groups of conductors, and sequential switching means at said central station adapted to successively connect in circuit each of the conductors of one of said groups to each conductor of the other of said groups, whereby said signal receiving means at said local stations may be selectively energized.

9. The combination of claim 8 wherein said sequential switching means connects said conductors in circuit by successively grounding the conductors of one of said groups and successively energizing the conductors of the other of said groups.

10. An automatic data collection system comprising in combination, a plurality of data transmitters in communication with a central receiver-recorder, a multiple channel transmission link connected between said transmitters and said receiver-recorder, means at said transmitters for reading the alpha numeric code characters contained on a plurality of data cards, means at said transmitters adapted to convert variable input information into alpha numeric code characters, means at said transmitters including said reading means for transmitting said code characters sequentially to said central receiver-recorder over said multiple channel transmission link, a translator at said central receiver-recorder connected to said transmission link and adapted to translate said characters received thereat into the characters of a processable medium code, a processable medium recorder at said central receiver-recorder adapted to record characters at a rate greater than the average rate at which they are received from any of said transmitters, synchronous storage means connected between said translator and said recorder to synchronize the incoming characters to the recording rate of said recorder, said storage means having at least two stages each capable of storing one character, each of said stages including a plurality of bit storage elements, parity insertion means connected to said storage means and adapted to check the parity of each translated character and to set a check bit storage element in said storage means if said parity differs from a preselected parity, parity check means for monitoring the characters being recorded by said recording means and adapted to indicate when a character's parity differs from said preselected parity, said transmitters adapted to send to said central receiver-recorder a numeric character corresponding to the number of characters in the message being transmitted, length of message monitor means at said central receiver-recorder including counter means adapted to compare the said numeric character to the number of characters received, error monitoring and signaling means at said central receiver-recorder connected to said length of message monitor means and to said parity check means and adapted to send an error signal to said transmitters when a parity or length of message error occurs and to send to said storage means an error character for recording by said processable medium recorder, and means at said transmitters responsive to said error signal to stop any transmission then in progress.

11. The combination defined in claim 10 and means at each of said transmitters for sending to said receiver-recorder a transmitter message gating signal when a message is being transmitted therefrom, and said reading means including means for sending to said receiver-recorder a character gating signal when characters may be read on the data cards, said translation means at said receiver recorder being responsive to data card originating characters only when said message and character gating signals are both received.

12. The combination of claim 11 and synchronous space character insertion means at said receiver-recorder connected to said storage means to insert space characters into said storage means at said average character reception rate whenever no characters are received from said transmitters within predetermined time limits.

13. An automatic data collection system comprising in combination a plurality of data transmitters connected for transmission to a central receiver-recorder, means at said transmitters for transmitting to said central receiver-recoder coded alpha numeric characters, means at said central receiver-recorder for receiving said alpha numeric coded characters and for recording the information contained therein on a common language output medium, means at each of said data transmitters for sending to said receiver-recorder a continuous message gating signal while characters are being transmitted, reading means at said data transmitters for reading a plurality of data cards and adapted to transmit the alpha numeric coded characters contained thereon to said central receiver-recorder, said reading means comprising further means for transmitting to said central receiver-recorder a continuous character gating signal whenever said coded characters appearing on said data cards represent information which it is desired to record on said continuous medium, and means at said central receiver-recorder for inhibiting signals received from being recorded on the output medium whenever said message and character gating signals are not received thereat.

14. An automatic data collection system comprising in combination a plurality of data transmitters connected for transmission to a central receiver-recorder, means at said transmitters for transmitting to said central receiver-recoder coded alpha numeric characters, means at said central receiver-recorder for receiving said alpha numeric coded characters and for recording the information contained therein on a common language output medium, reading means at said data transmitters for reading a plurality of data cards and adapted to transmit the alpha numeric coded characters contained thereon to said central receiver-recorder, said reading means comprising further means for transmitting to said central receiver-recorder a continuous character gating signal whenever said coded characters appearing on said data cards represent information which it is desired to record on said output medium, means at said central receiver-recorder for inhibiting signals received from being recorded on the said output medium whenever said character gating signal is not received thereat.

15. The combination defined in claim 13 and generating means at said central receiver-recorder responsive to receipt of said message and character gating signals to generate space characters for recording on said output medium at the rate of their normally expected arrival at said central receiver-recorder, said generating means being further adapted to inhibit the generation of said space characters when a character is received from said transmitters within predetermined limits of time from its expected arrival.

16. The combination defined in claim 14 and further means at said data transmitters for transmitting to said central receiver-recorder variable input information manually settable into said data transmitters in the form of alpha numeric coded characters in serial transmission with the characters on said data cards.

17. The combination defined in claim 16 further defined in that said last-mentioned means is adapted to transmit to said receiver-recorder a signal indicating the beginning of said character gating signal immediately prior to transmission of said variable input information characters and to send to said receiver-recorder a signal indicating the end of said character gating signal immediately subsequent to the transmission of said variable input information characters, said central receiver-recorder including means responsive to said signals and adapted to generate said continuous character gating signal for use thereat.

18. In an automatic data collection and recording system, potential monitoring and low voltage signaling means comprising in combination, a first relay having an energization circuit operatively connectable to a source of the potential to be monitored, said first relay being energizable initially at a characteristic voltage and de-energizable at a substantially lower voltage, and a second relay controlled by the energization of said first relay and having contacts adapted to insert a series impedance into said first relay energization circuit upon energization of said first relay, whereby said first relay is energized and deenergized when said source is substantially at the same voltage.

19. The combination defined in claim 18 further defined in that said source of potential to be monitored is a DC power supply energized by an AC line potential to be monitored, said power supply having a large output capacitance whereby said first relay is de-energized only when said line potential has decreased below a preselected minimum for a predetermined length of time.

20. Low voltage monitoring means comprising in combination, a DC power supply connected to and energized by AC power lines and producing at the output terminals thereof a DC potential proportional to the potential of said AC power lines, a capacitance impedance connected across the output terminals of said power supply, a plurality of resistors, connected in series a first electromagnetic relay having a solenoid and a plurality of contacts controlled thereby, the solenoid of said relay connected in series with said resistors to the output terminals of said power supply, an indication circuit connected in series with contacts on said first relay and operable thereby to indicate the status of the said AC line voltage, and a second electromagnetic relay having a solenoid and a pair of normally closed contacts operated thereby, said normally closed contacts shunting at least one of said series connected resistors when said second relay is de-energized, said solenoid of said second relay connected to a source of energization in series with a pair of normally open contacts of said first relay, whereby when said first relay is energized it is connected to said DC power supply through a greater series resistance than when said first relay is de-energized.

21. In a central data receiver a synchronous pulse producing apparatus comprising, in combination, a first delay device having an input terminal thereof connected to a source of input pulses occurring at predetermined instances in time corresponding to a predetermined constant average frequency, said first delay device adapted to produce at an output terminal thereof first delay pulses corresponding to said input pulses each delayed by a predetermined first delay time, an output terminal of said synchronous pulse producing device to which said delayed pulses are supplied, a second and a third delay device connected together in series and having a total delay time equal to the average time between said instances in time minus said first predetermined delay time, said first delayed pulses being supplied to an input terminal of said series connected second and third delay devices, the third delayed pulses occurring at an output terminal of said series connected second and third delay devices being supplied to one input terminal of a first AND gate, another input terminal of said first AND gate being supplied with said first delayed pulses from said first delay device, a fourth delay device having substantially the same delay time as said first delay device, the output pulses of said first AND gate being supplied to said fourth delay device, the delayed output of said fourth delay device supplying one input terminal of a second AND gate, another input terminal thereof being supplied with said first delayed pulses of said first delay device, the output pulses of said second AND gate being supplied to the output terminal of the synchronous pulse producing apparatus, whereby pulses are synchronously generated in the synchronous pulse producing apparatus at any of said predetermined instances of time when pulses are absent at the input terminal of said first delay device, and said generated pulses appear at the output terminal of said apparatus unless pulses occur at said input terminal within a predetermined time interval equal to twice said first delay time.

22. The combination defined in claim 21 in which the delay time of said third delay device is greater than the recovery time of said second delay device.

23. The combination defined in claim 21 and a third AND gate, said first delayed pulses of said first delay device being supplied to one input terminal thereof, another input terminal thereof being supplied with said input pulses and the output terminal thereof providing the pulses supplied to the output terminal of the synchronous pulse producing apparatus, whereby pulses of shorter duration than said first delay produce the effect of no pulses at the input of said first delay device.

24. A synchronous pulse producing apparatus for use in a central data receiver having an input terminal for monitoring a train of incoming pulses occurring at predetermined first instances in time corresponding to a constant average frequency, and an output terminal at which pulses occur at second instances corresponding to each of said first instances; the combination comprising, first pulse delay means connected to and adapted to delay all pulses occurring at the input terminal by a given first delay time and adapted to supply said delayed pulses to the output terminal thereof, regenerative pulse producing means for locally generating a continuous train of uniformly timed pulses occurring at the said constant average frequency, the phase of said generating pulse train being determined from the last instance when a pulse occurs at the said input terminal, means for comparing said continuous train of pulses to said incoming train of pulses, and means for supplying pulses from said continuously generated train of pulses to said output terminal when no pulse occurs in said incoming train of pulses within said first delay time.

25. In an automatic data collection system having a plurality of data transmitters and a central receiver-recorder connected therewith by a pulse modulation multiple channel transmission link, the combination comprising means at said transmitters for transmitting to said central receiver-recorder over said multiple channel transmission link data in the form of alpha numeric coded characters on a sequential pulse modulated parallel character basis, said data characters arriving at said central receiver-recorder at predetermined instances in time, said instances occurring at a substantially constant average frequency, spaces being indicated in said data transmission by the non-arrival at said central receiver-recorder of characters at certain of said predetermined instances in time, means at said transmitters for transmitting to said central receiver-recorder over said multiple channel transmission link a continuous gating signal when characters are to be transmitted, means at said central receiver-recorder for producing a data arrival pulse upon the arrival of each character, means for delaying said data arrival pulses by a predetermined interval, means for locally generating at said central receiver-recorder a continuous train of uniformly timed pulses at a constant frequency substantially corresponding to the said average frequency of said transmitted characters, means for comparing said locally generated pulses with said delayed data arrival pulses, means to introduce input synchronizing pulses at said central receiver-recorder, said input synchronizing pulses comprising said delayed data arrival pulses whenever they occur within said delay time from the predetermined instant of their expected occurrence and when data arrival pulses do not so occur said input synchronizing pulse comprises one of said locally generated pulses, and recording means at said central receiver-recorder adapted to record said received alpha numeric characters and to record a space character when a data arrival pulse does not occur and an input synchronizing pulse occurs during receipt of said continuous gating signal.

26. In a receiver-recorder of a data collection system adapted to receive alpha numeric coded characters and to record received characters on a processable medium wherein the recorder is an input requesting device capable of recording code characters at a higher rate than the average rate at which they are received; a synchronous character storage device for receiving and storing said characters until they are requested for recording by said recording device, comprising in combination, a plurality of binary storage elements connected in successive storage stages, each storage stage capable of storing one character, the first of said stages receiving said characters and the last of said stages delivering characters to said recording device, a first AND gate for each of said stages but the last, one input terminal of said gate adapted to be energized while a character is being set into its respective storage stage, another input terminal thereof connected to the next storage stage and adapted to be energized when said next stage does not contain a stored character, said first AND gate when energized at both of its input terminals adapted to provide a reset signal to its respective storage stage, each said storage stage adapted to be reset by a said reset signal supplied thereto and to set the character stored therein into the next successive stage of storage upon resetting, a second AND gate for each of said stages but the last, one input terminal thereof adapted to be energized when its respective stage contains a stored character, another terminal of said second AND gate adapted to be energized while the next stage of storage is being reset, said second AND gate being adapted when both of its input terminals are energized to provide a reset signal to its respective storage stage.

27. The combination of claim 26 and an output AND gate connected to said last storage stage, a first terminal of said output gate connected to said recording device and energized thereby when said recording device is ready to record a character, a second terminal of said output gate connected to said last stage and adapted thereby to be energized when said last stage contains a character, said AND gate upon being energized at both of said terminals producing a reset signal to reset said last stage.

28. The combination of claim 26 and delay means through which said reset signals originating at said first AND gate are delayed before being applied to said storage elements, the time delay provided by said delay means being at least equal to the set time of the respective storage stages.

29. The combination of claim 26 and delay means through which the said reset signals originating at said second AND gate are delayed before being applied to said storage elements, the time delay provided by said delay means being at least equal to the reset time of the next respective storage stage.

30. The combination defined in claim 28 in which the said reset signals originating at said second AND gate are delayed in said delay means before being applied to said storage elements for a period of time at least equal to the reset time of the next respective storage stage.

31. The combination of claim 28 further defined in that said delay means are adapted for astable and monostable operation, and further means at said central receiver-recorder connected to said delay means to cause them to operate as astable devices when no characters are being set into said storage unit and to cause said delay means to operate as monostable devices when characters are being set into said storage device, whereby said storage elements are continuously reset when no characters are being set into said storage unit.

32. The combination defined in claim 26 in which the said reset singals originating at said second AND gate are delayed in said delay means before being applied to said storage elements for a period of time at least equal to the reset time of the next respective storage stage, and further delay means through which the said reset signal applied to said last storage stage is delayed before being applied to said storage elements for a period of time at least equal to the recording time of said processable medium recorder.

33. In a central receiver-recorder adapted to receive alpha numeric characters transmitted thereto in a character-by-character manner and to record said characters at a predetermined constant frequency, said characters being received at a varying rate having a lower average frequency than said recording frequency; a buffer storage at said central receiver-recorder adapted to receive and store said incoming characters and to supply said characters for recording upon request at said recording frequency; said buffer storage means comprising in combination, a plurality of serially connected character storage stages, the first storage stage theerof being adapted to be set by an incoming character and to store said character until being reset at which time said character is transferred to the next storage stage, the last storage stage adapted upon being reset to supply the character stored therein for recording, each of said stages except the last being adapted to be reset after being set at a time when the next succeeding stage is empty, and when set adapted to be reset at a time when the next succeeding stage has been emptied, the last stage of said buffer storage when set being adapted to be reset at said recording frequency.

34. The combination of claim 33 further defined in that said recorder is a processable medium recorder adapted to record code characters at a constant frequency character rate greater than said average rate at which characters are received.

35. A central receiver-recorder for use in an automatic data collection system having a plurality of remote data transmitters, comprising in combination, data receiving means responsive to serially transmitted alpha-numeric code characters, synchronous buffer storage means connected with said receiving means for temporarily storing received code characters, said storage means including a plurality of bistable binary storage elements connected in series, with means for shifting the data stored in said buffer storage means to the last empty storage element thereof in connection with a recording means, said shifting means including delay means for allowing said bistable storage elements to be reset prior to being set, recording means connected with said storage means for recording the code characters stored therein, and means for resetting the bistable elements of said buffer storage means whenever code characters are not being received by said data receiving means.

36. A data transmission system comprising in combination at least one data transmitter and a data receiver, said data transmitter adapted to transmit to said data receiver a plurality of sequential alpha numeric coded characters on a parallel basis, a plurality of data conductors connecting said data transmitter to said receiver, at least one of said conductors provided for each channel of the code of said alpha numeric characters, means of said data transmitter for grounding seleted ones of said data conductors, each ground connection corresponding to an element in said alpha numeric code, each of said data conductors terminating at said central receiver and connected thereat to a control terminal of a high impedance isolation device, a separate high impedance isolation device for each of said data conductors, an independent impedance device connecting each conductor to a source of energization so as to inhibit operation of said high impedance isolation devices in response to spurious signals on said data conductors, selected ones of said isolation devices being interconnected as OR gates so as to produce output signals on common lines upon operation of any one of said interconnected isolation devices in response to a ground connection on its associated data conductor, a translation device operatably connected to each of said common lines, a plurality of bistable filter devices, each of said bistable filter devices connected in series with each of said common lines, each of said series connected bistable devices having a predetermined energization time, each of said bistable devices operating one of said translation devices, and means at said transmitter for grounding a separate character gating conductor when characters are to be transmitted to said central-receiver to provide a character gating signal, a high impedance isolation device connected in circuit with said character gating conductor and a soure of energization, and a bistable filter device conneted to said isolation device of said character gating conductor, said bistable filter device being operatively connected to said other bistable filter devices and adapted to supply energization to said other bistable devices only when said character gating conductor is grounded at the transmitter.

37. A central receiver-recorder for use in an automatic data collection system in which a plurality of transmitters are adapted to transmit to a central receiver-recorder messages consisting of a plurality of successive alpha numeric code characters on a character-by-character basis; comprising in combination, means for selecting and initiating transmission at a transmitter which is ready to transmit a message, means for recording messages from said transmitter on a processable medium, means for temporarily storing characters as received until they are recorded on said processable medium, means for receiving from said data transmitters a code number corresponding to the number of characters of the message being transmitted, and means for comparing said code number to the number of characters of said transmitted message recorded on said processable medium, said comparing means providing a signal to said data transmitters whenever the number of the characters of the message indicated by said code number and the number of the characters recorded do not agree.

References Cited

UNITED STATES PATENTS

| | | | |
|---|---|---|---|
| 2,946,986 | 7/1960 | Harrison | 340—172.5 |
| 2,905,745 | 9/1959 | Kolpek | 178—2 |
| 2,871,286 | 1/1959 | Bacon | 178—2 |
| 2,805,283 | 9/1957 | Stiles | 178—2 |
| 1,927,556 | 9/1933 | Nelson | 178—2 |
| 2,844,650 | 7/1958 | Dutton | 178—51 |
| 3,114,900 | 12/1963 | Anderson | 340—172.5 |
| 3,099,818 | 7/1963 | Murray | 340—172.5 |
| 3,063,036 | 11/1962 | Reach et al. | 340—172.5 |
| 3,117,306 | 1/1964 | Reitfort | 340—172.5 |
| 1,972,326 | 9/1934 | Angel | 178—23.1 |
| 2,596,199 | 5/1952 | Bennett | 178—23.1 |
| 2,616,965 | 11/1952 | Hoeppner | 340—172.5 |
| 3,117,307 | 1/1964 | Davie | 340—172.5 |
| 2,601,089 | 6/1952 | Burkhart | 340—172.5 |

OTHER REFERENCES

Richards, Digital Computer Components and Circuits, D. Van Nostrand Co., Inc., 1957 pp. 354–358 relied on.

Millman and Taub, Pulse and Digital Circuits, McGraw-Hill, 1956, pp. 430–432 relied on.

GARETH D. SHAW, Primary Examiner